(12) United States Patent
Suito et al.

(10) Patent No.: US 10,569,577 B2
(45) Date of Patent: Feb. 25, 2020

(54) ADHESIVE TAPE CARTRIDGE, ADHESIVE TAPE ROLL, PRODUCTION METHOD FOR ADHESIVE TAPE ROLL, AND PRINTER HAVING CARTRIDGE

(71) Applicant: Brother Kogyo Kabushiki Kaisha, Nagoya-shi, Aichi-ken (JP)

(72) Inventors: Yoshikatsu Suito, Nagoya (JP); Chie Nakashima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 26 days.

(21) Appl. No.: 15/719,802

(22) Filed: Sep. 29, 2017

(65) Prior Publication Data
US 2018/0093509 A1 Apr. 5, 2018

(30) Foreign Application Priority Data
Sep. 30, 2016 (JP) .................................. 2016-195288

(51) Int. Cl.
| | | |
|---|---|---|
| *B41J 2/325* | (2006.01) | |
| *B41J 15/04* | (2006.01) | |
| *C09J 7/20* | (2018.01) | |
| *B41J 2/32* | (2006.01) | |
| *B41J 3/407* | (2006.01) | |

(Continued)

(52) U.S. Cl.
CPC ............... *B41J 15/044* (2013.01); *B41J 2/32* (2013.01); *B41J 2/325* (2013.01); *B41J 3/4075* (2013.01); *C09J 7/20* (2018.01); *C08K 3/013* (2018.01); *C08K 2201/005* (2013.01); *C09J 201/00* (2013.01); *C09J 2201/134* (2013.01); *C09J 2205/102* (2013.01)

(58) Field of Classification Search
CPC ... B41J 15/044; B41J 2/32; B41J 2/325; B41J 3/4075; C09J 7/20
See application file for complete search history.

(56) References Cited

U.S. PATENT DOCUMENTS

| | | |
|---|---|---|
| 4,950,537 A | 8/1990 | Vesley et al. |
| 9,434,862 B2 | 9/2016 | Norimatsu |

(Continued)

FOREIGN PATENT DOCUMENTS

| | | |
|---|---|---|
| EP | 0324242 A2 | 7/1989 |
| EP | 1803575 A1 | 7/2007 |
| JP | H02-248483 A | 10/1990 |

(Continued)

OTHER PUBLICATIONS

Jan. 10, 2018—(EP) Extended Search Report—App 17191192.8.
Nov. 27, 2019—(JP) Notice of Reasons for Refusal—App 2016-195288.

*Primary Examiner* — Lamson D Nguyen
(74) *Attorney, Agent, or Firm* — Banner & Witcoff, Ltd.

(57) ABSTRACT

The disclosure discloses an adhesive tape cartridge including an adhesive tape roll. The adhesive tape roll winds an adhesive tape around a predetermined axis in a housing. The adhesive tape includes a base layer and a particle-comprising adhesive layer. The particle-comprising adhesive layer is disposed on one side of the base layer in a thickness direction and comprises an adhesive comprising large diameter particles and small diameter particles. An average particle diameter of the large diameter particles is 30 μm to 200 μm. An average particle diameter of the small diameter particles is 0.2 μm to 20 μm.

16 Claims, 47 Drawing Sheets

(51) Int. Cl.
   *C08K 3/013* (2018.01)
   *C09J 201/00* (2006.01)

(56) References Cited

U.S. PATENT DOCUMENTS

2014/0210935 A1  7/2014  Norimatsu
2015/0329745 A1  11/2015  Norimatsu

FOREIGN PATENT DOCUMENTS

| | | |
|---|---|---|
| JP | 2013-082789 A | 5/2013 |
| JP | 2014-088506 A | 5/2014 |

[FIG. 1]
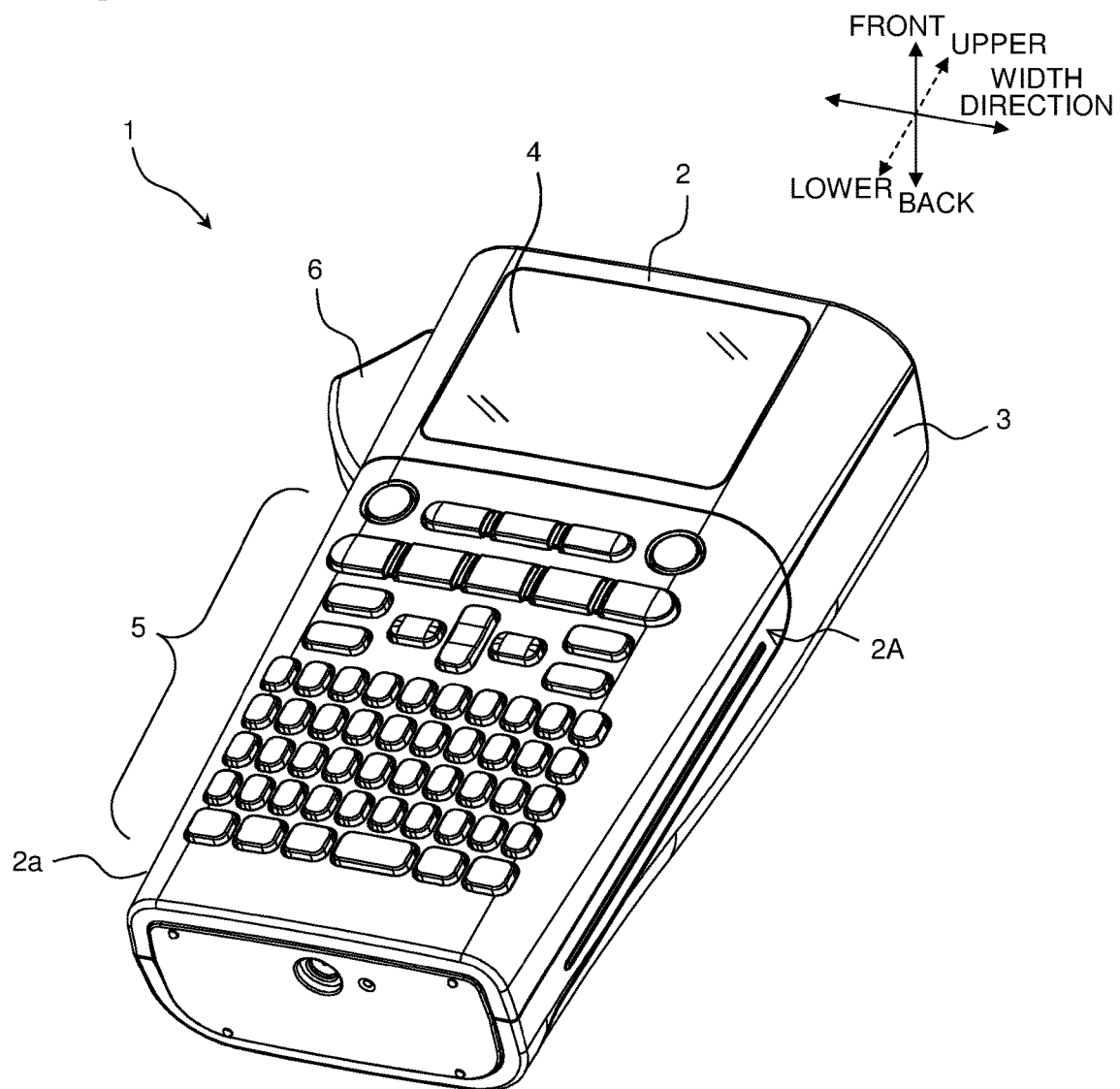

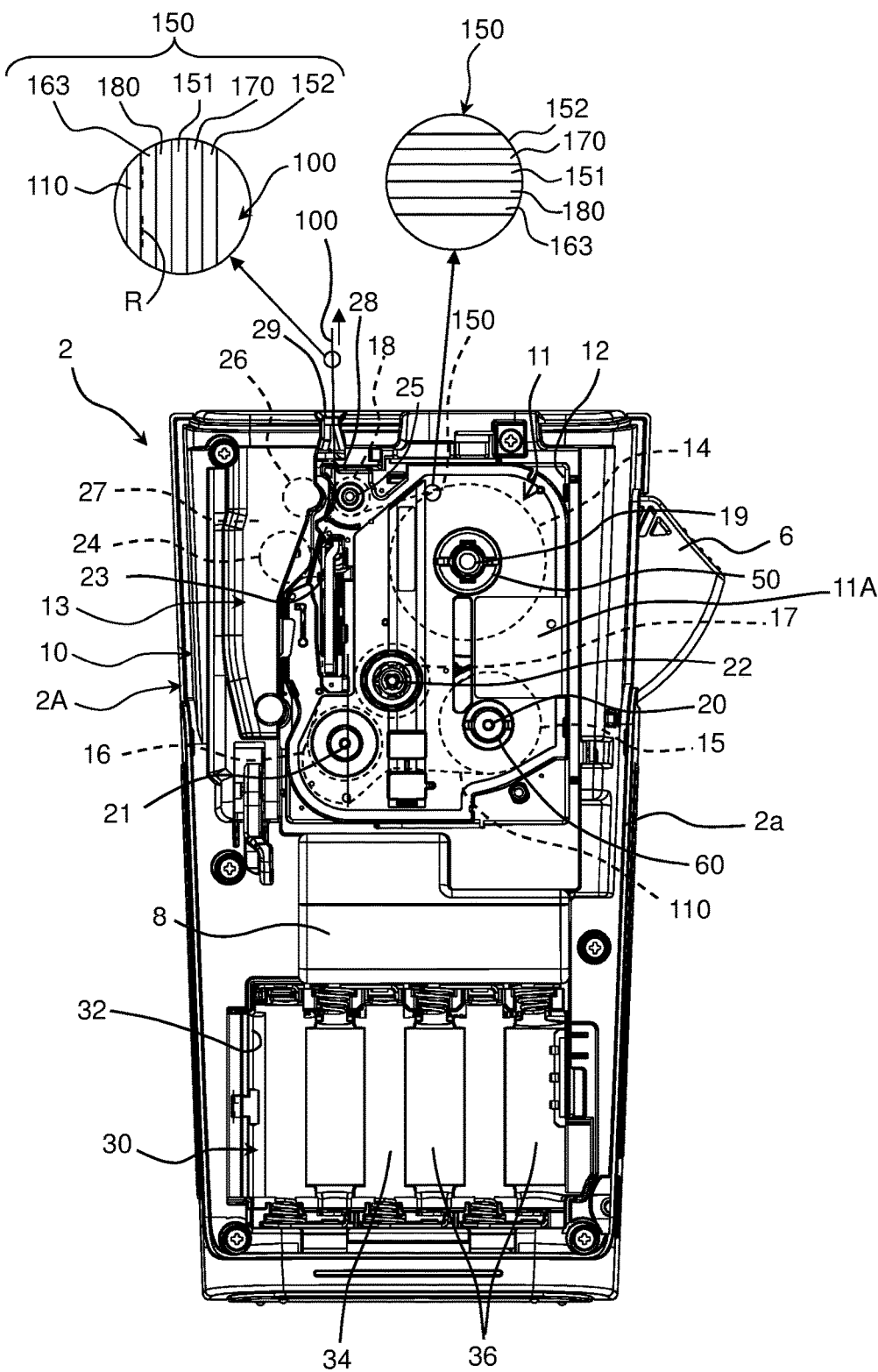
[FIG. 2]

[FIG. 3]
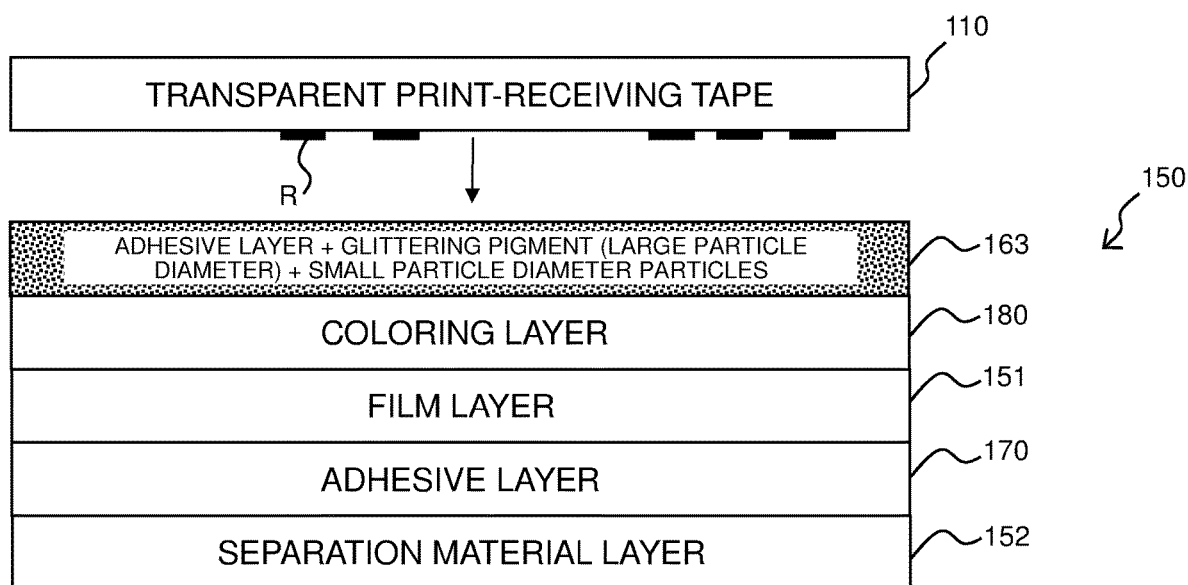

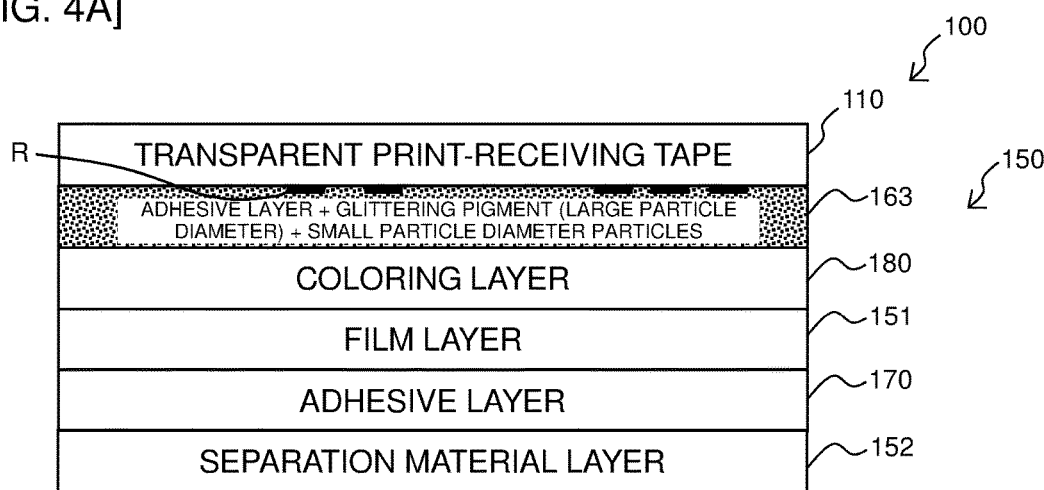
[FIG. 4A]
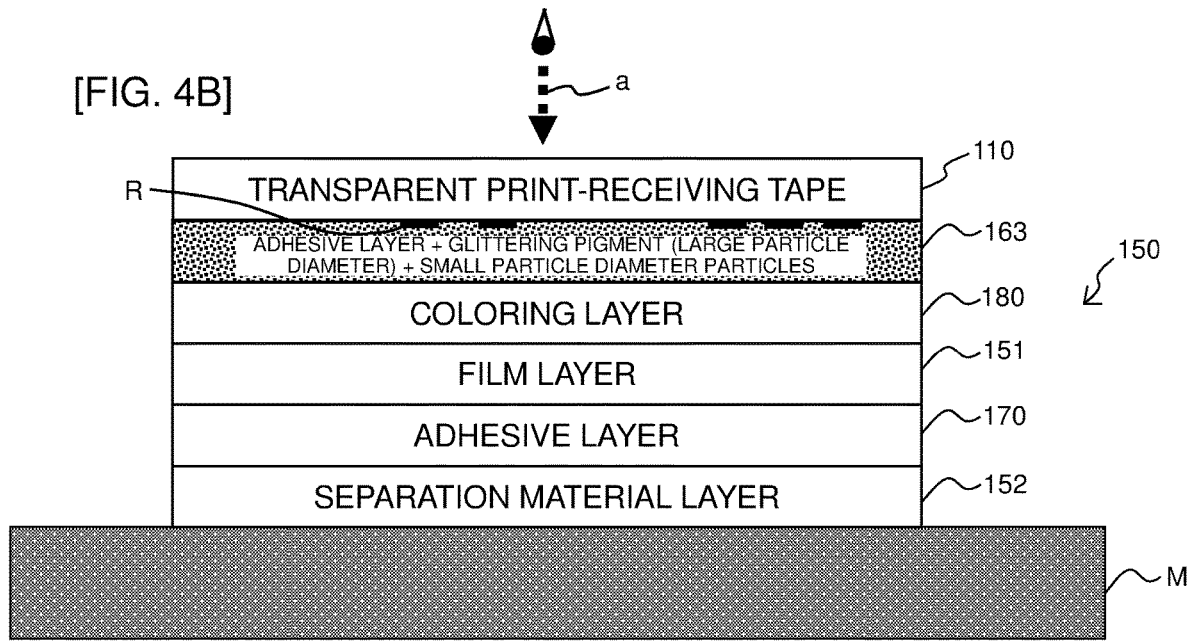
[FIG. 4B]

[FIG. 5]
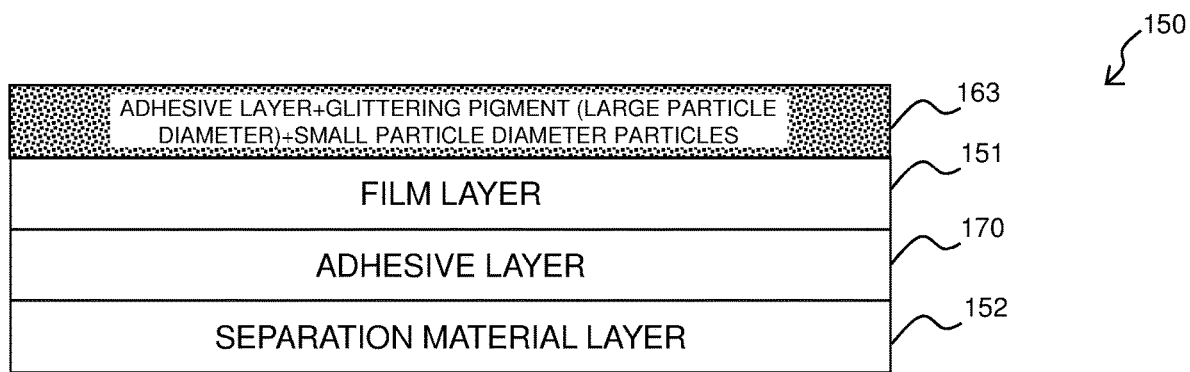

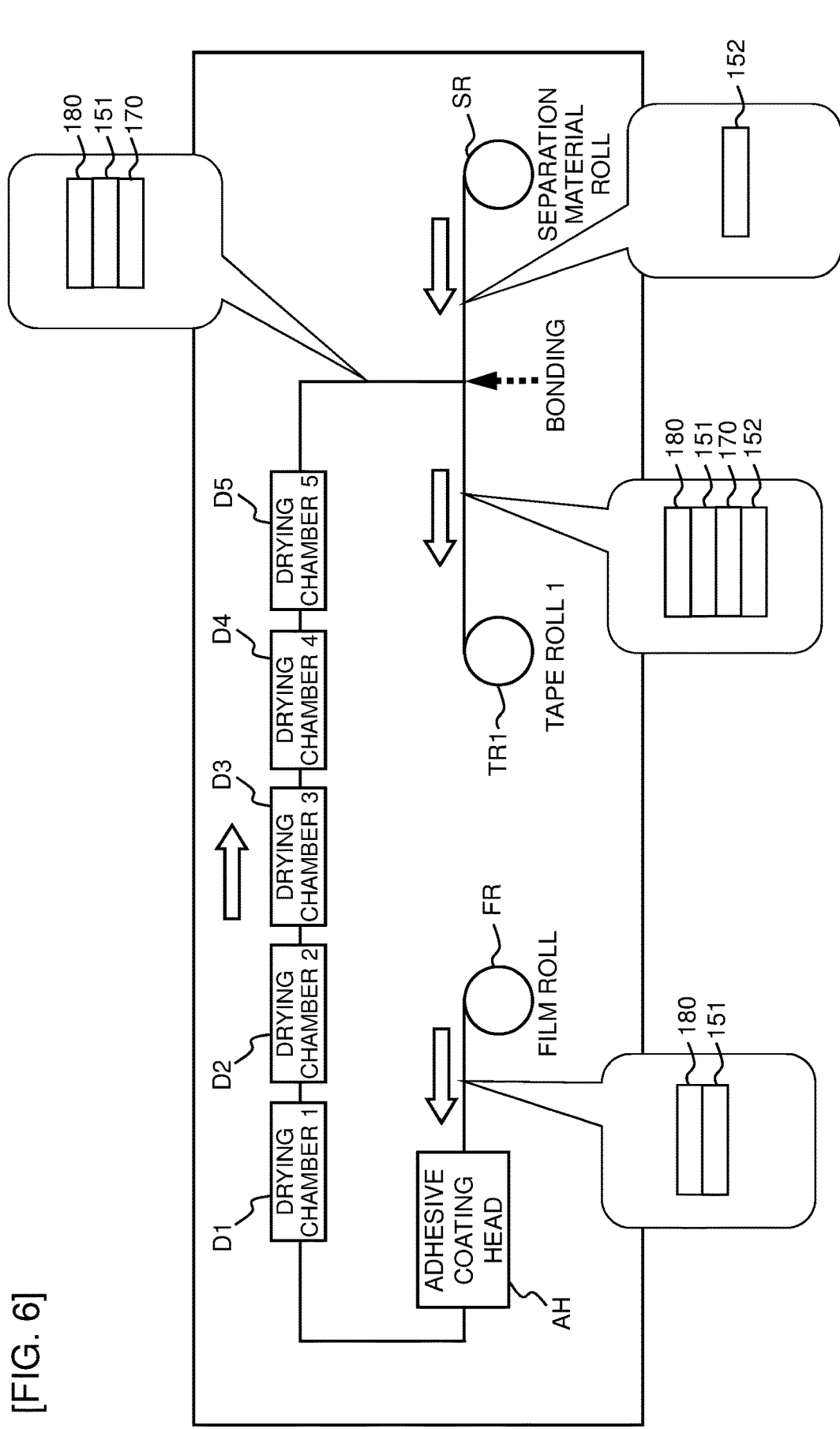
[FIG. 6]

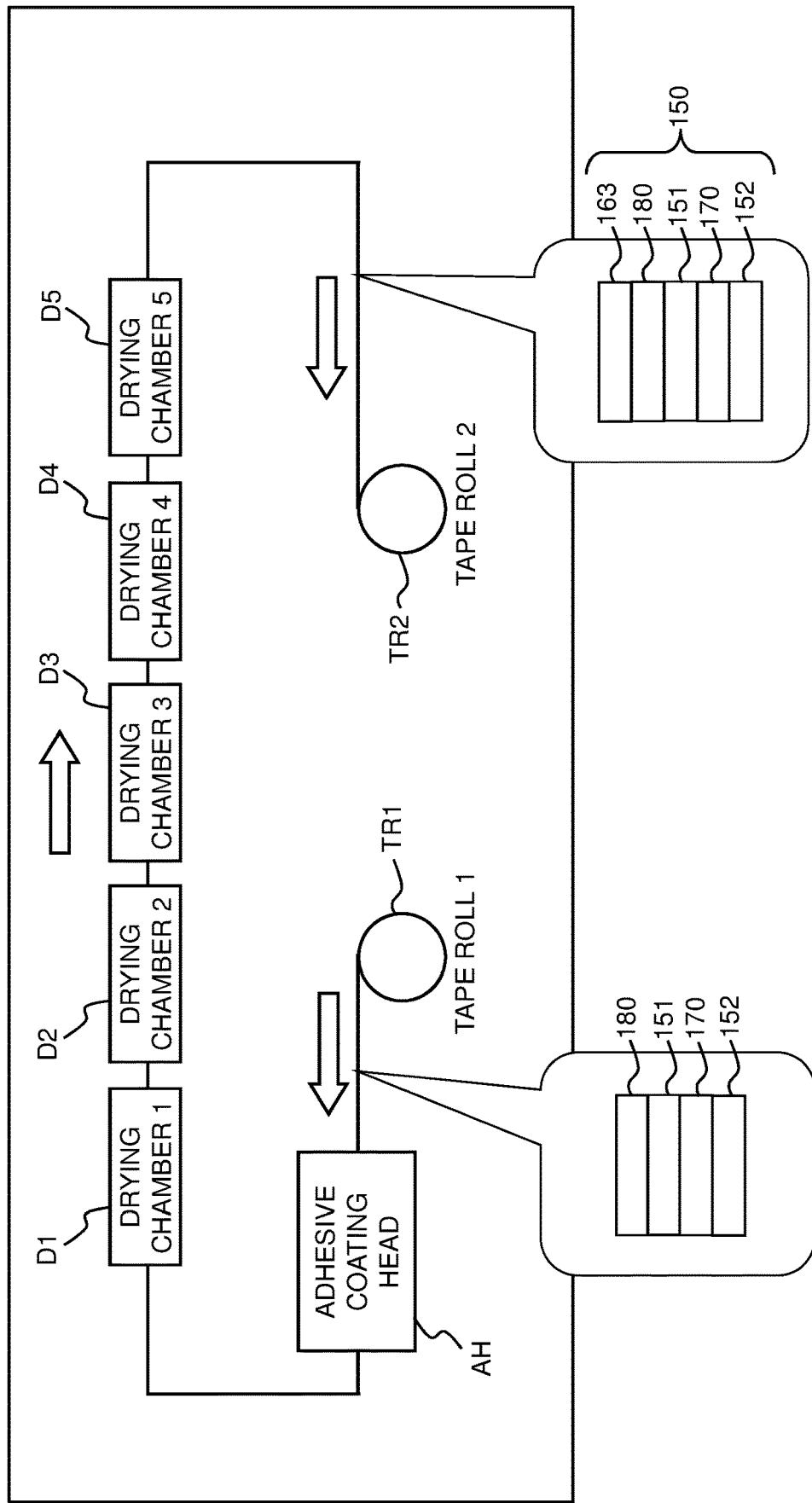

[FIG. 8]
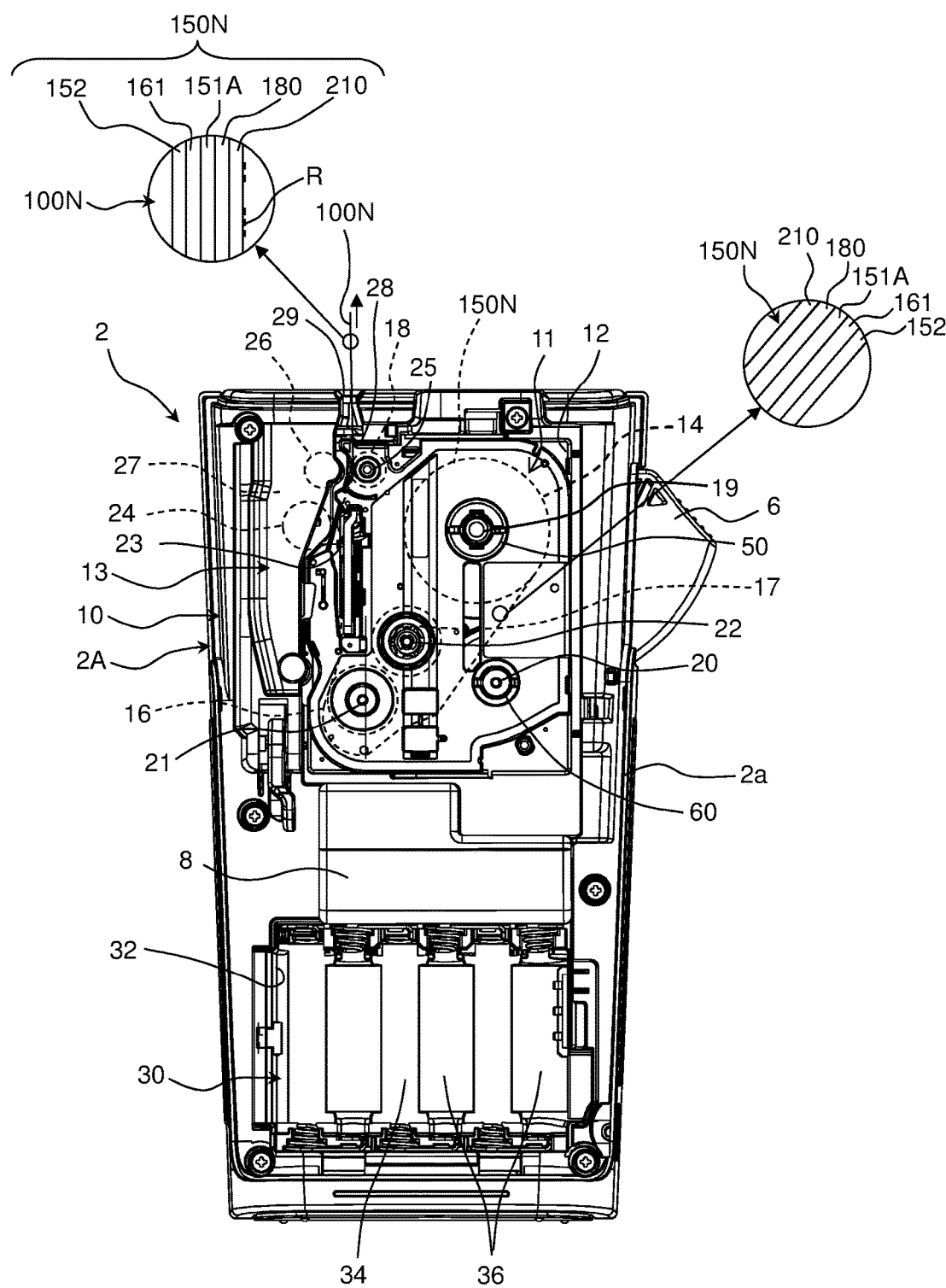

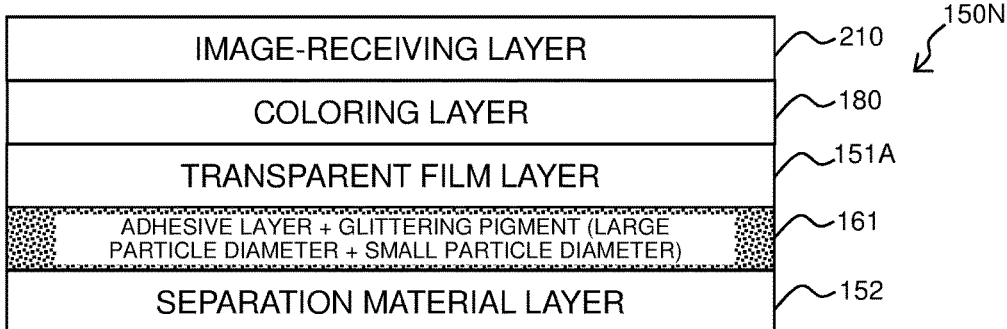
[FIG. 9A]
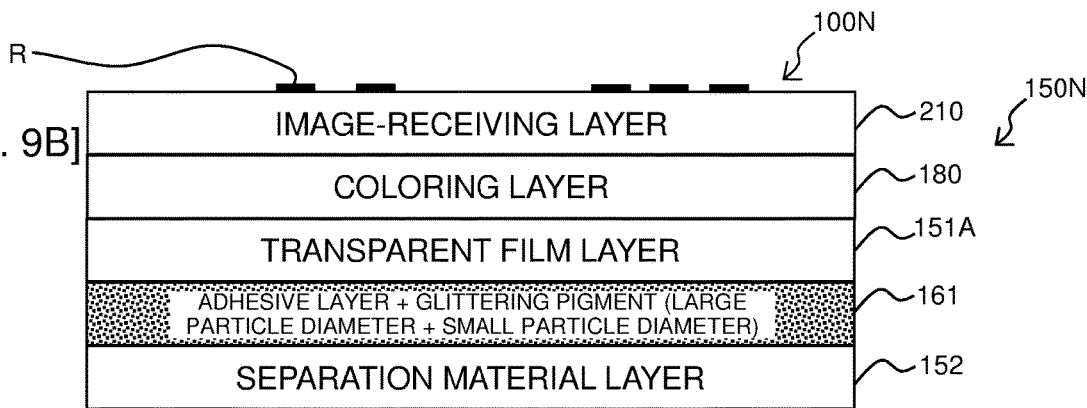
[FIG. 9B]
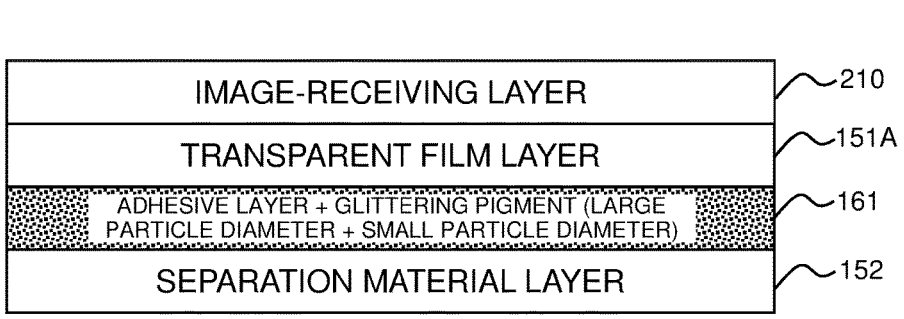
[FIG. 9C]
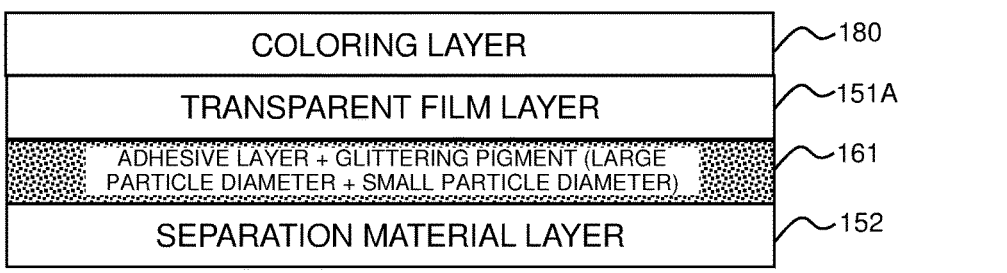
[FIG. 9D]

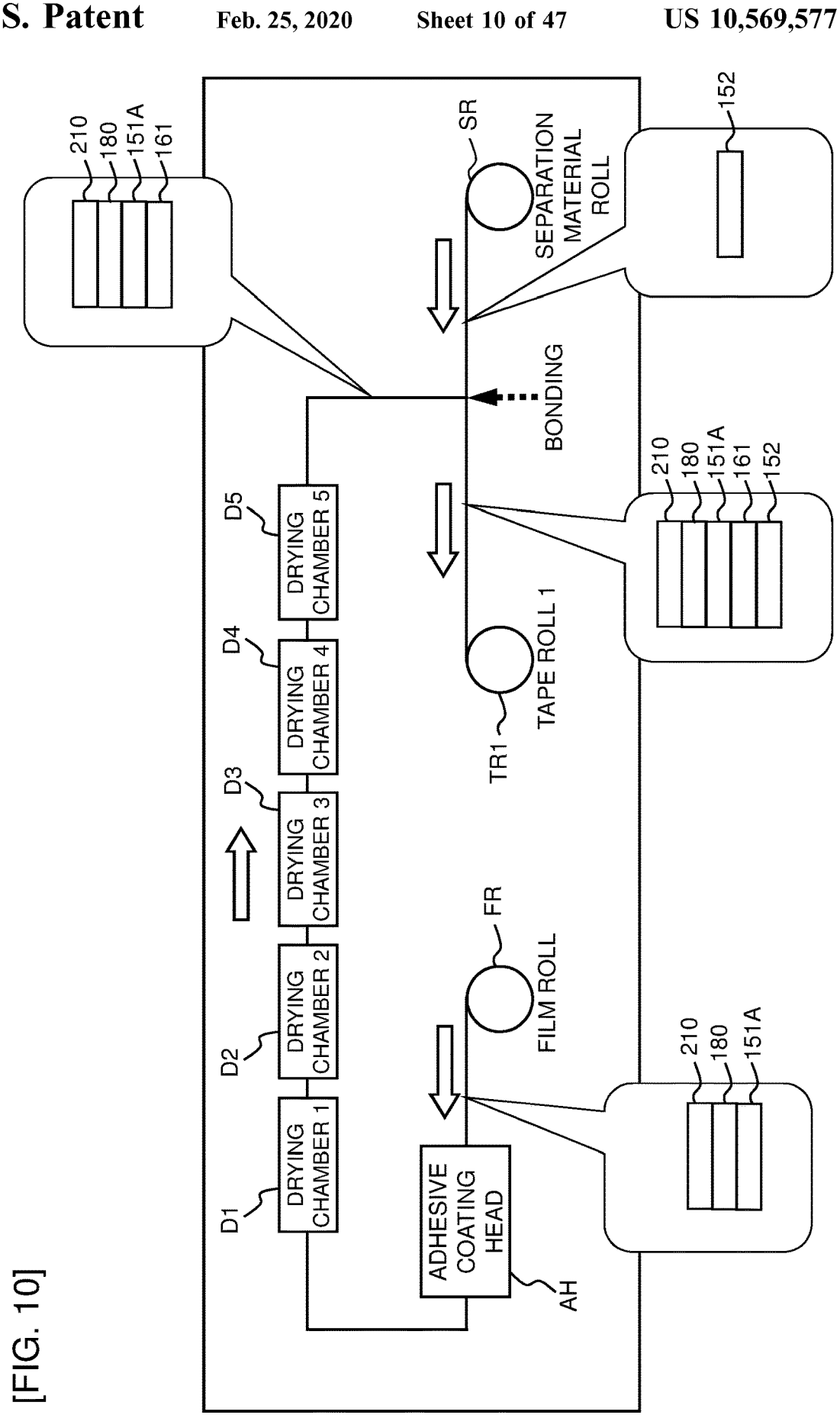
[FIG. 10]

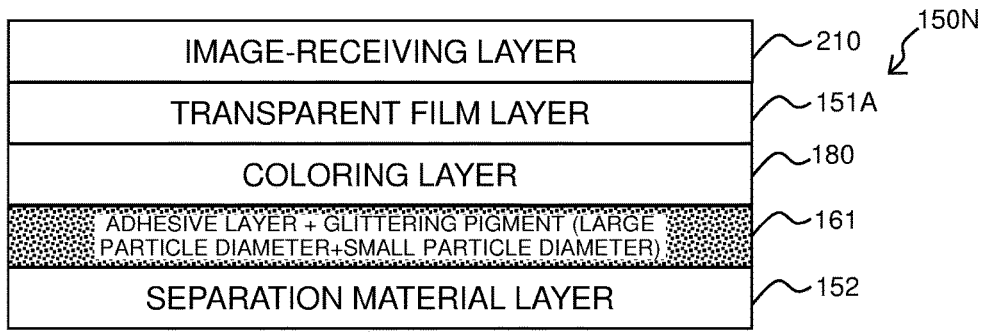
[FIG. 11A]
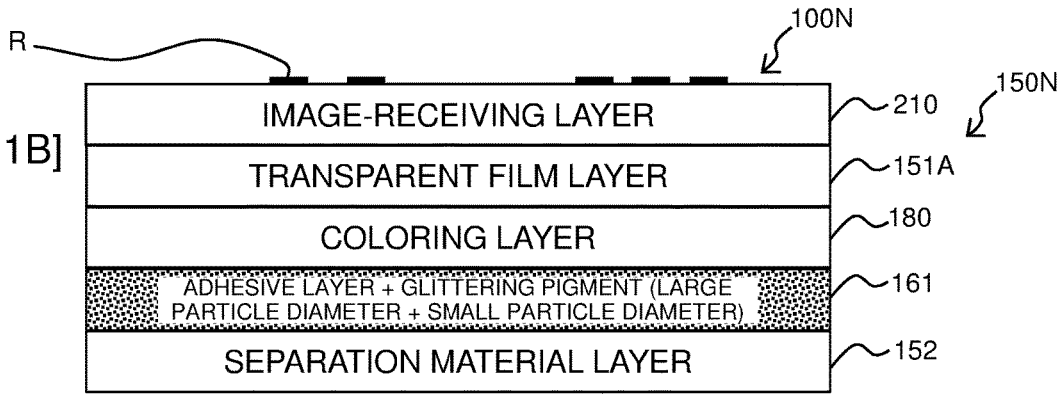
[FIG. 11B]
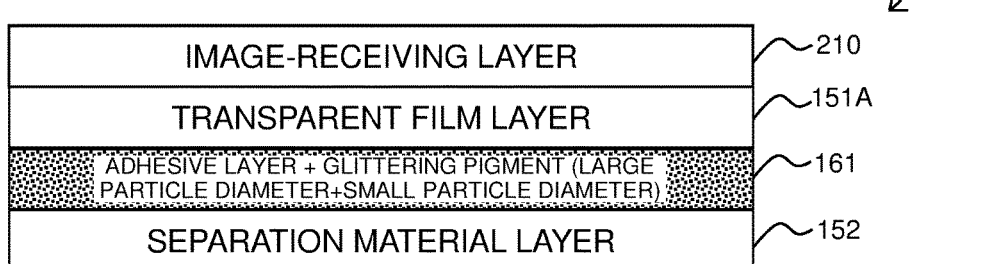
[FIG. 11C]
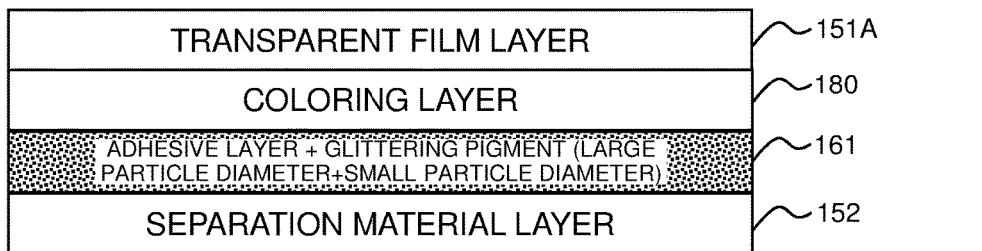
[FIG. 11D]

[FIG. 12]
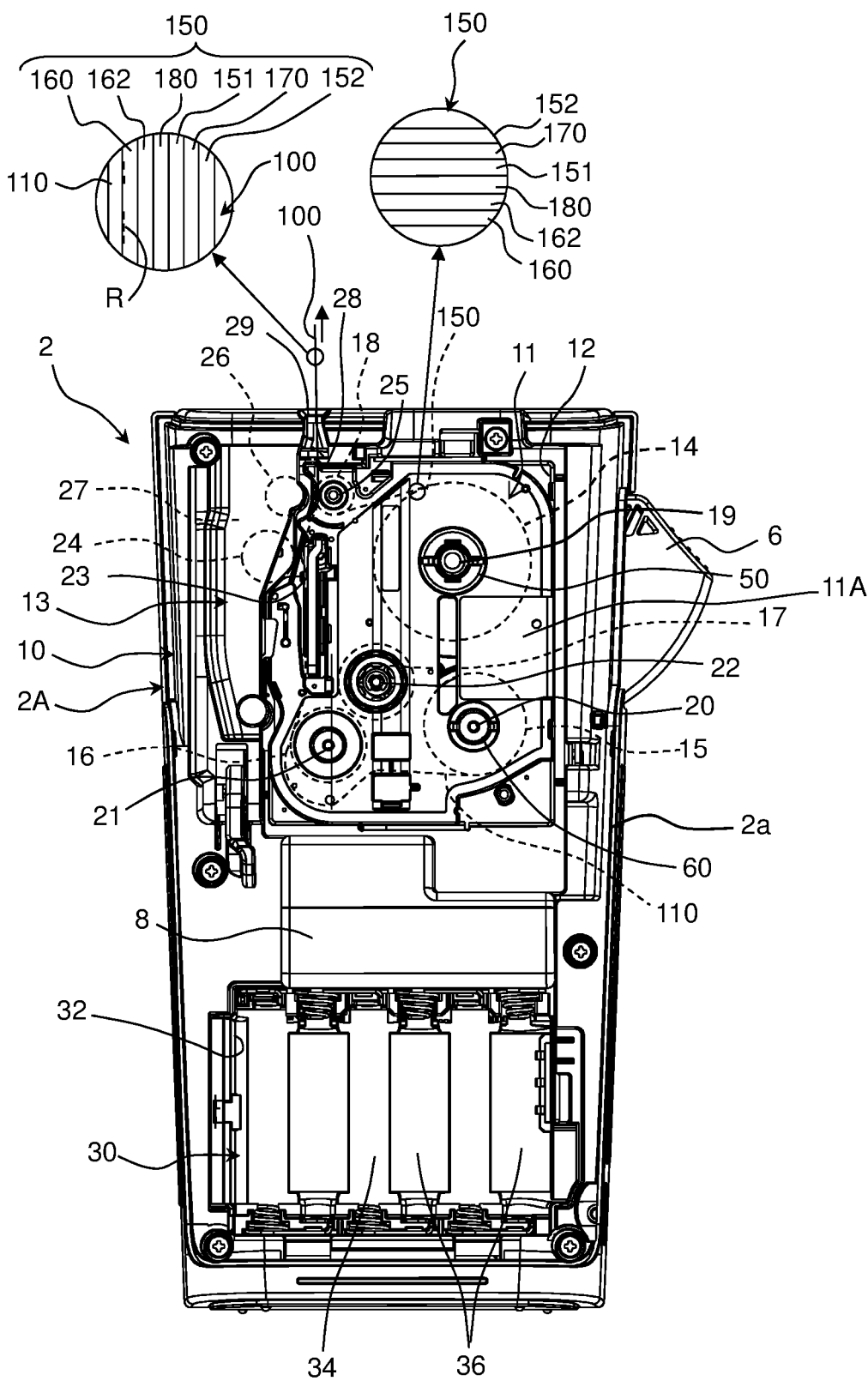

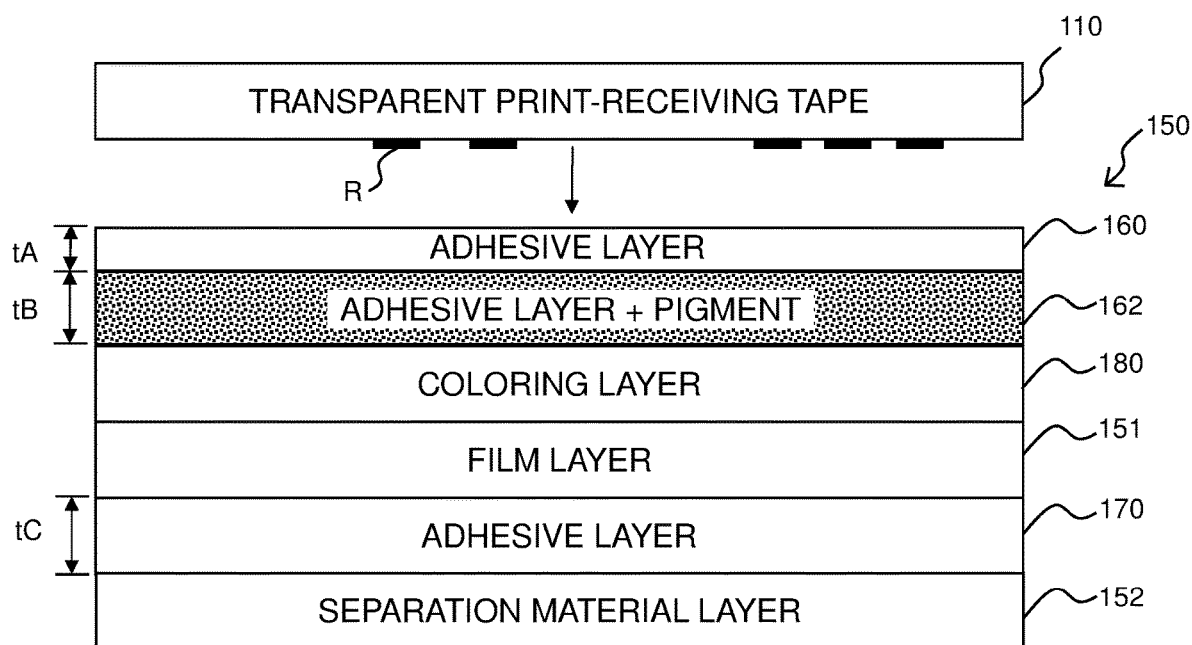
[FIG. 13]

[FIG. 14A]
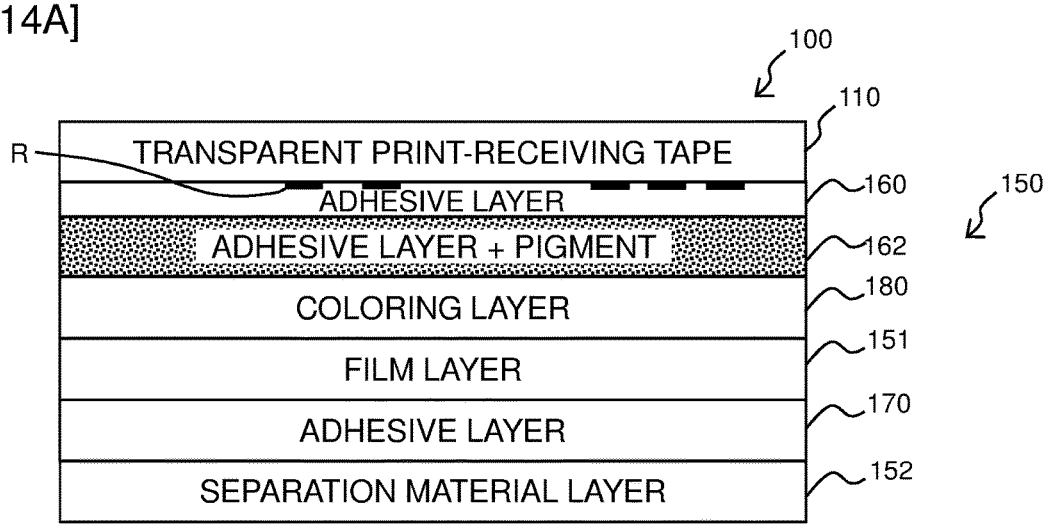
[FIG. 14B]
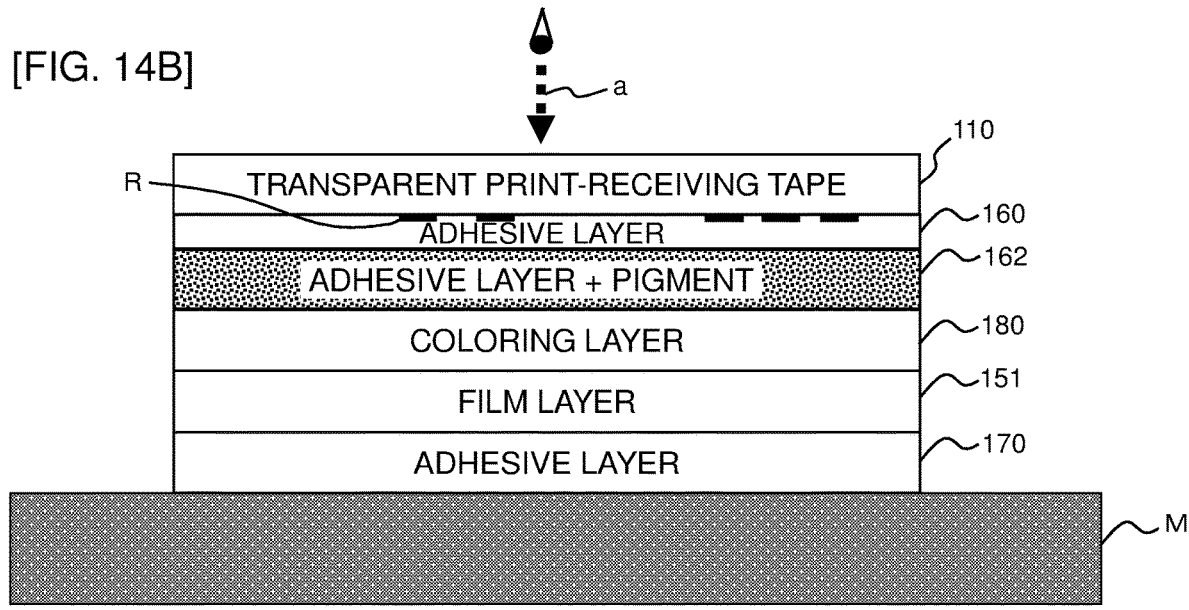

[FIG. 15A]
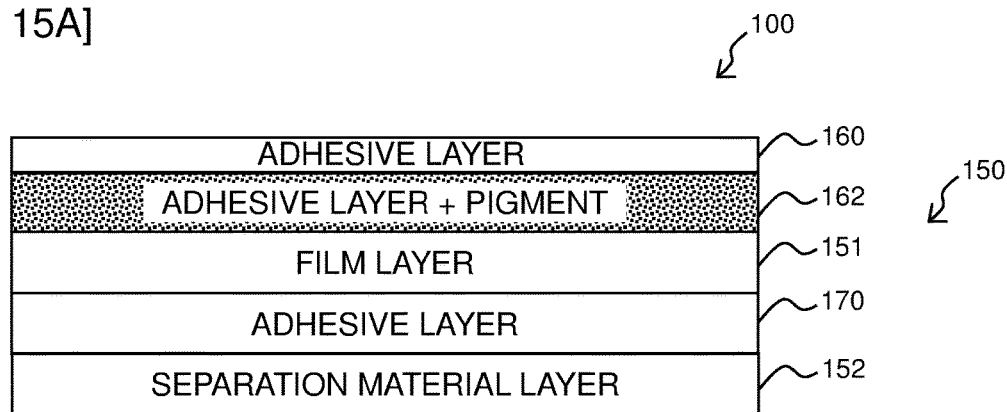
[FIG. 15B]
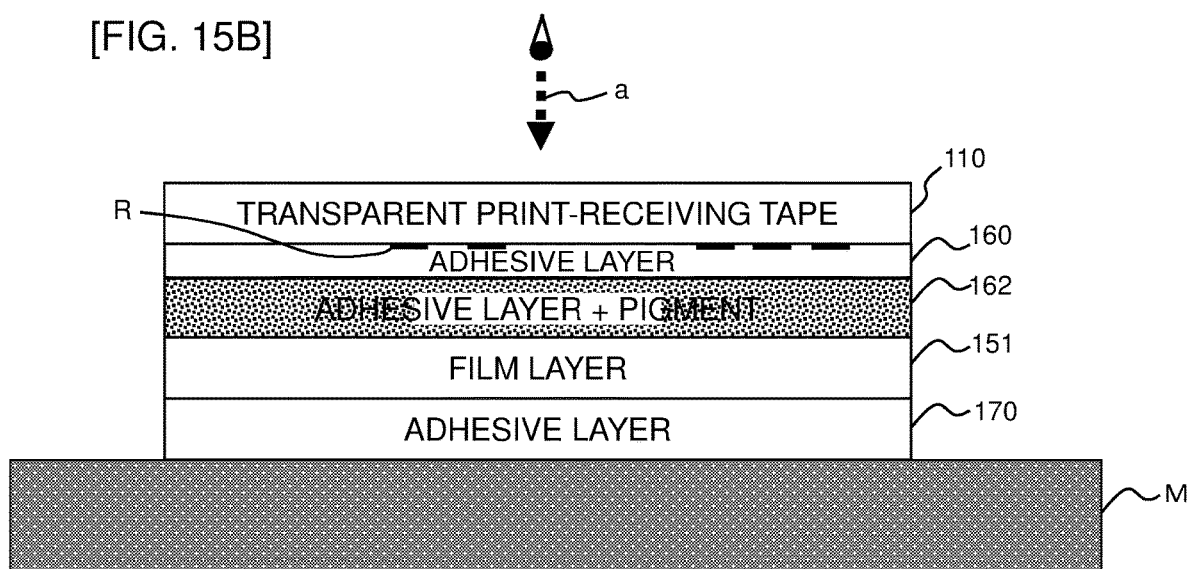

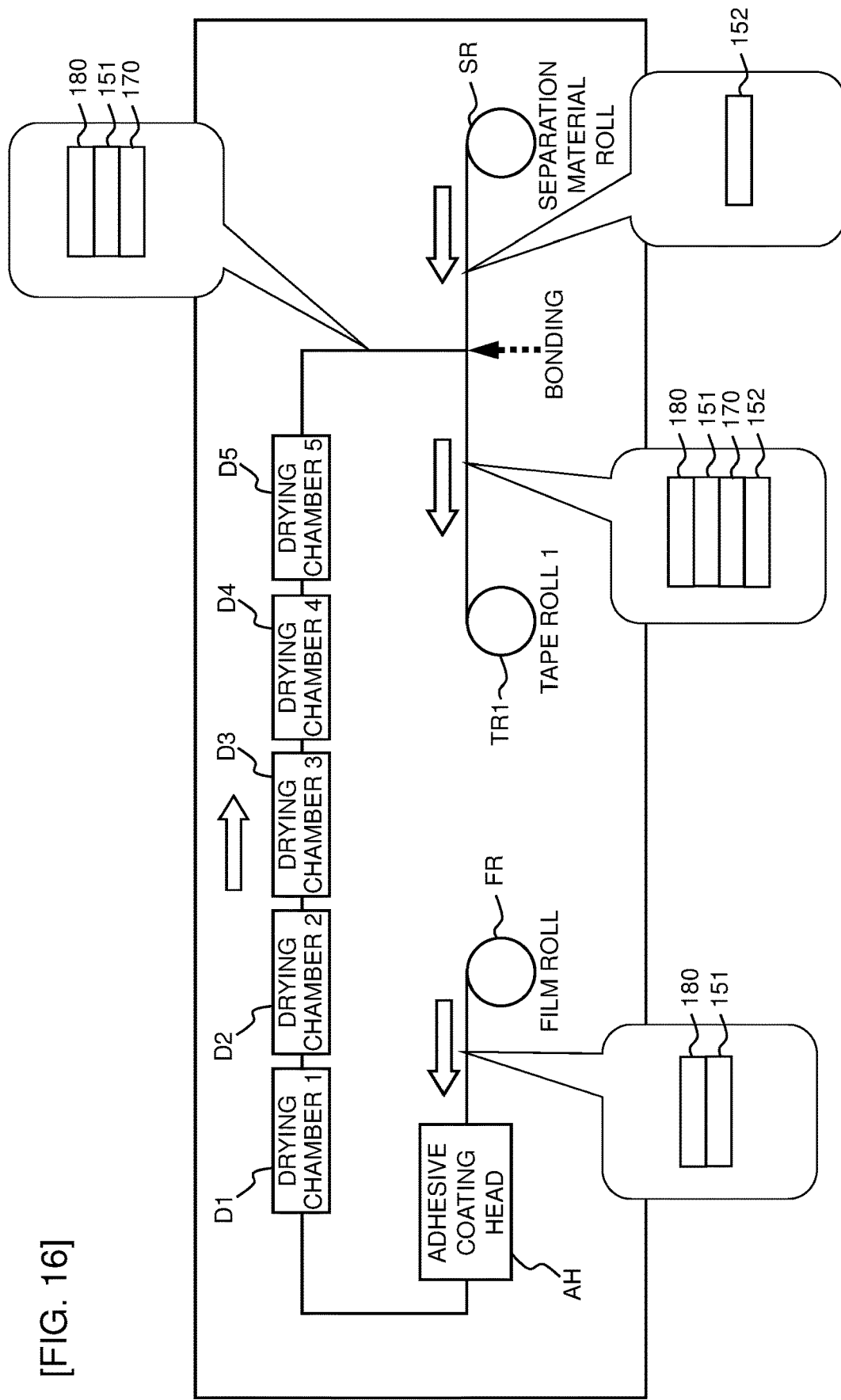
[FIG. 16]

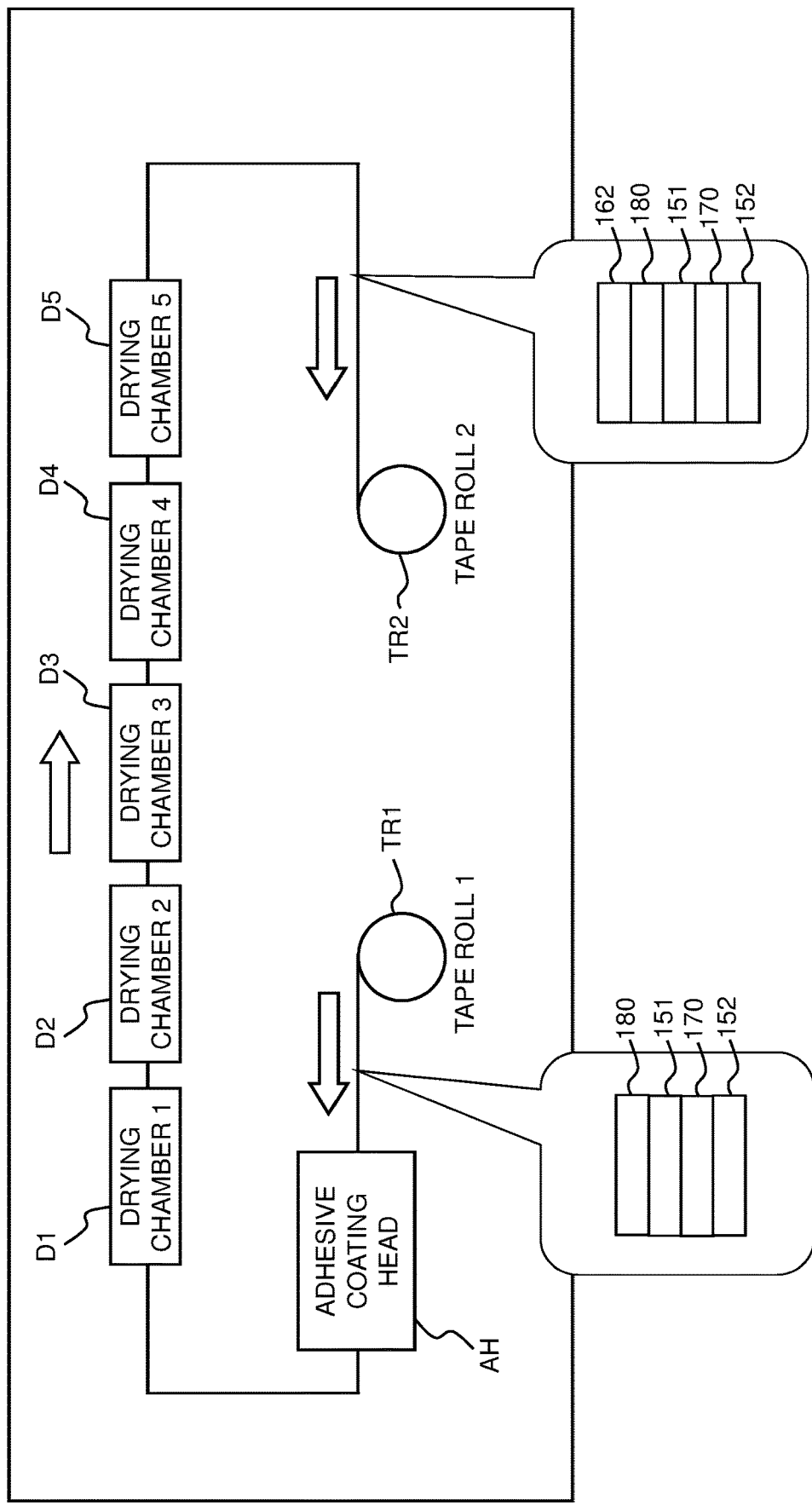
[FIG. 17]

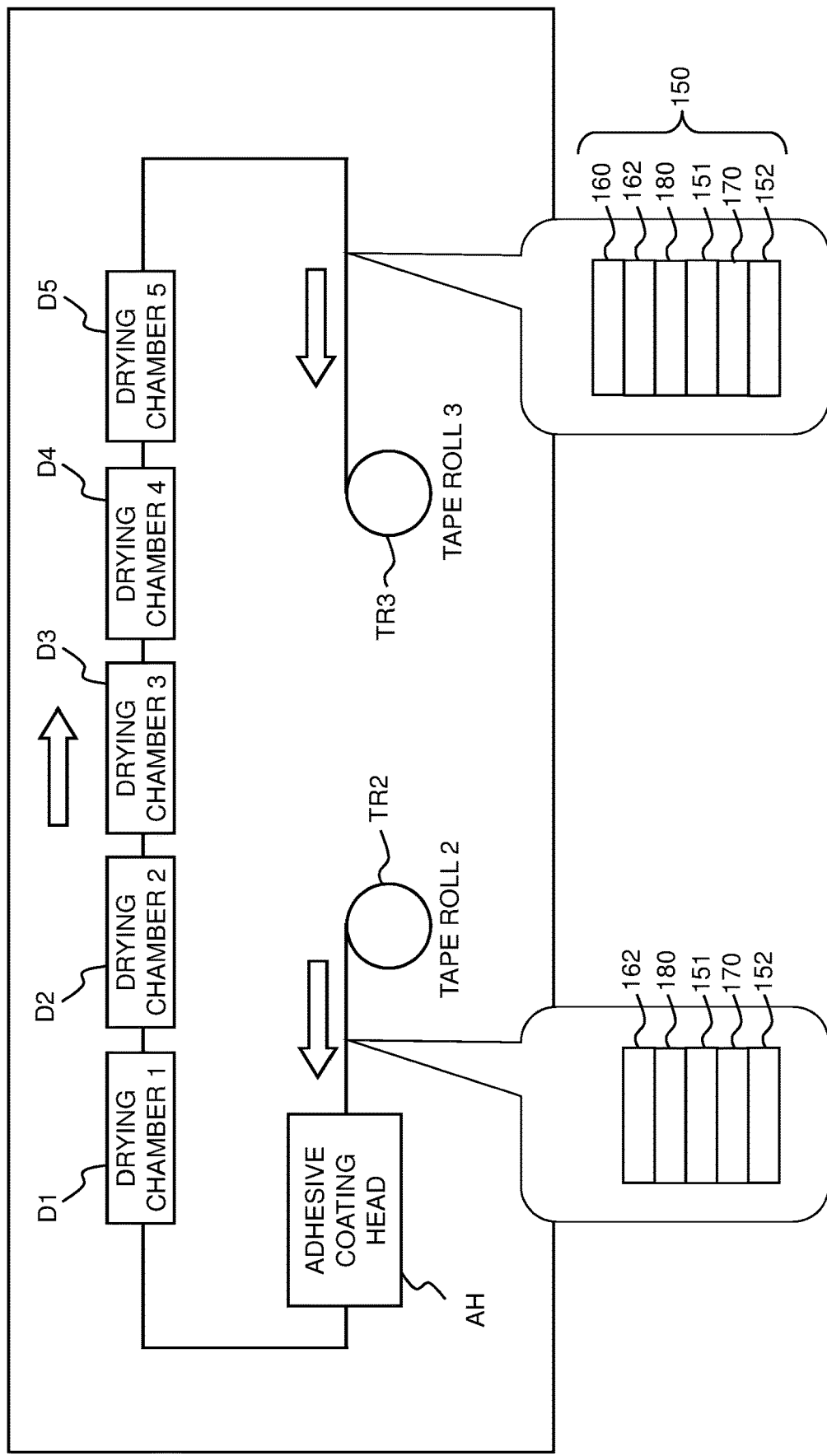
[FIG. 18]

[FIG. 19]
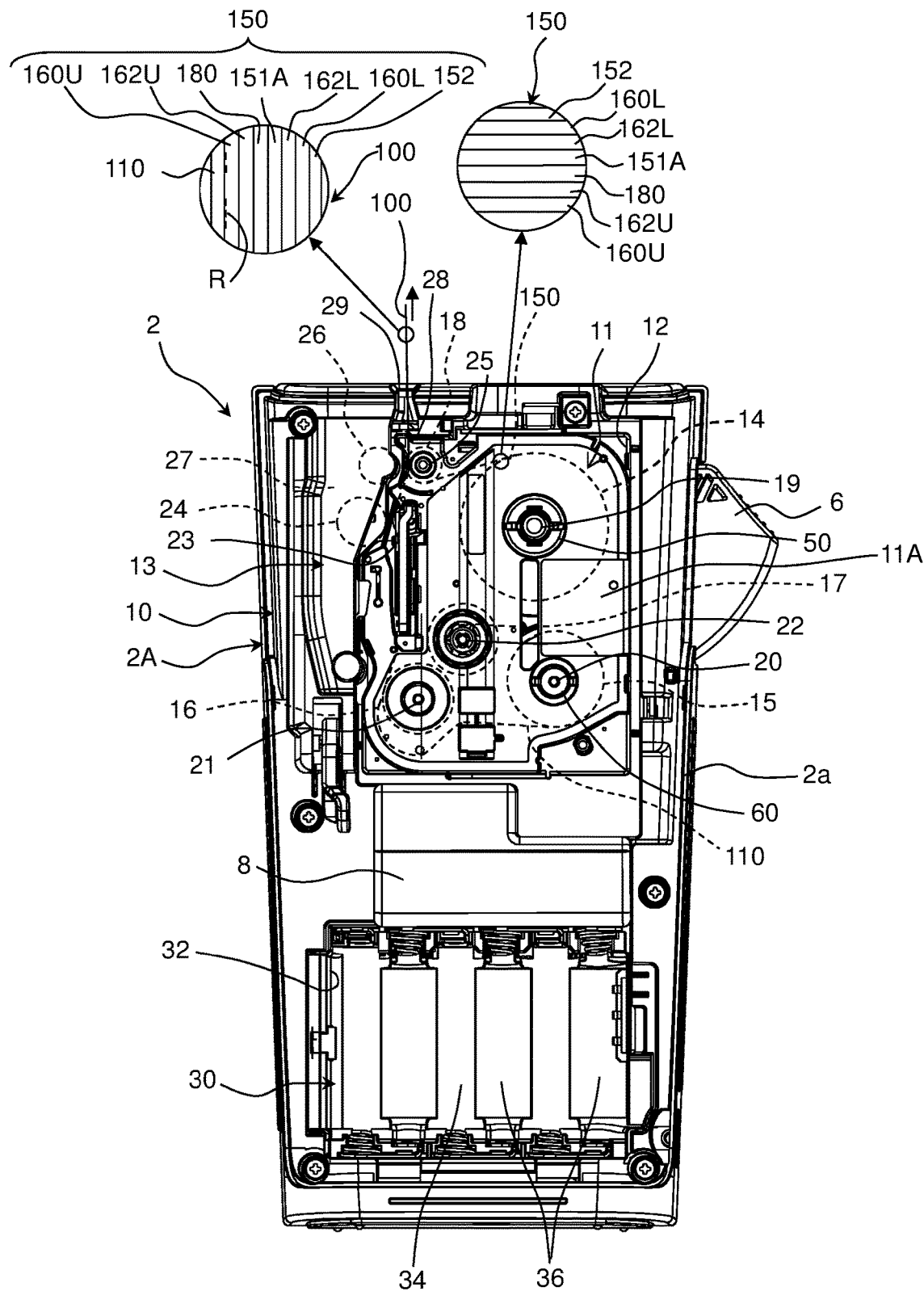

[FIG. 20]
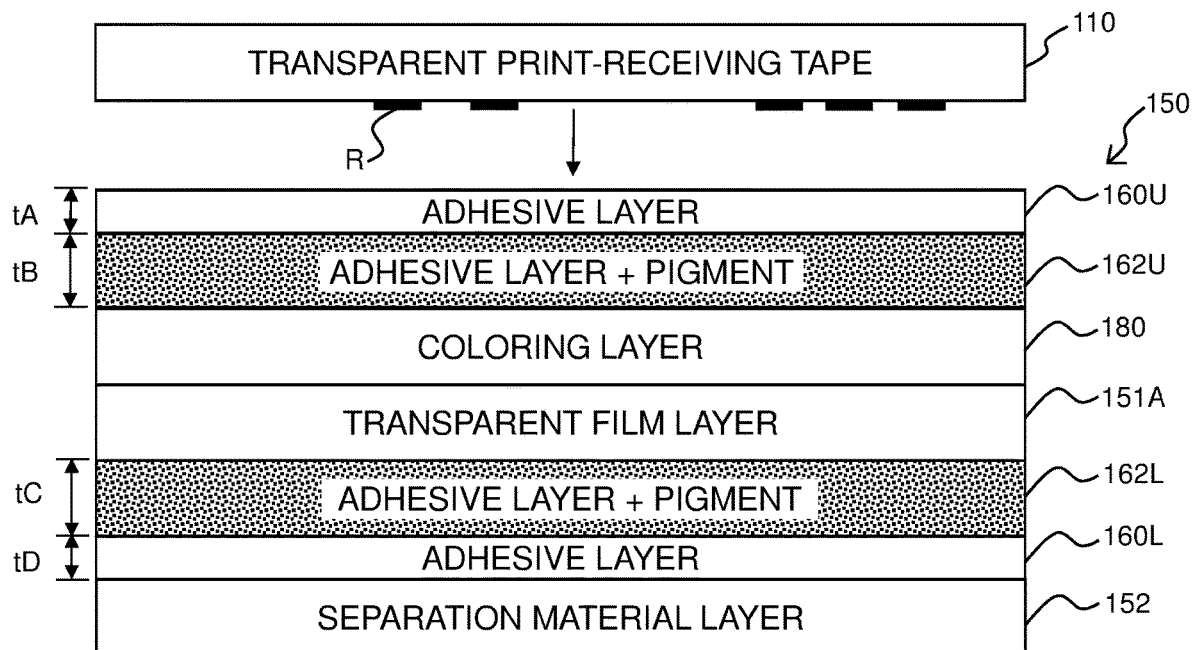

[FIG. 21A]
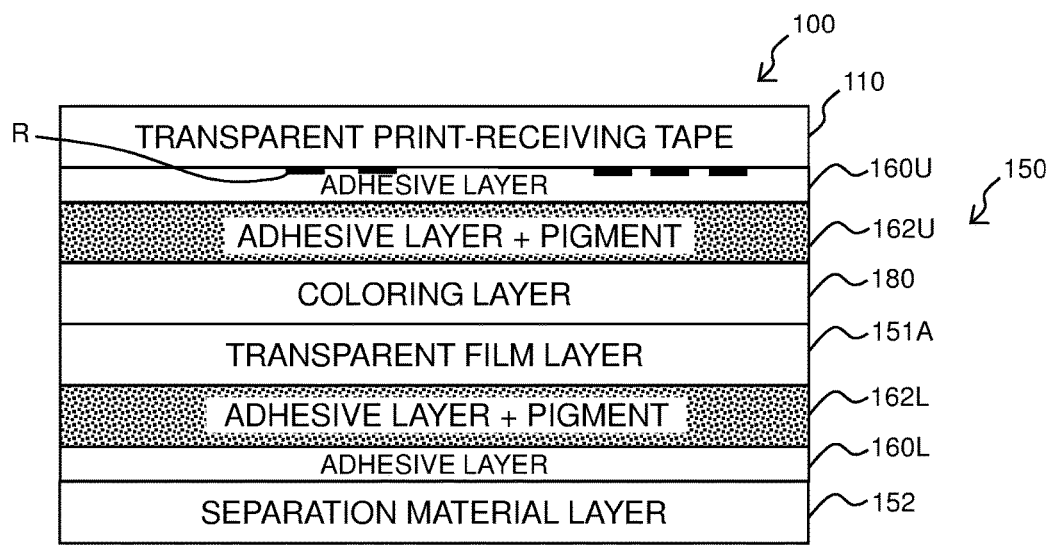
[FIG. 21B]
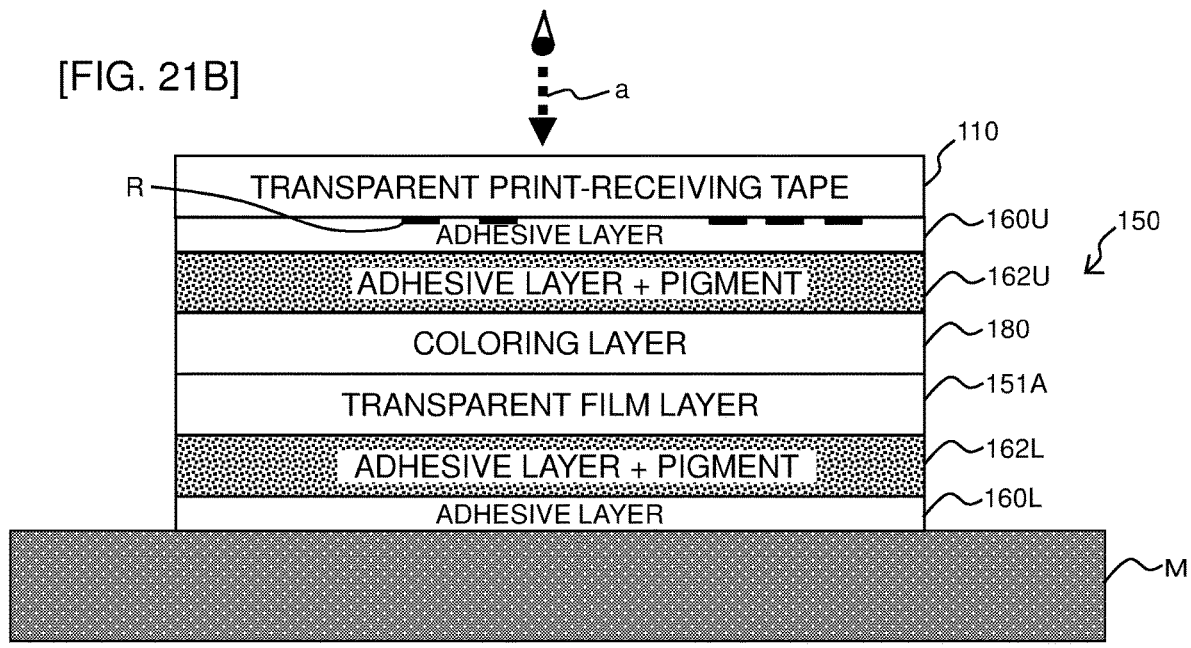

[FIG. 22A]
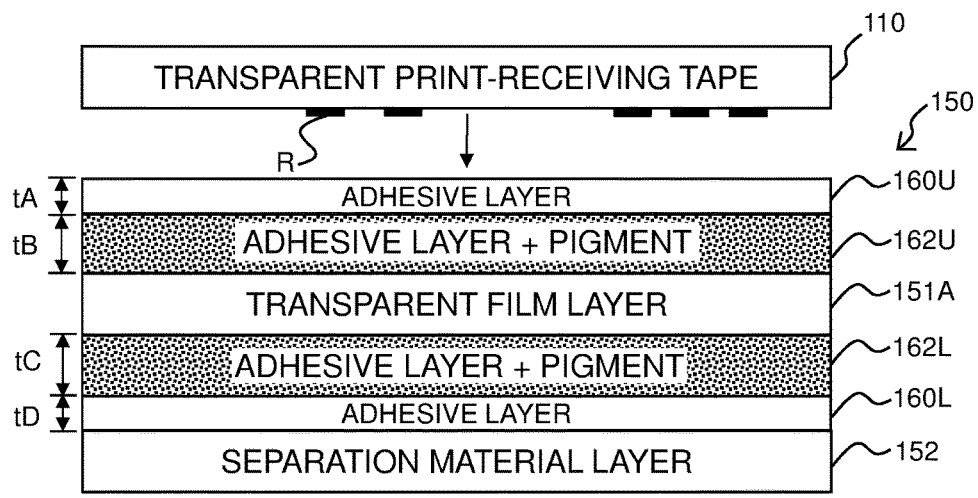
[FIG. 22B]
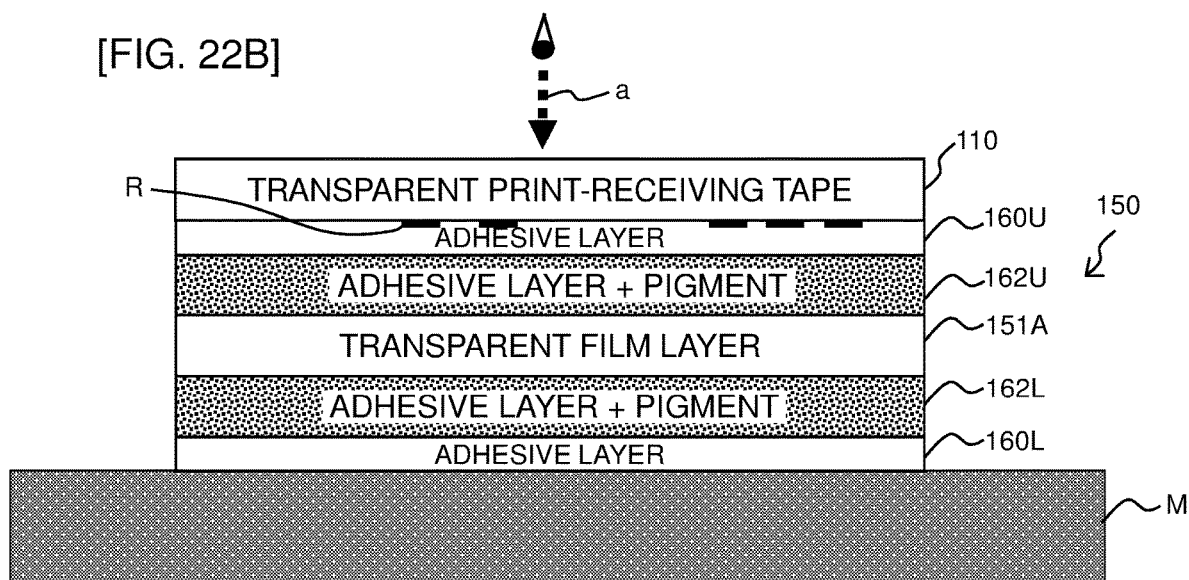

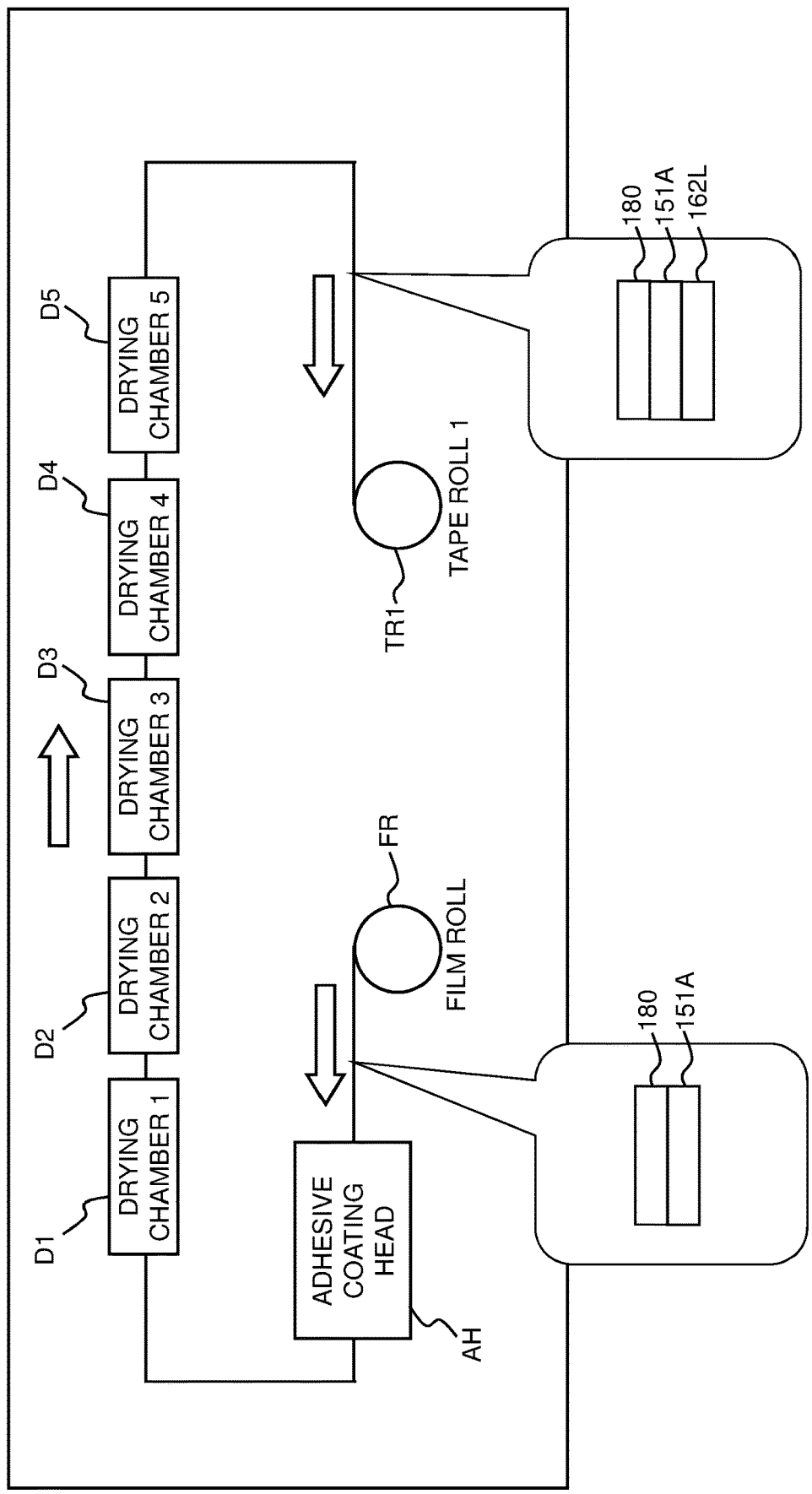

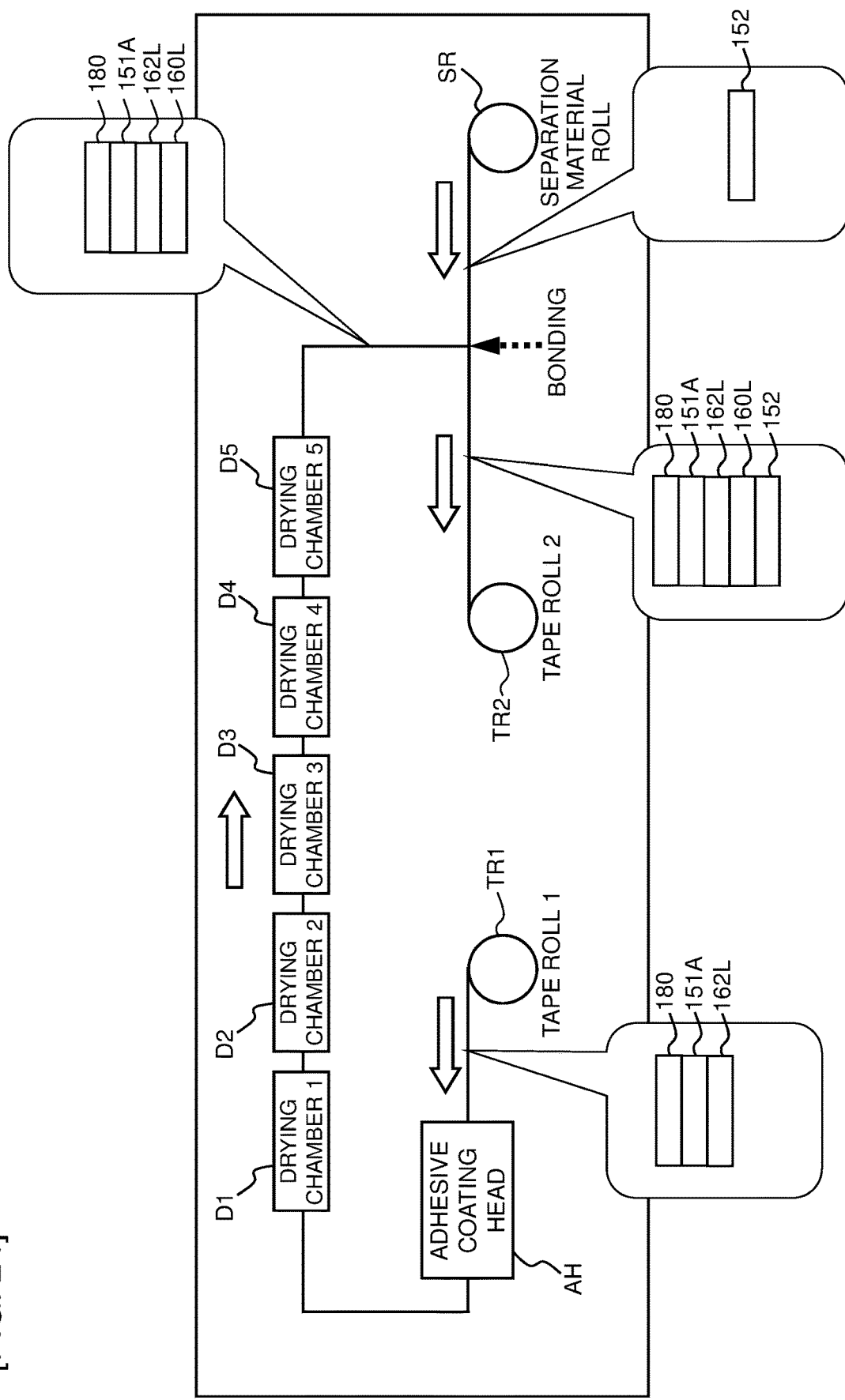
[FIG. 24]

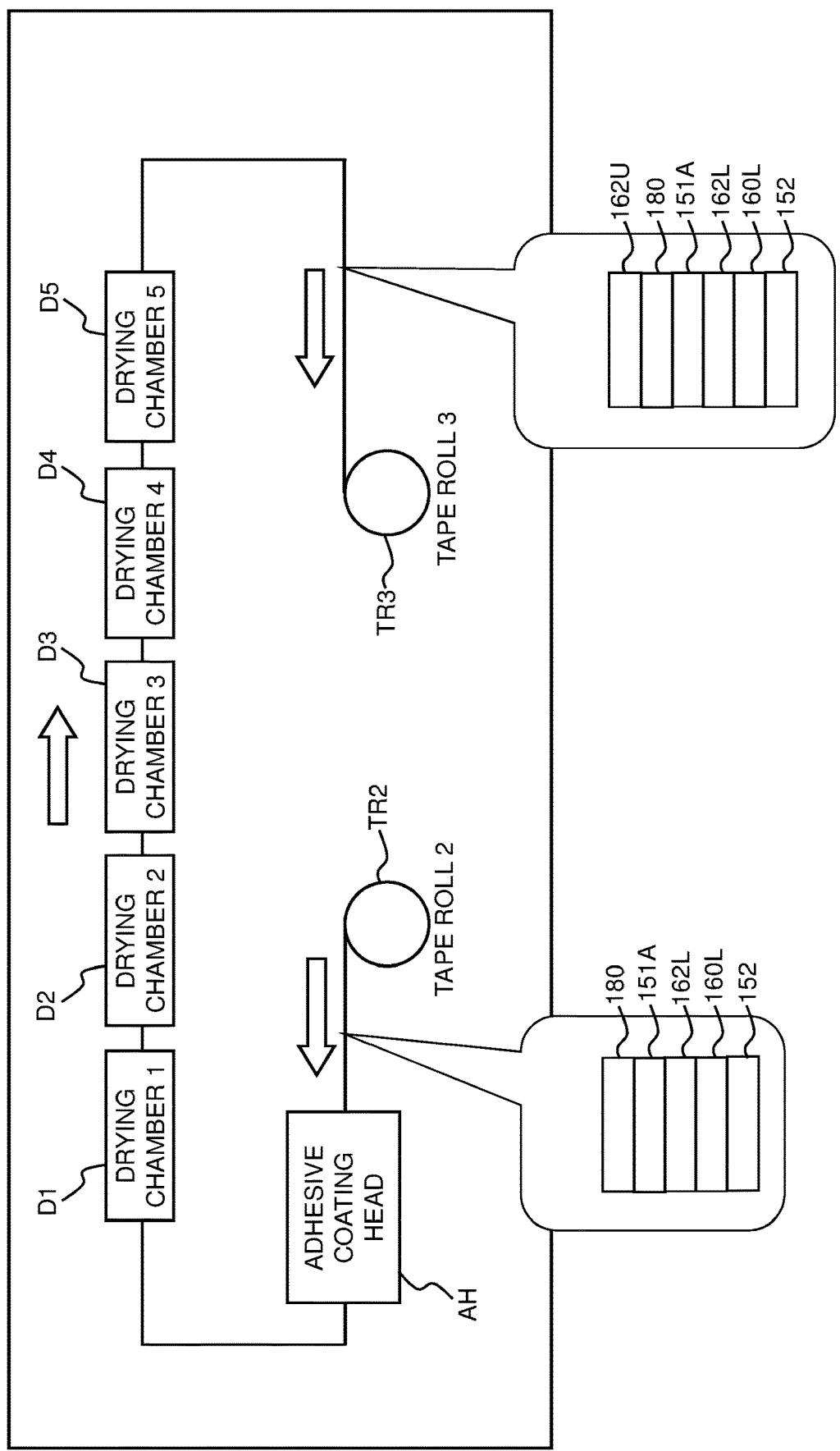

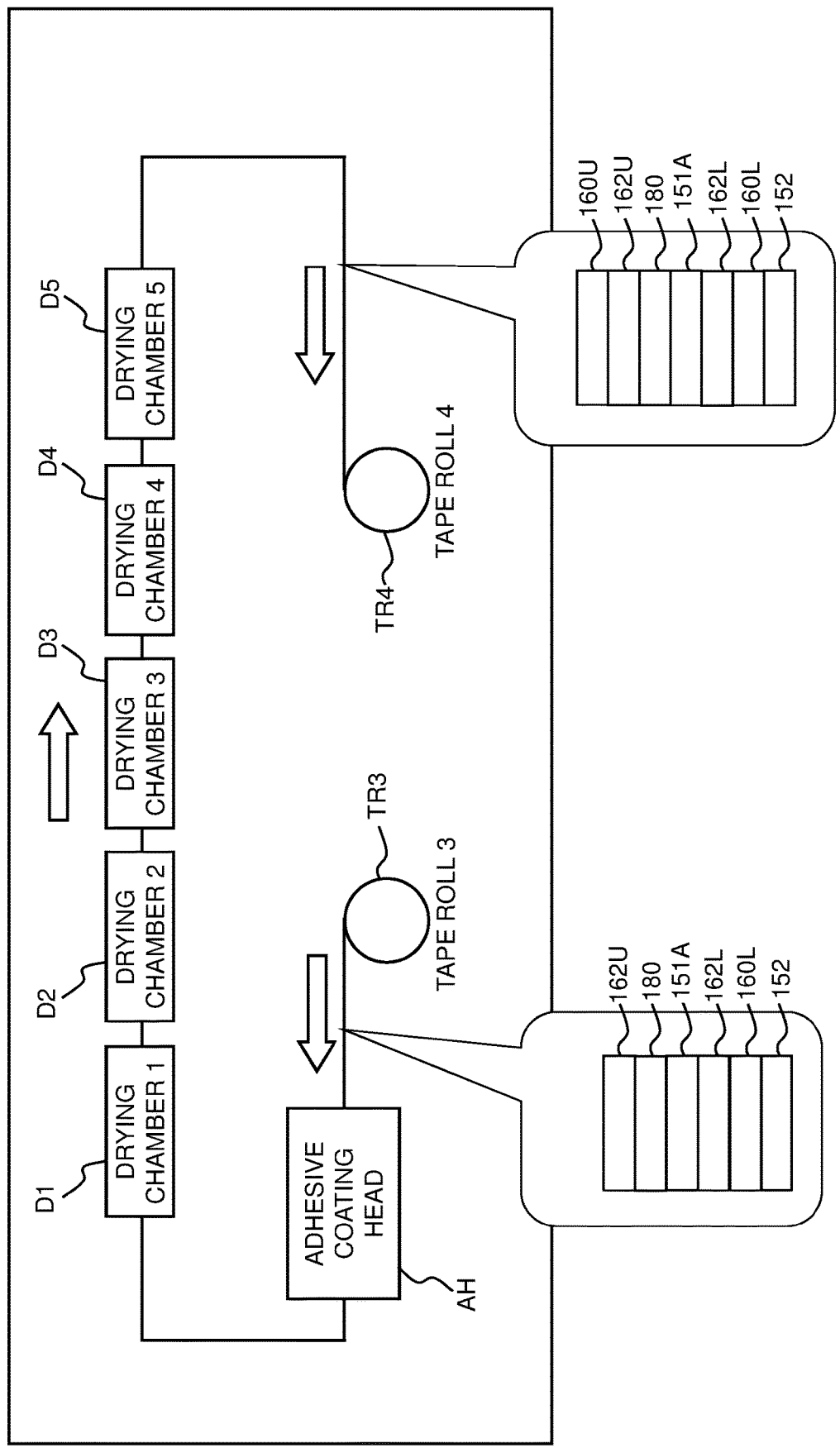
[FIG. 26]

[FIG. 27]
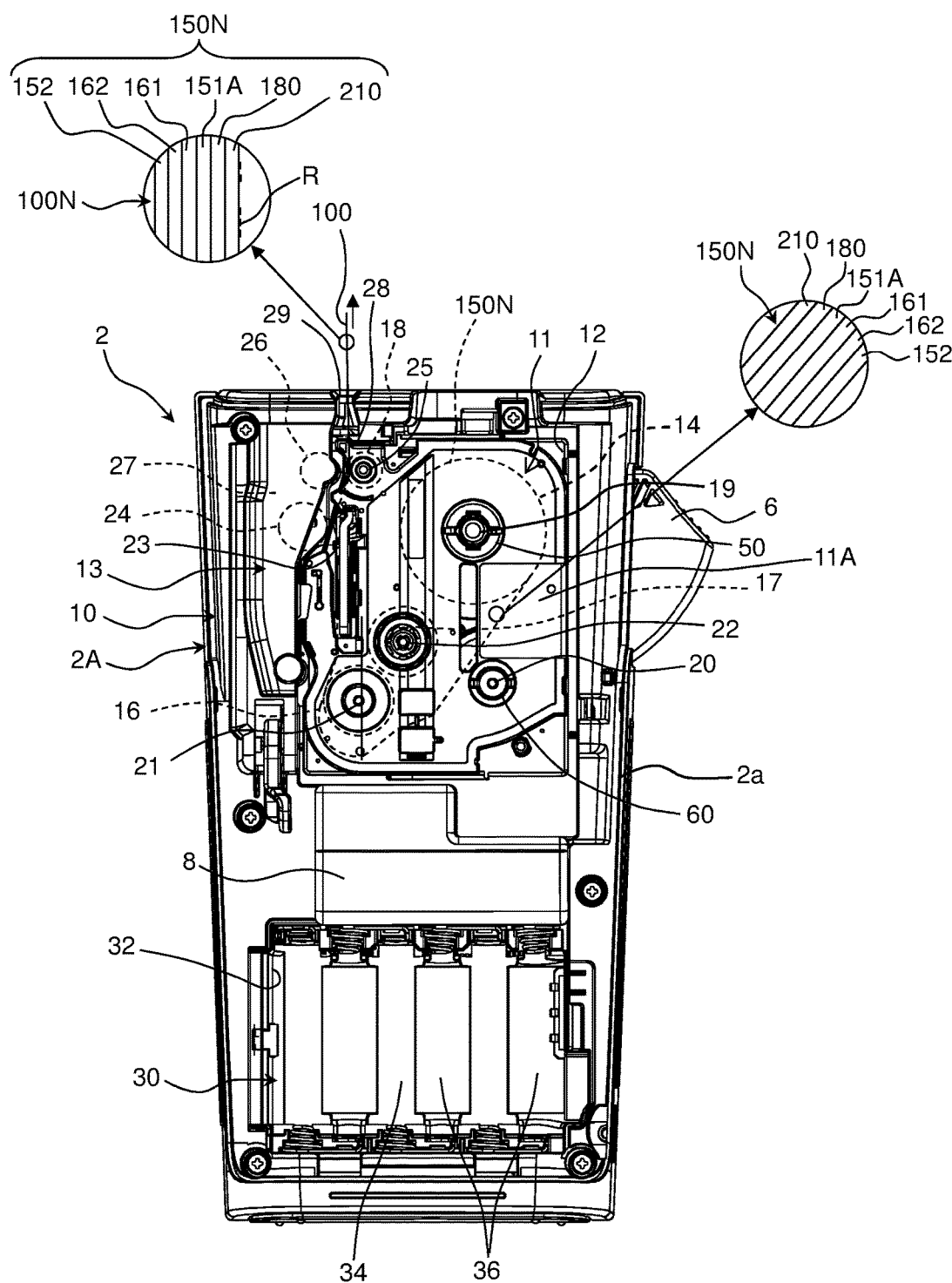

[FIG. 28A]
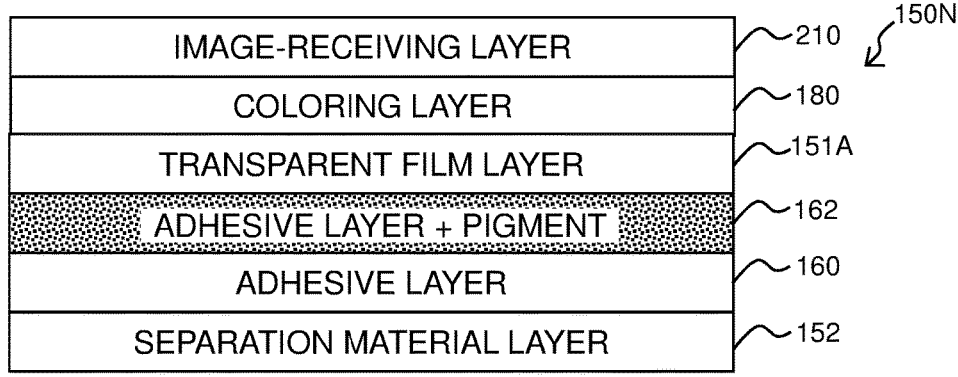
[FIG. 28B]
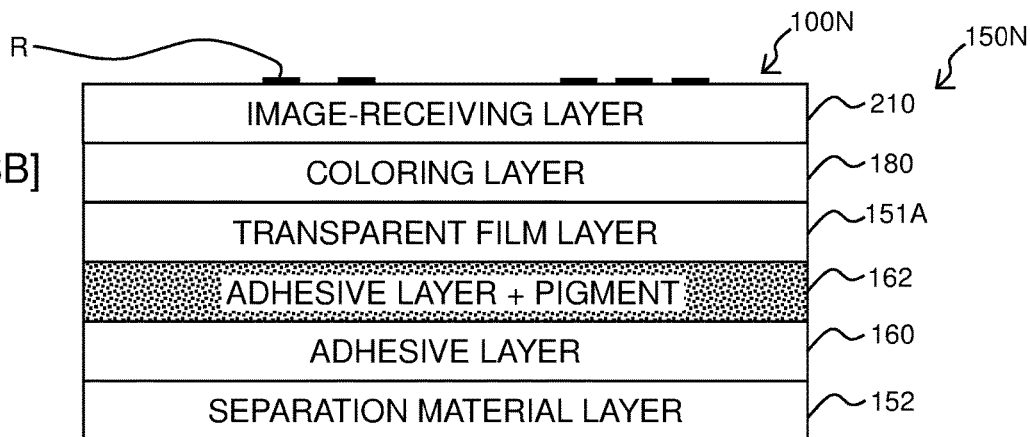
[FIG. 28C]
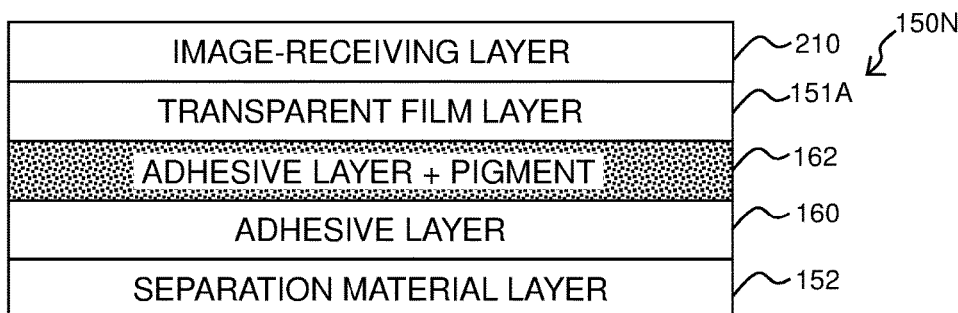
[FIG. 28D]
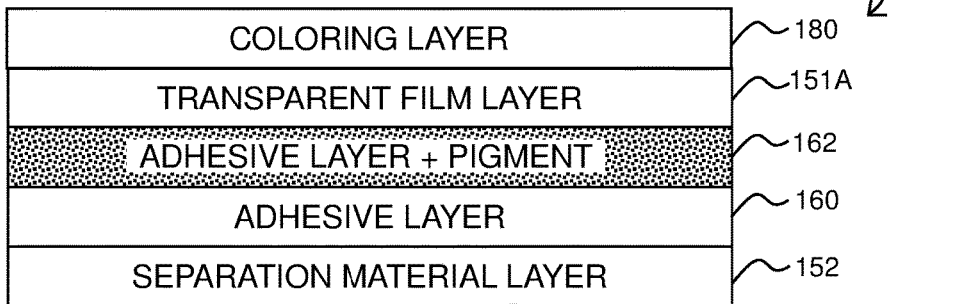

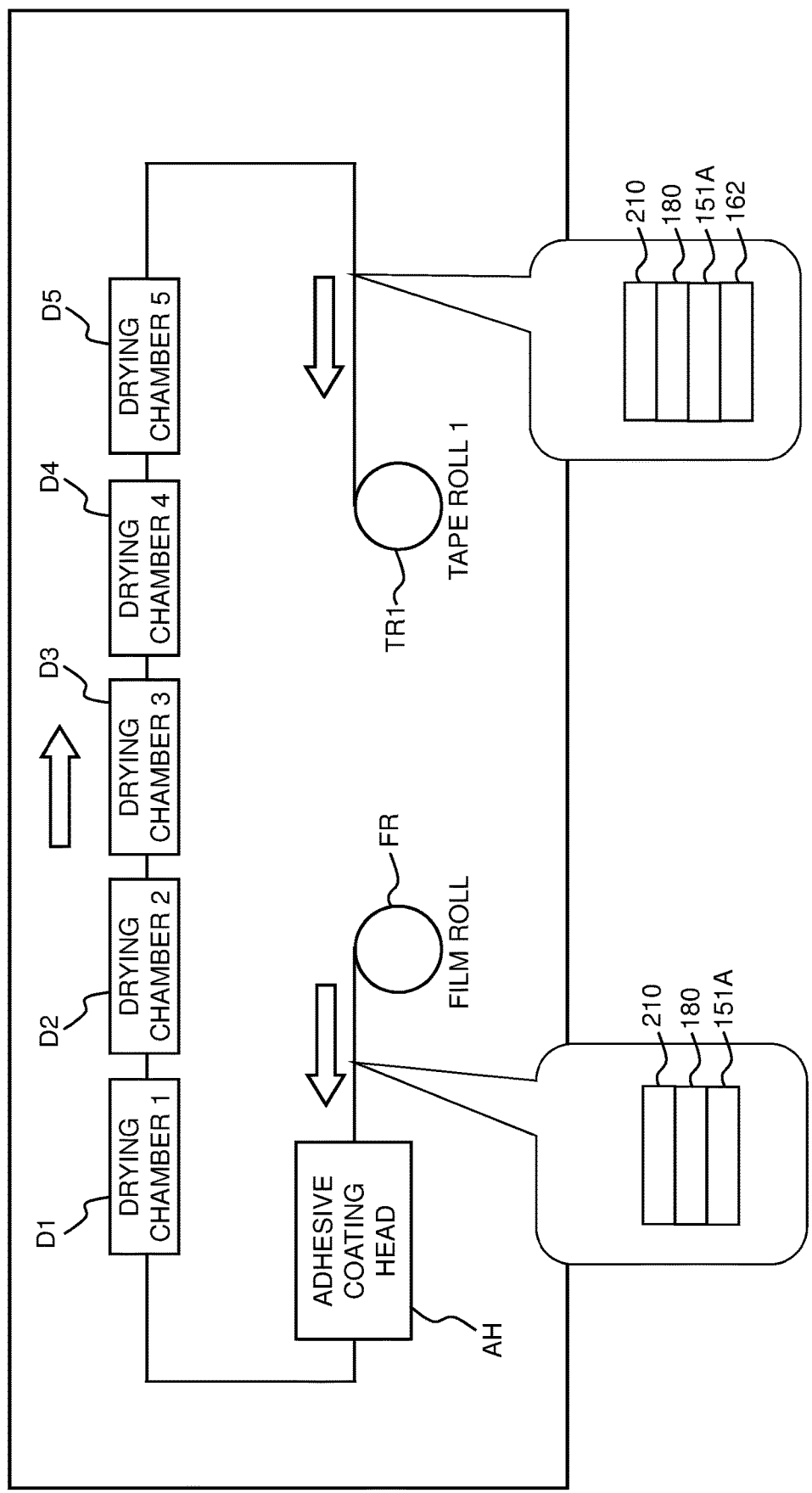
[FIG. 29]

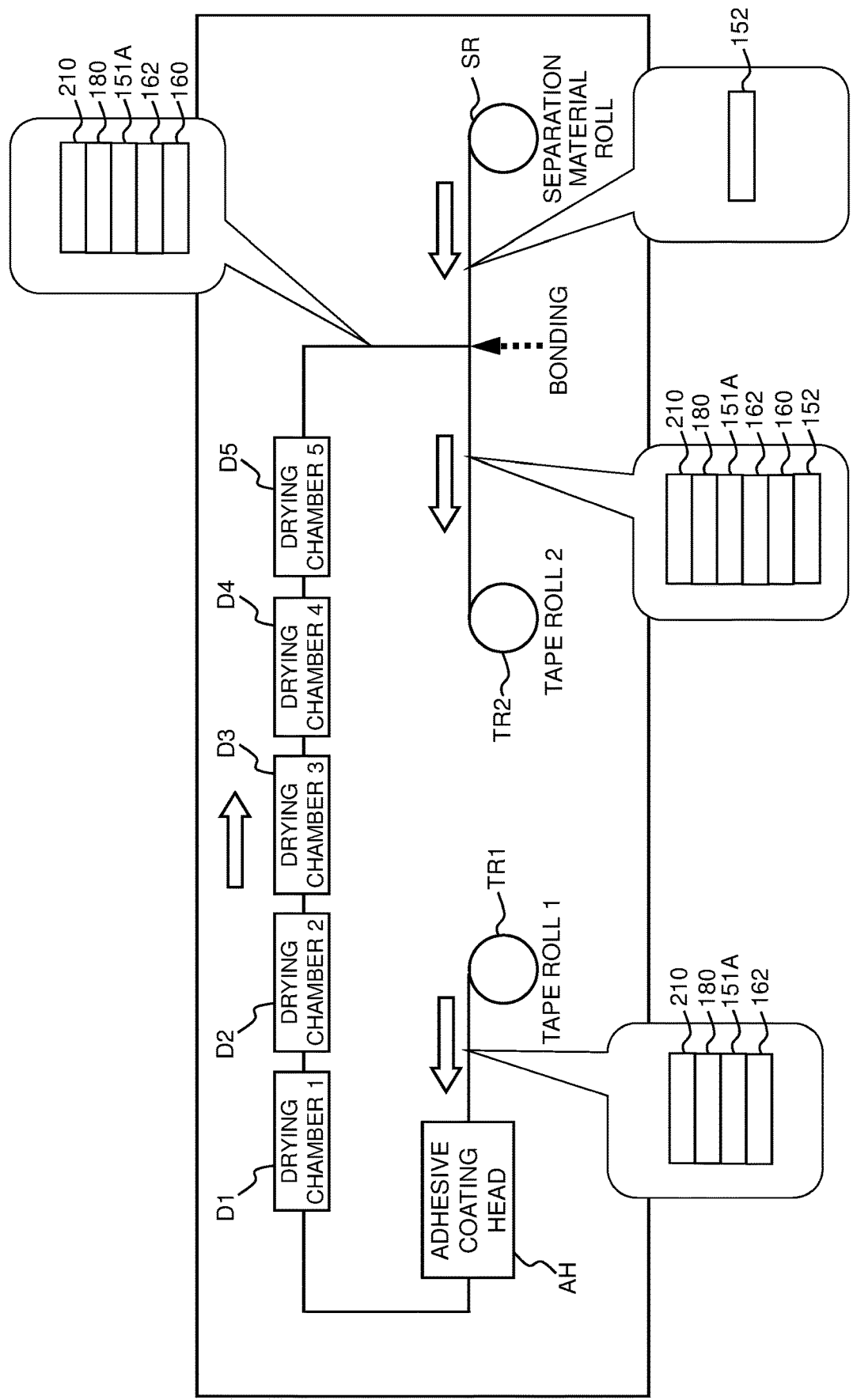
[FIG. 30]

[FIG. 31A]
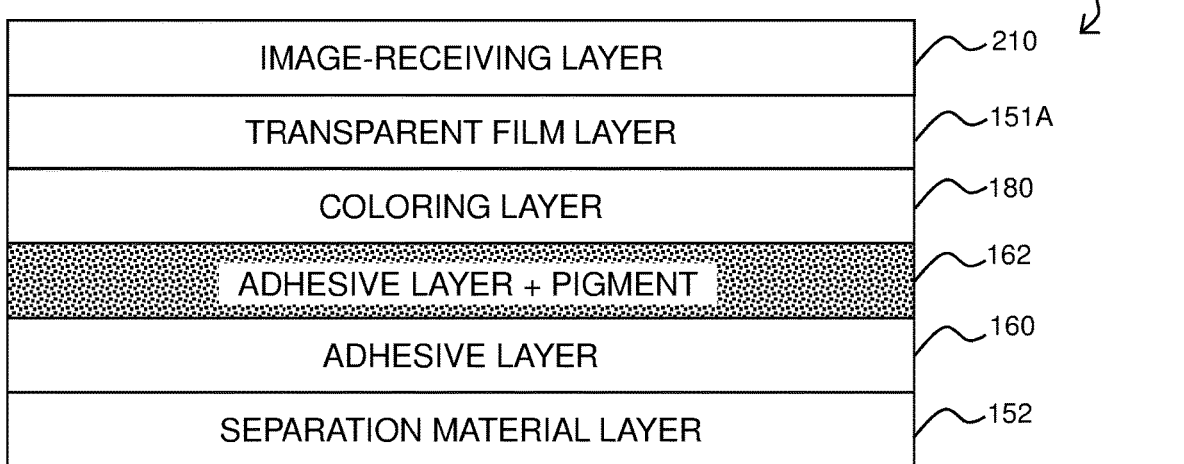
[FIG. 31B]
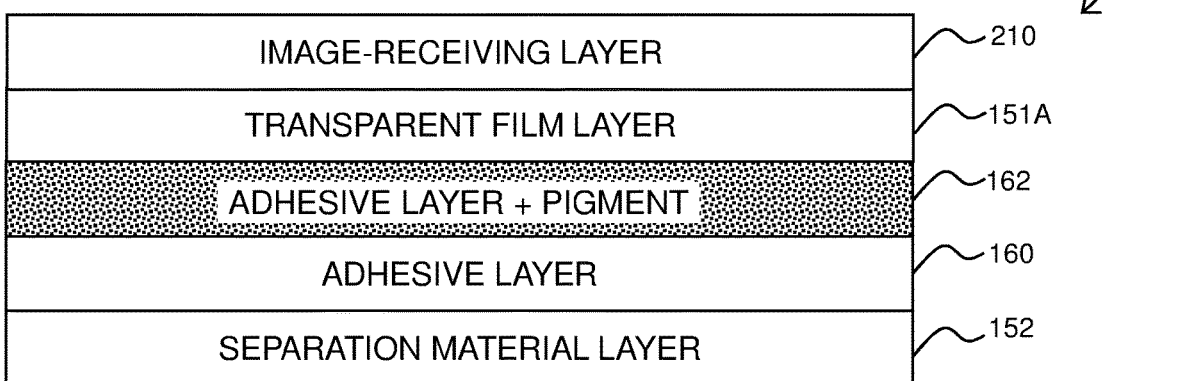
[FIG. 31C]
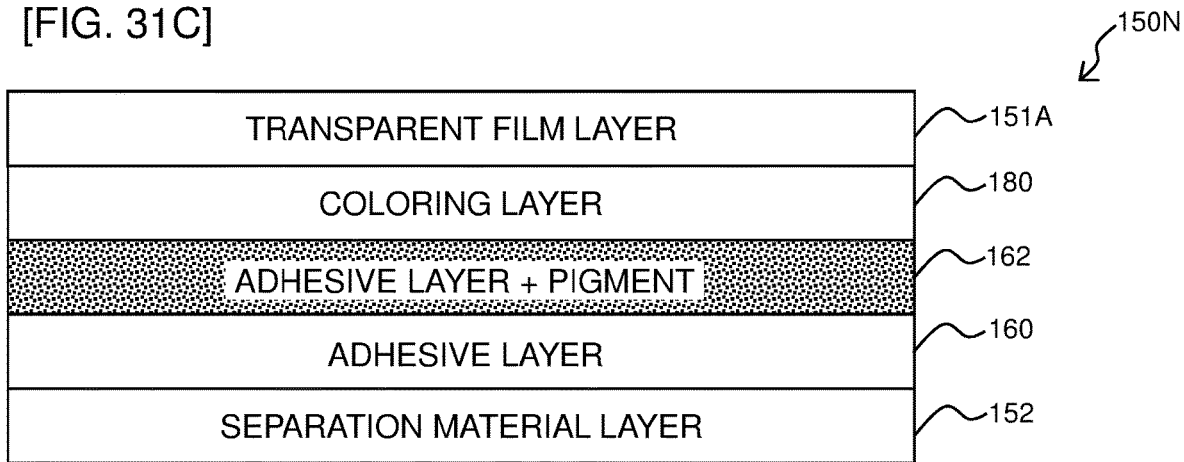

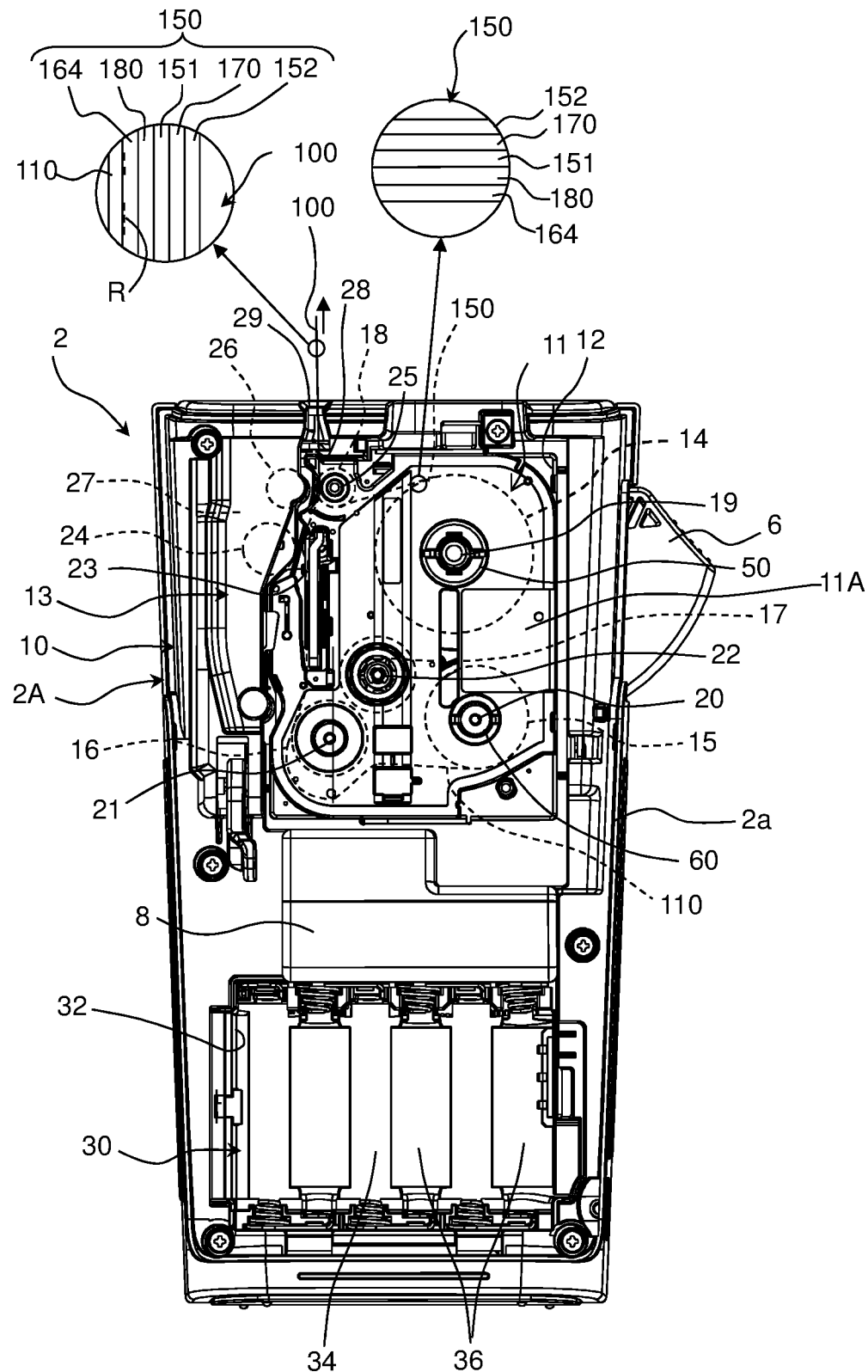
[FIG. 32]

[FIG. 33]
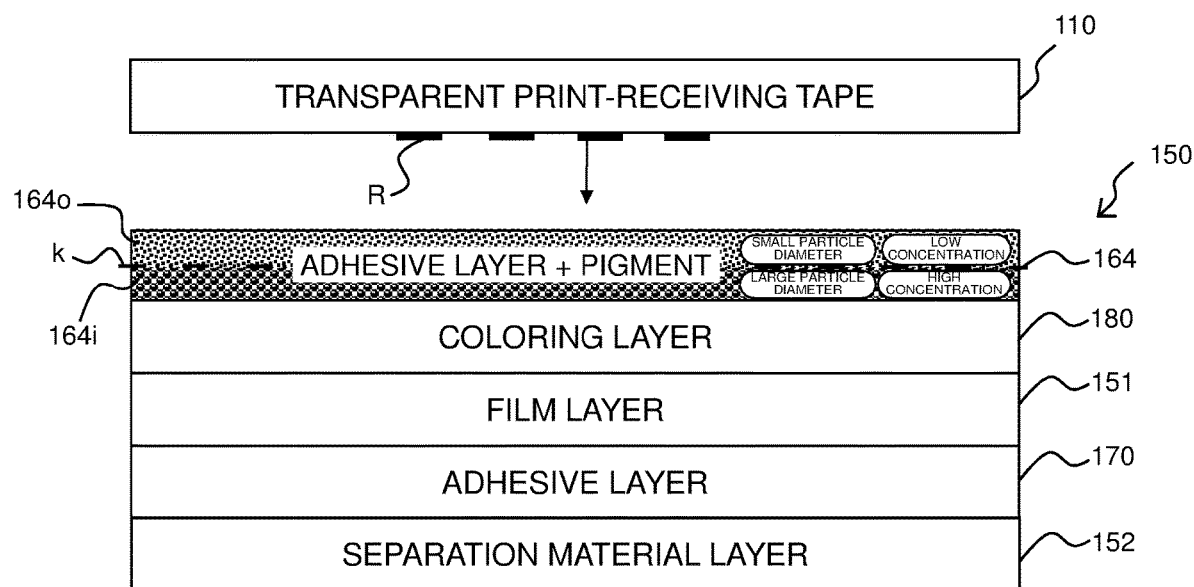

[FIG. 34A]
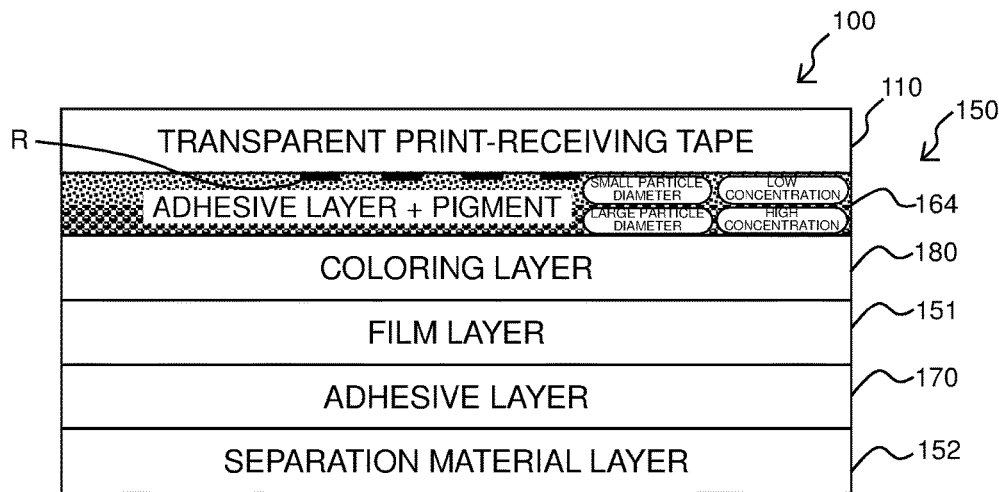
[FIG. 34B]
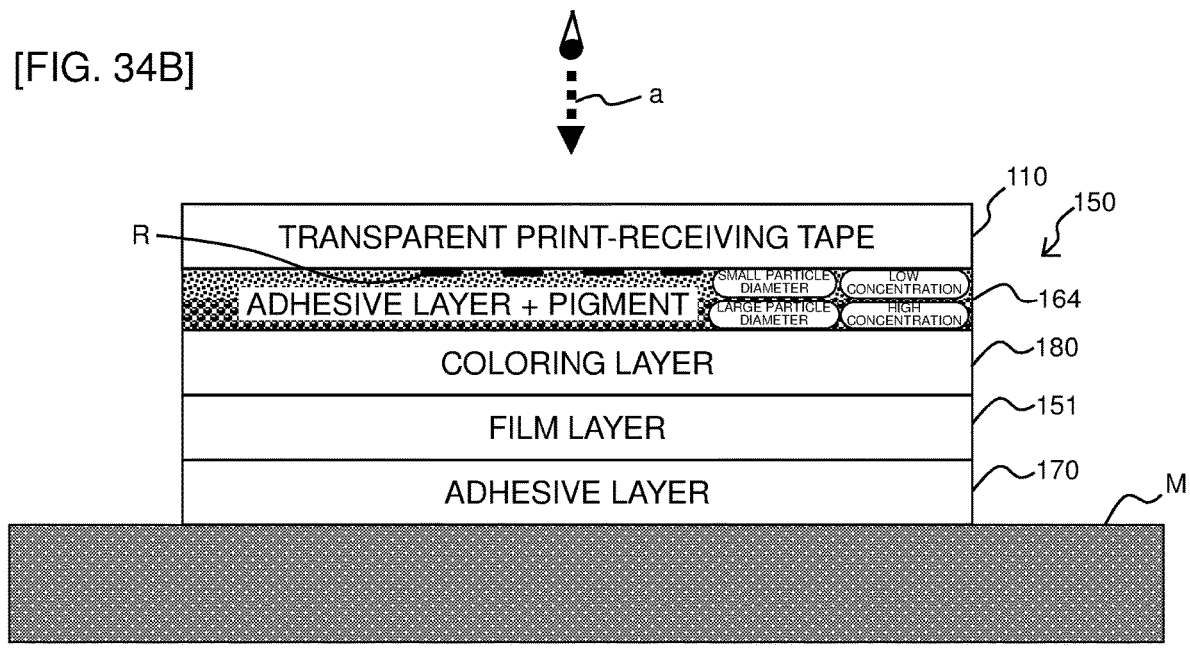

[FIG. 35A]
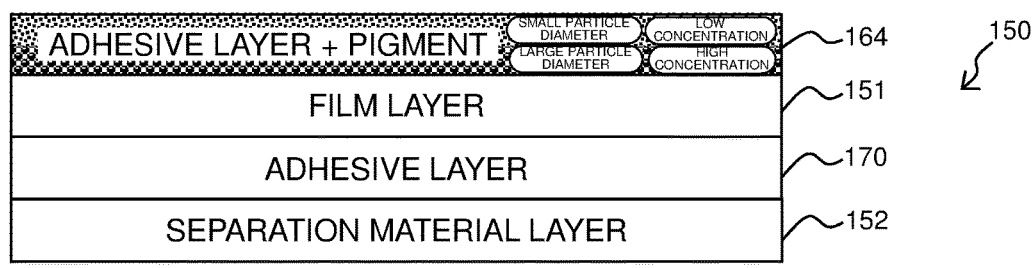
[FIG. 35B]
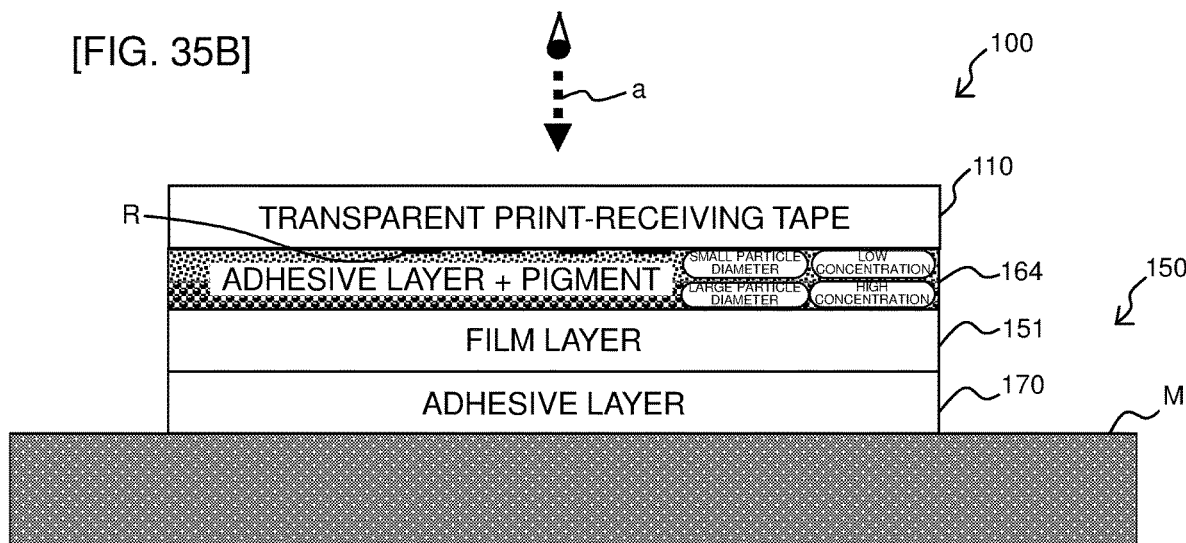

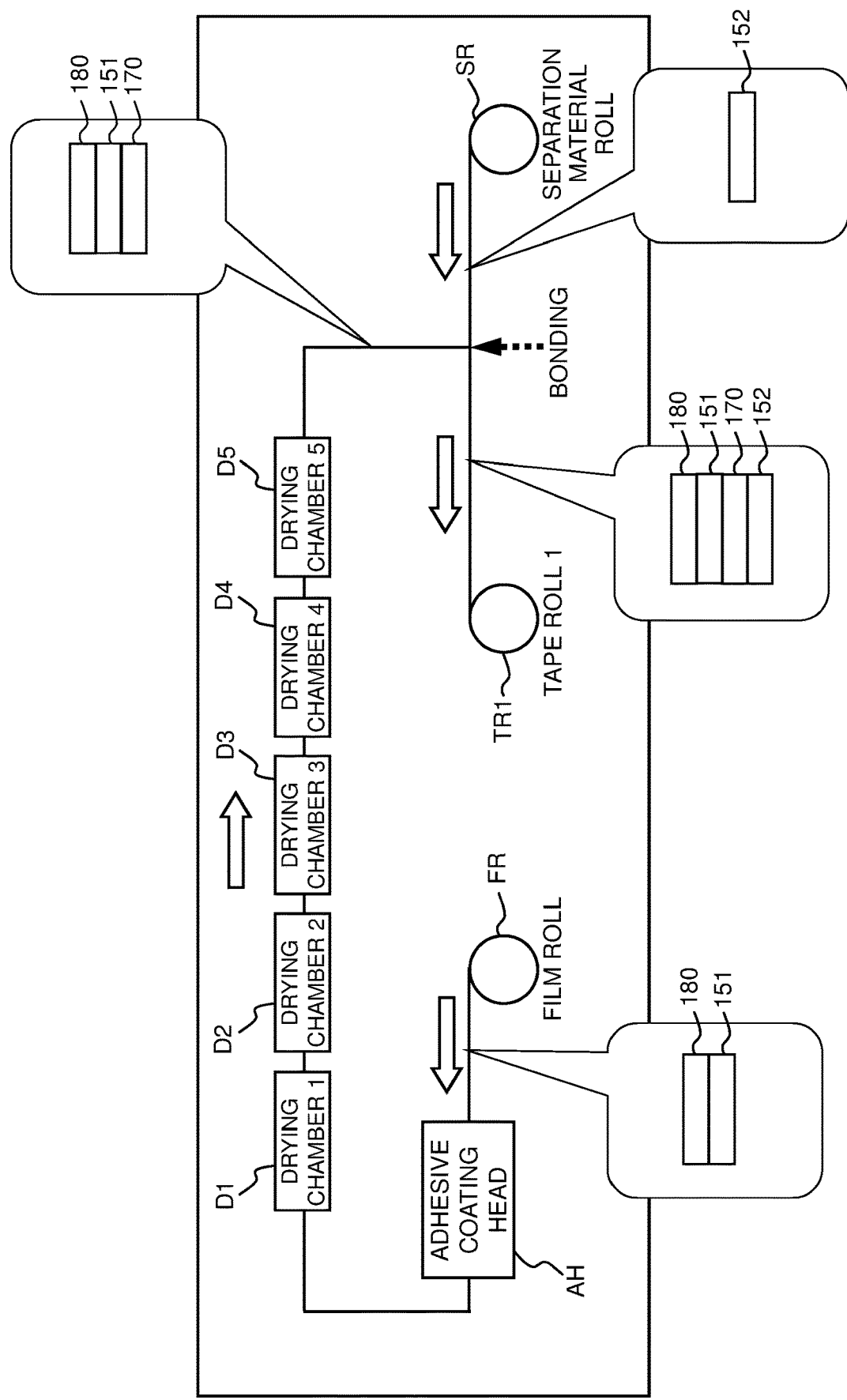
[FIG. 36]

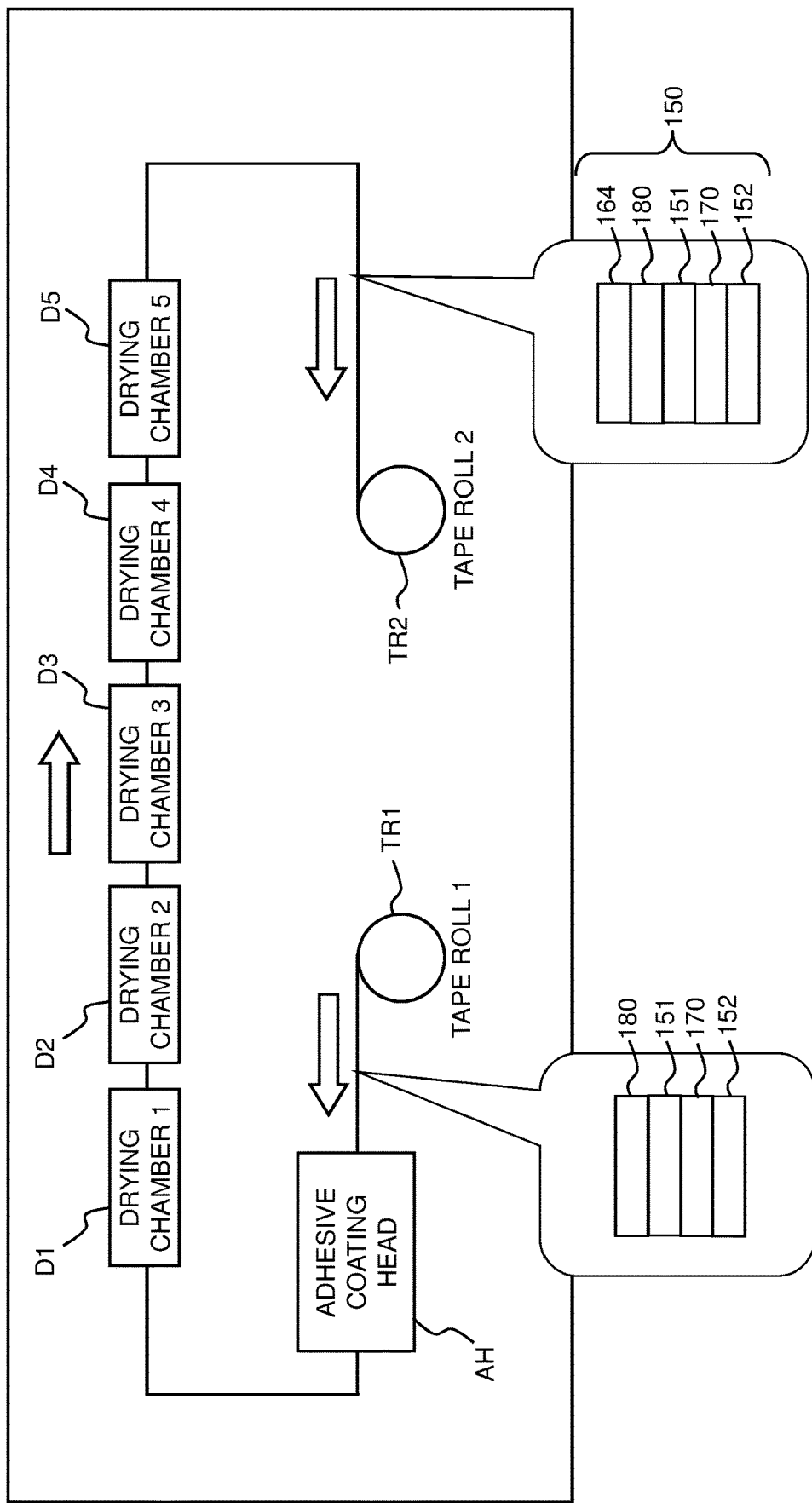
[FIG. 37]

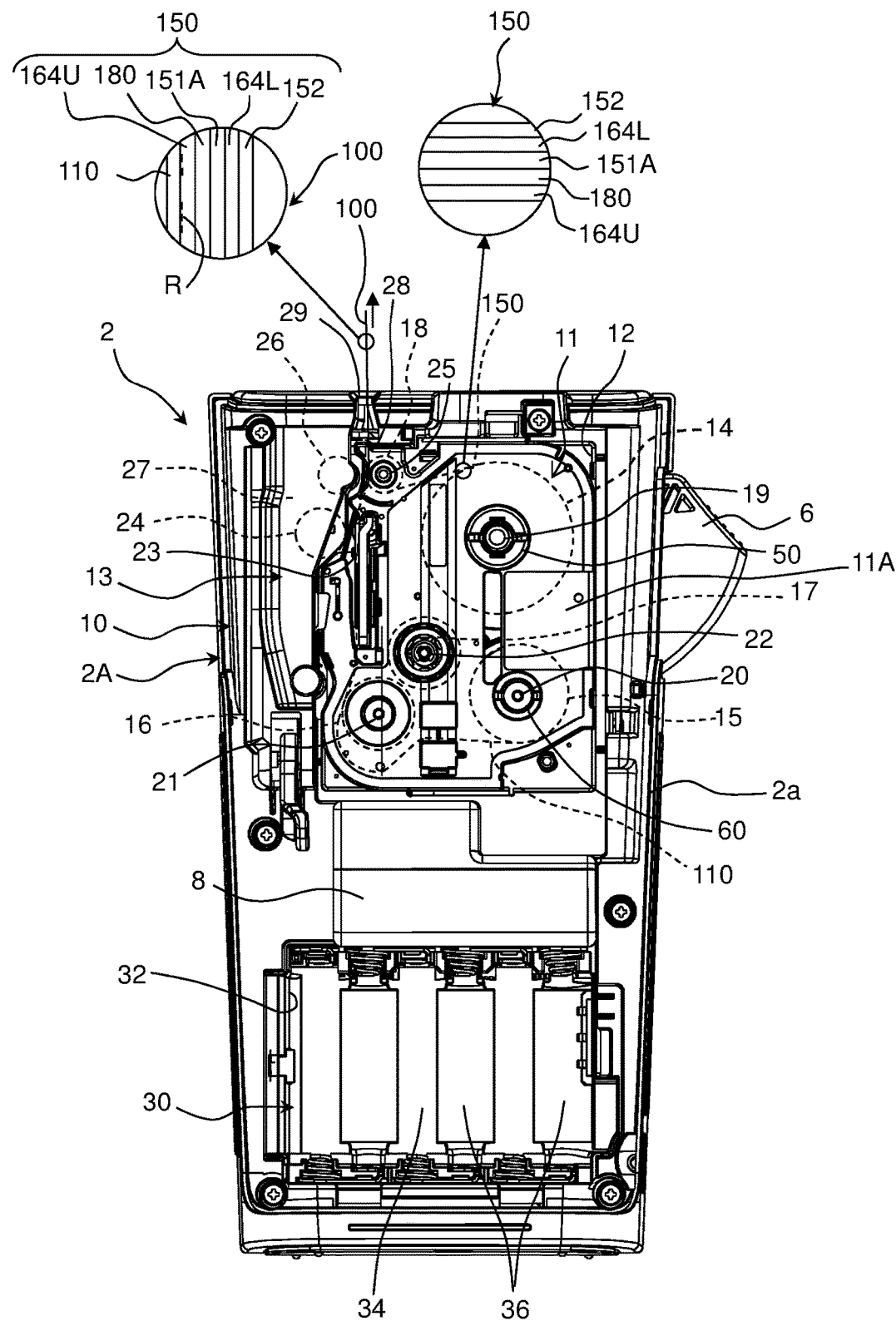
[FIG. 38]

[FIG. 39]
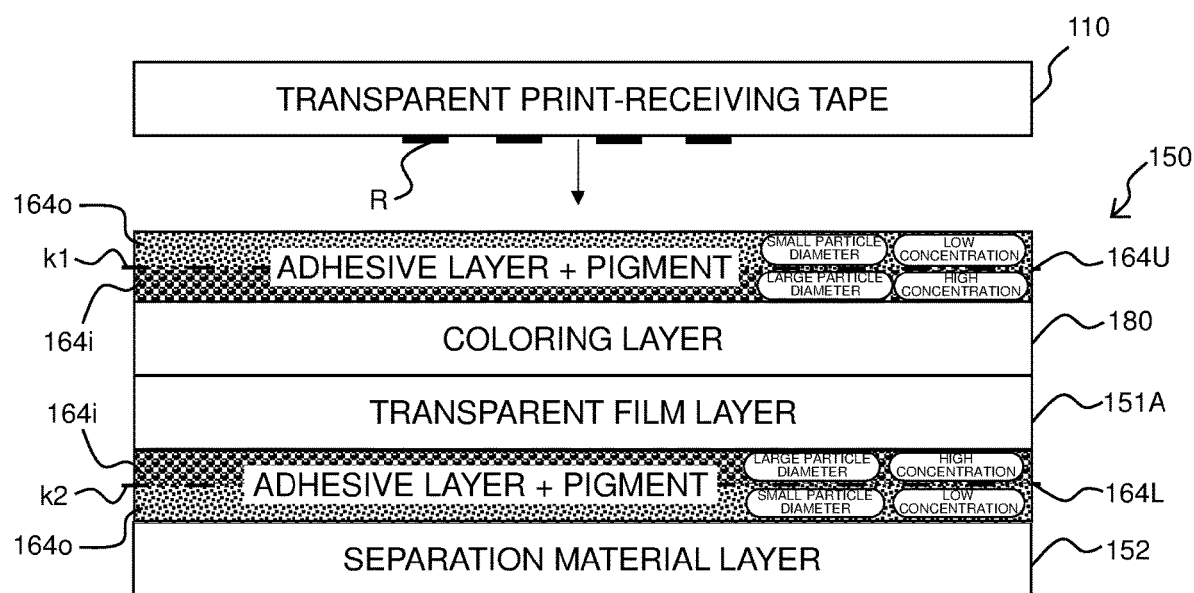

[FIG. 40A]
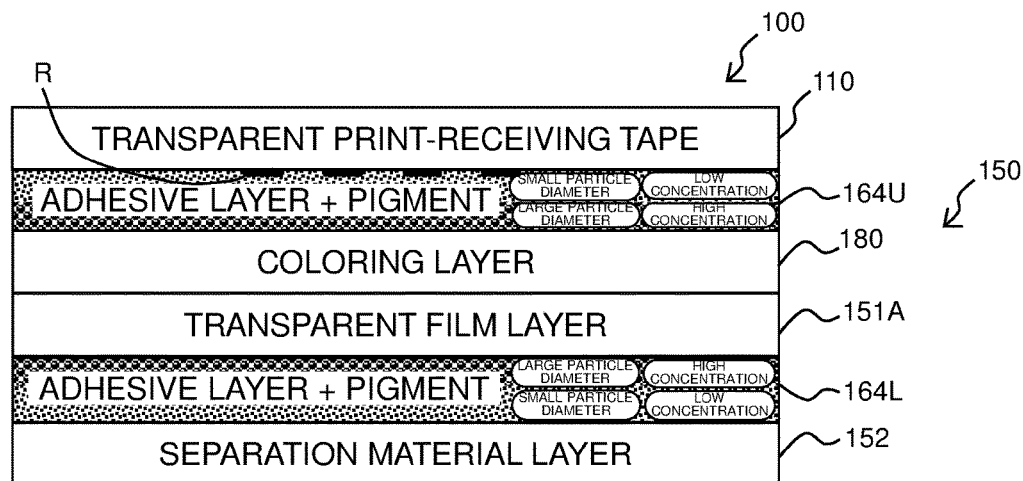
[FIG. 40B]
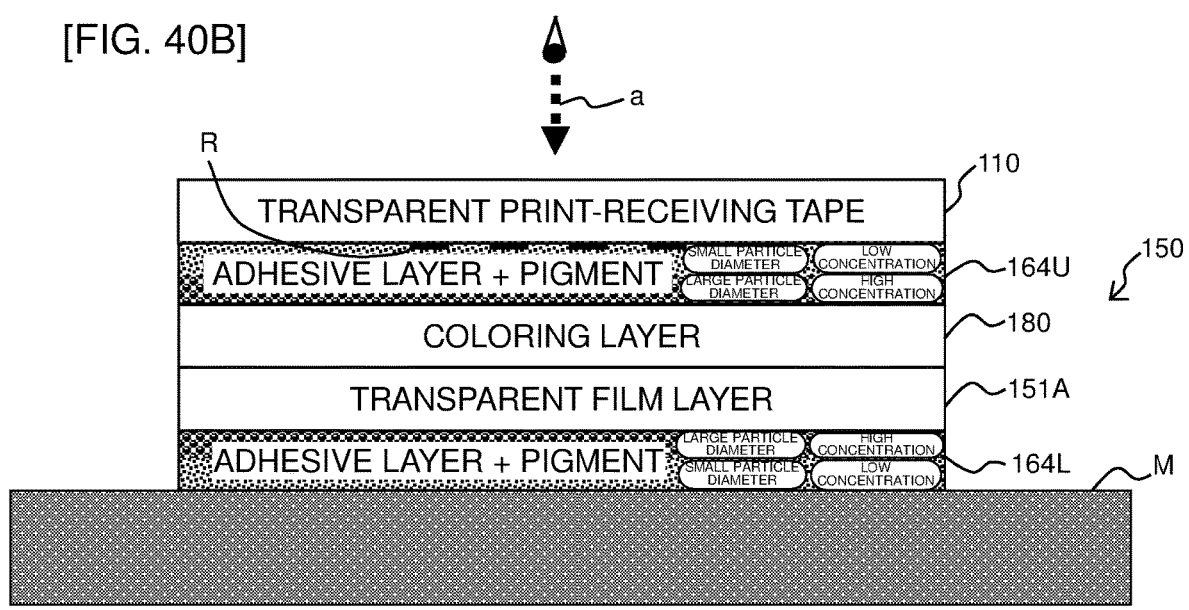

[FIG. 41A]
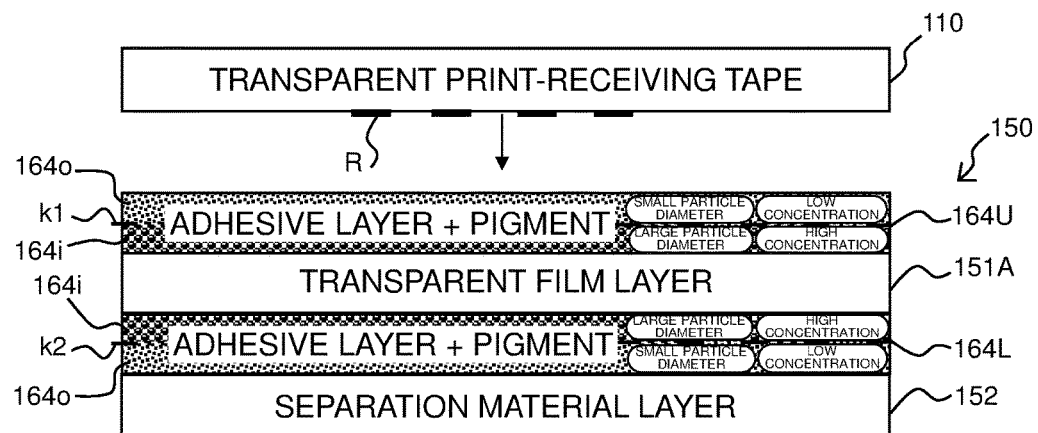
[FIG. 41B]
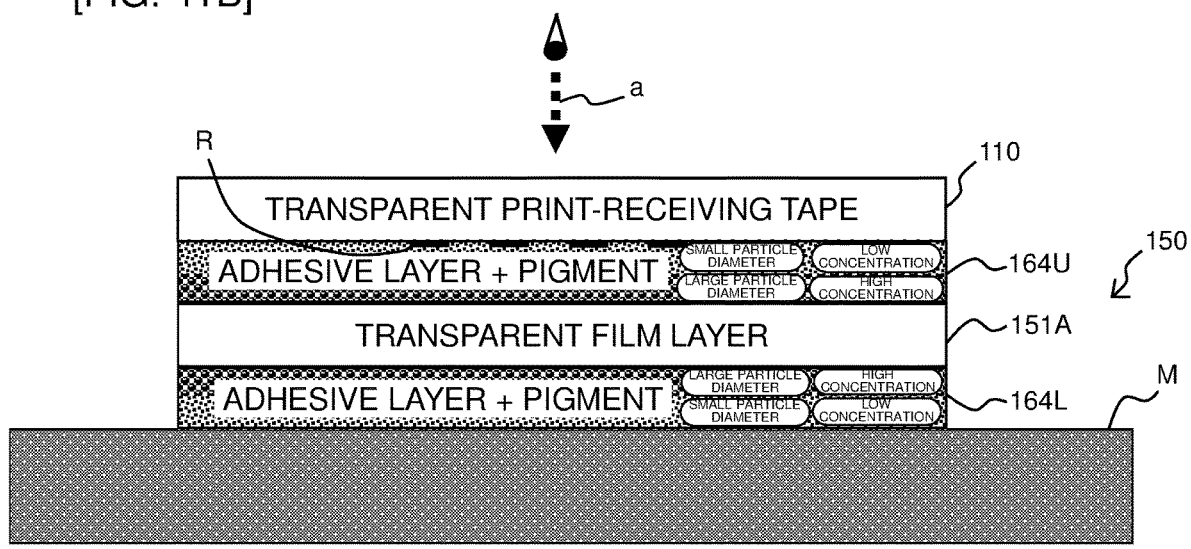

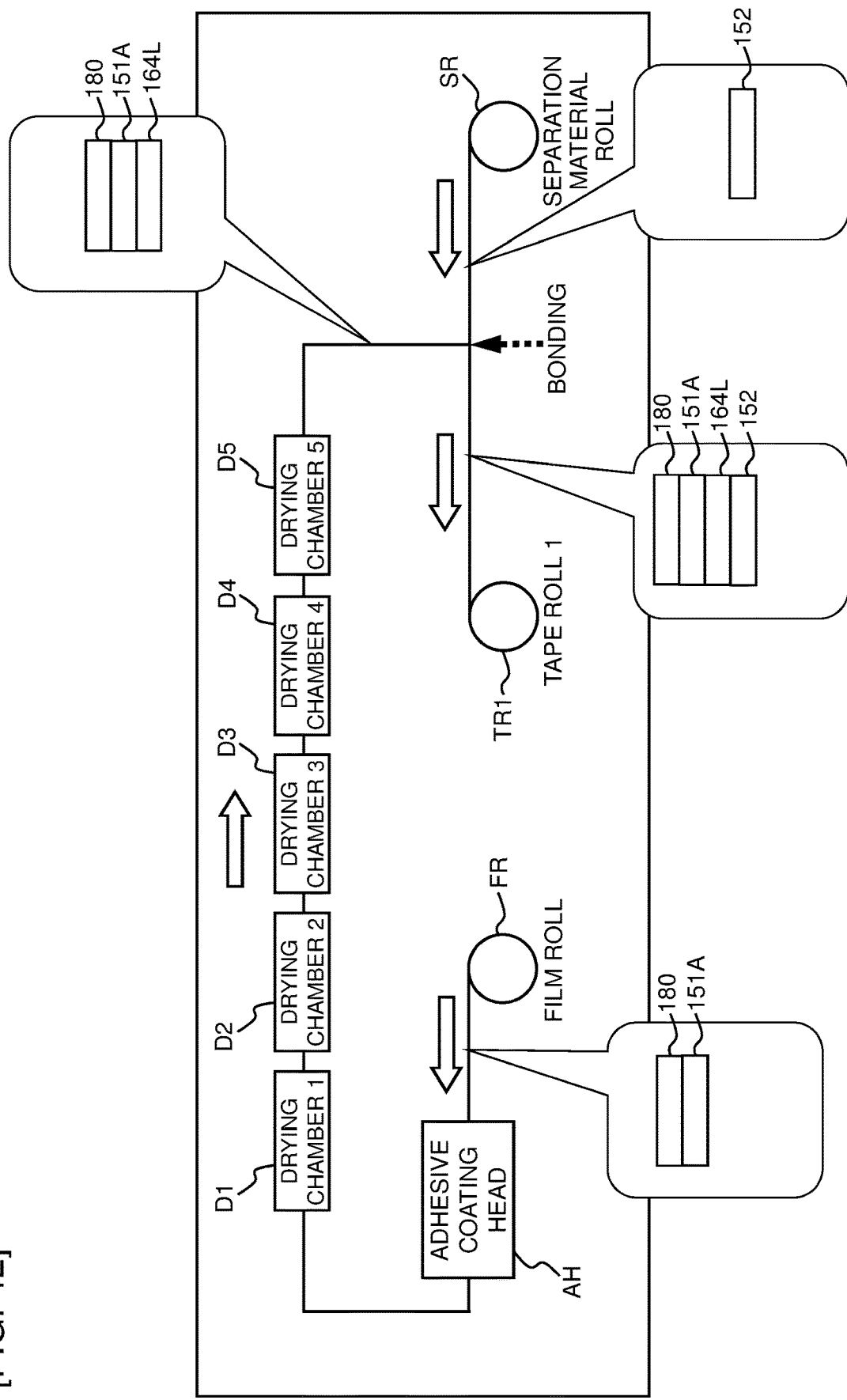
[FIG. 42]

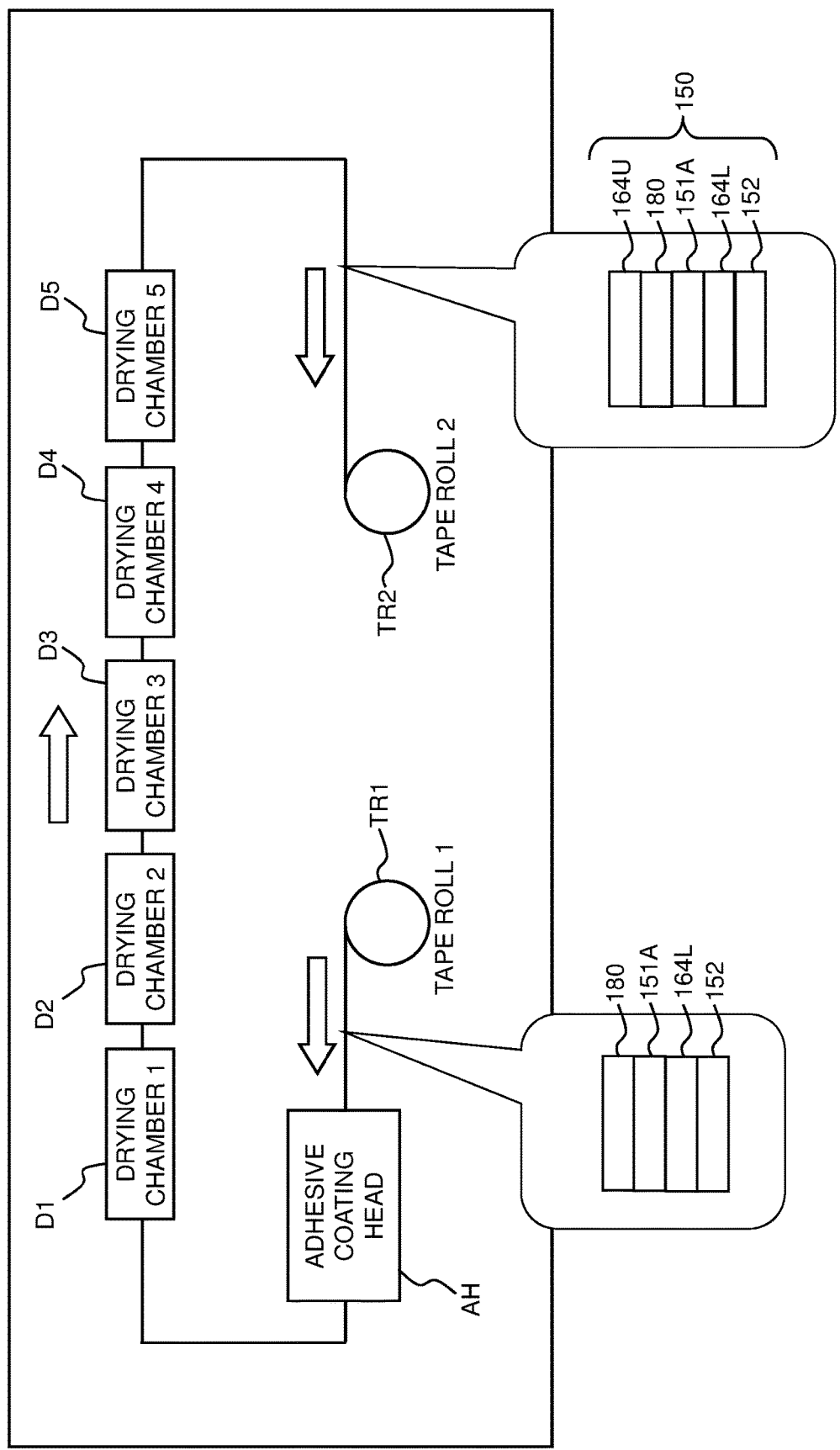

[FIG. 44]
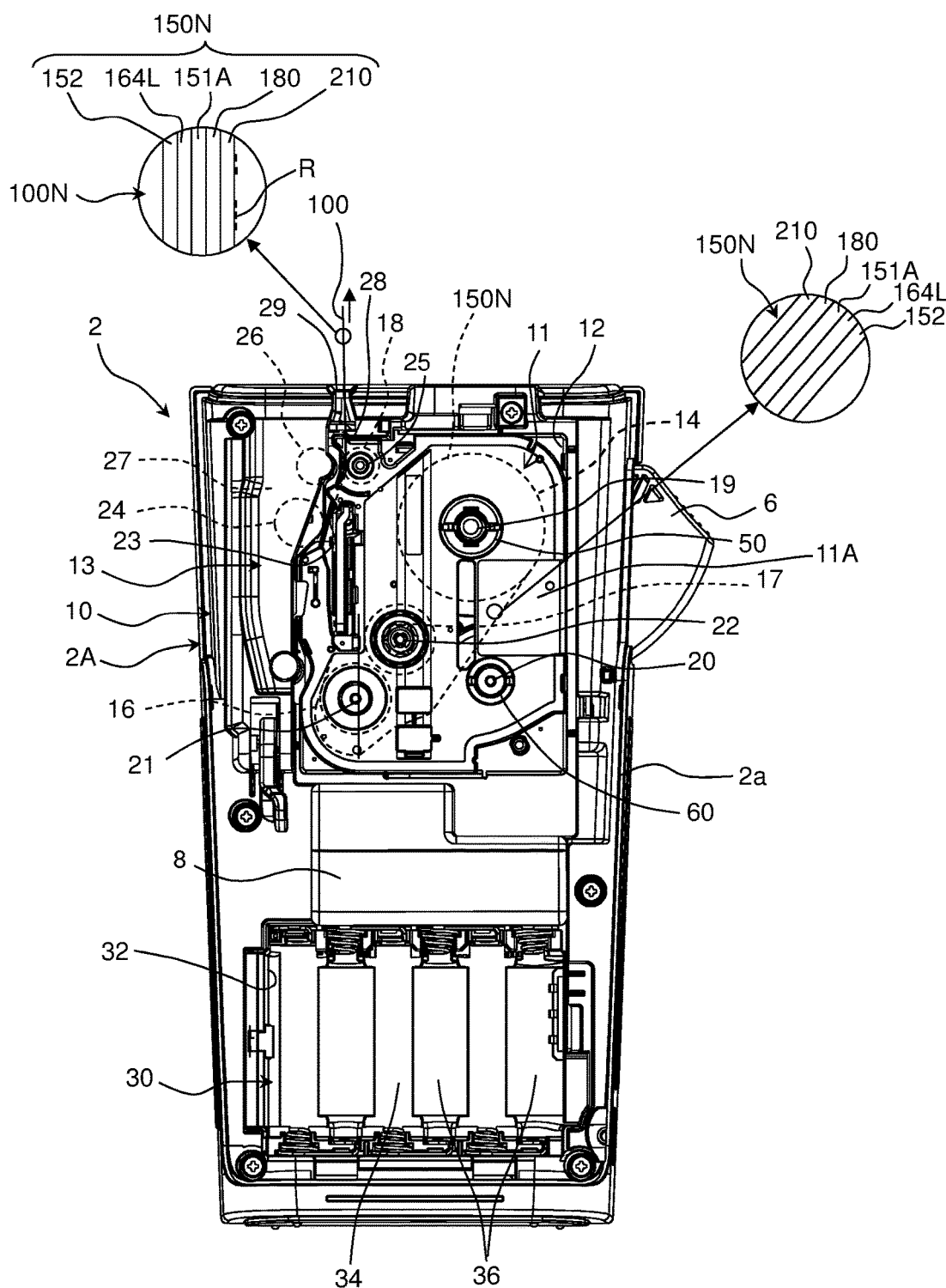

[FIG. 45A]
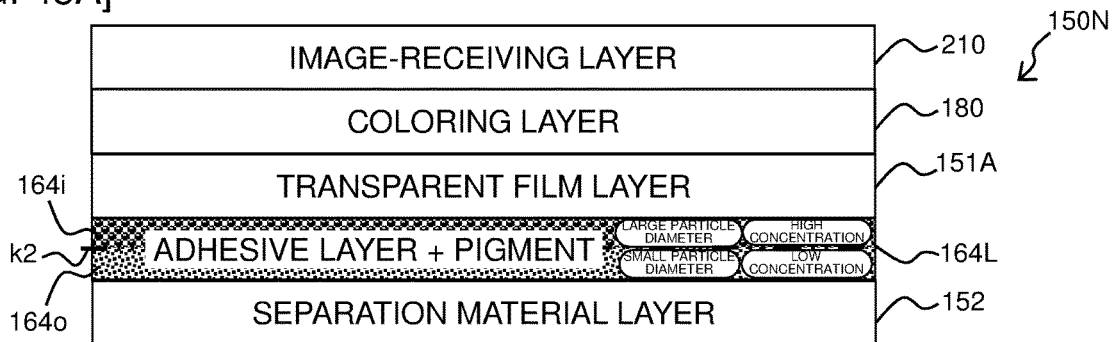
[FIG. 45B]
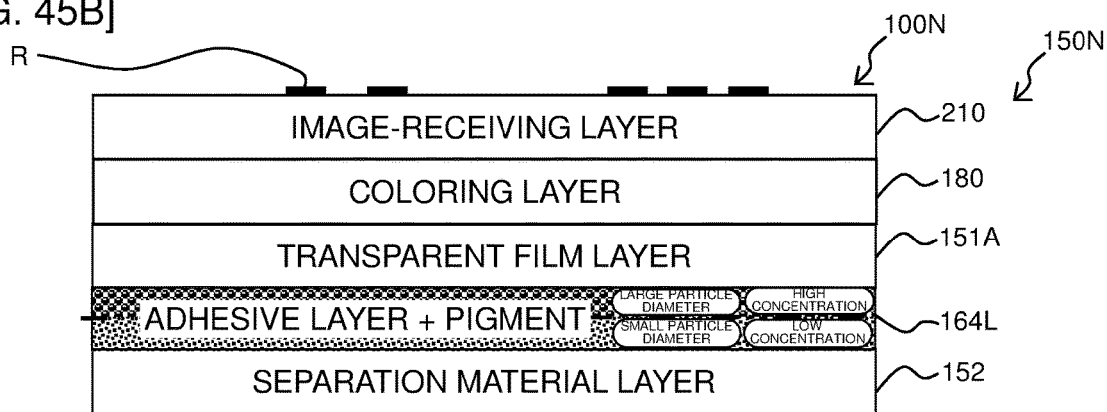
[FIG. 45C]
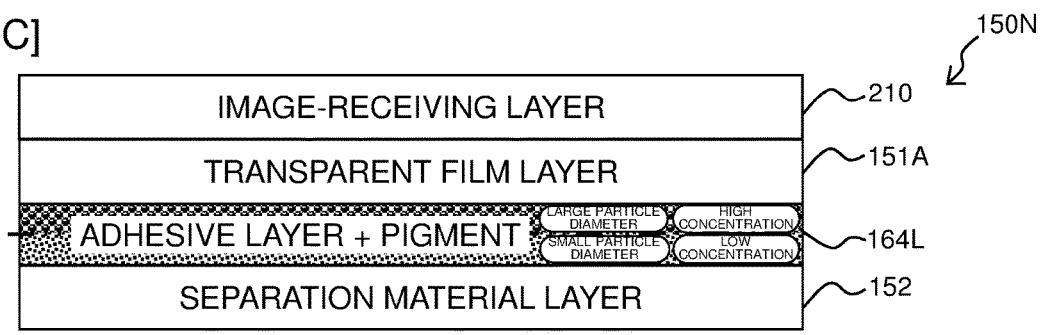
[FIG. 45D]
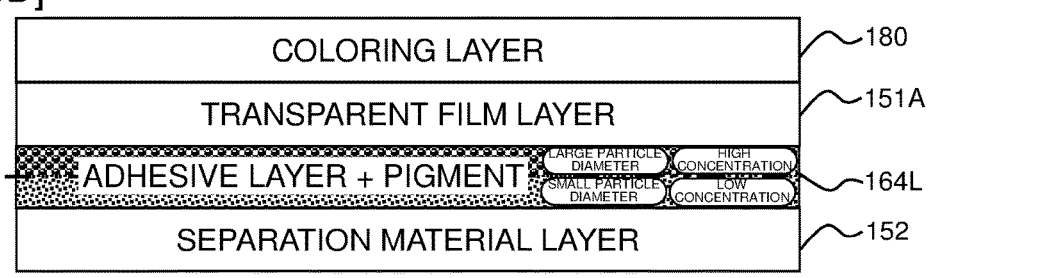

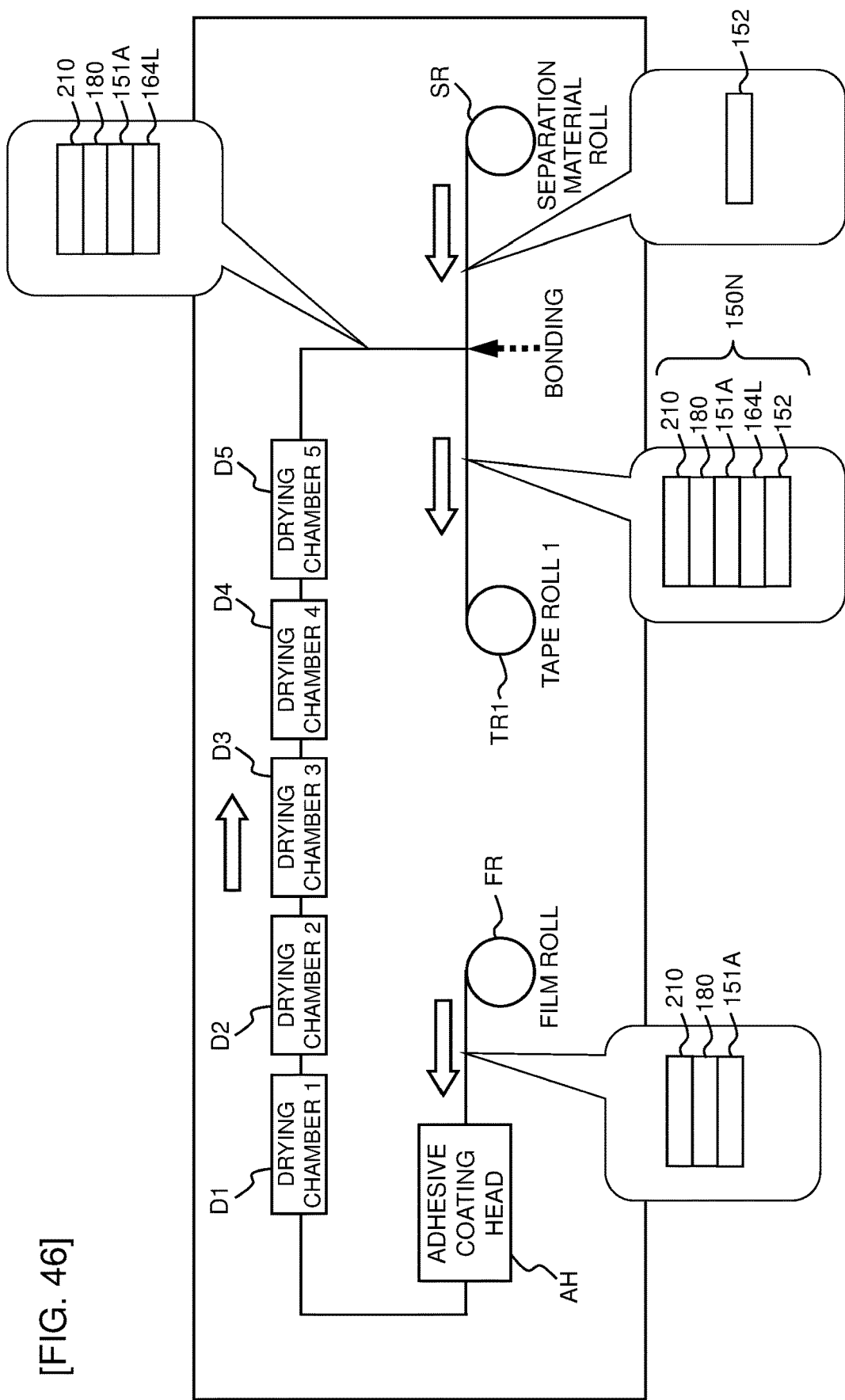
[FIG. 46]

[FIG. 47A]
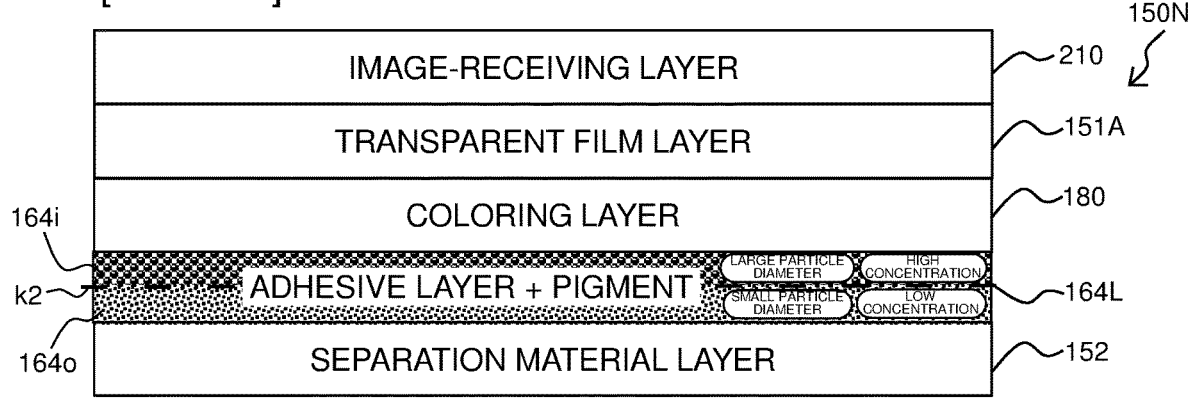
[FIG. 47B]
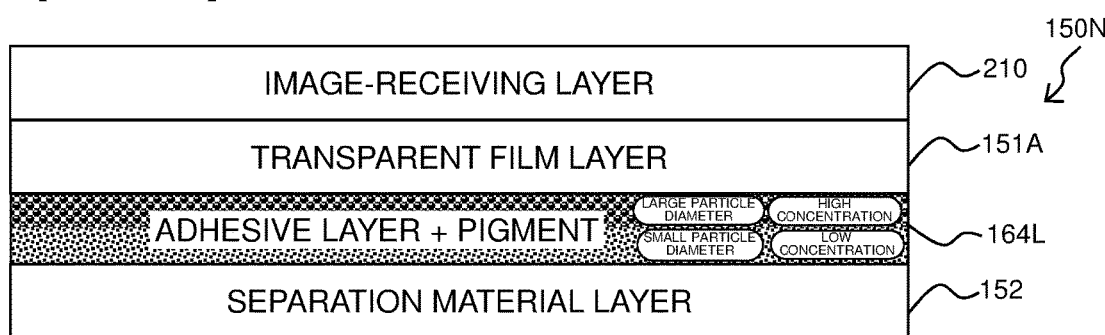
[FIG. 47C]
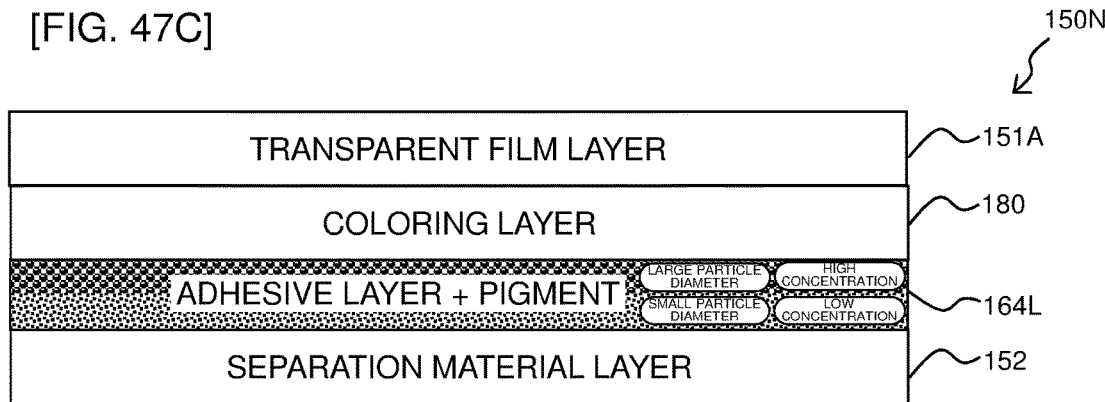

ADHESIVE TAPE CARTRIDGE, ADHESIVE TAPE ROLL, PRODUCTION METHOD FOR ADHESIVE TAPE ROLL, AND PRINTER HAVING CARTRIDGE

CROSS-REFERENCE TO RELATED APPLICATION

The present application claims priority from Japanese Patent Application No. 2016-195288, which was filed on Sep. 30, 2016, the disclosure of which is incorporated herein by reference in its entirety.

BACKGROUND

Field

The present disclosure relates to an adhesive tape cartridge including an adhesive tape roll that has an adhesive tape wound therein, the adhesive tape roll, a production method for the adhesive tape roll, and a printer including a cartridge.

Description of the Related Art

An adhesive tape cartridge including an adhesive tape roll that has an adhesive tape wound therein is already known. In the prior art, the adhesive tape has a layer structure that includes two adhesive layers (a first adhesive layer as a bonding adhesive layer and a second adhesive layer as an affixing adhesive layer) sandwiching a base film therebetween, and a separation material layer (a separation sheet).

It can be considered for the layer structure adhesive tape that particles are added thereto to acquire a desired effect (such as, for example, addition of a pigment thereto to acquire a desired color tone of the appearance thereof). The thickness of the overall adhesive tape is however increased as a result of an increase of the number of layers when one layer for the addition of the particles is newly disposed therein.

SUMMARY

An object of the present disclosure is to provide an adhesive tape cartridge capable of suppressing the thickness of the overall tape even when particles to acquire a desired effect are added thereto, an adhesive tape roll used in the adhesive tape cartridge, and a production method for the adhesive tape roll.

In order to achieve the above-described object, according to the aspect of the present application, there is provided an adhesive tape cartridge comprising an adhesive tape roll that winds an adhesive tape around a predetermined axis in a housing, said adhesive tape comprising a base layer, and a particle-comprising adhesive layer that is disposed on one side of said base layer in a thickness direction and comprises an adhesive comprising large diameter particles whose average particle diameter is 30 μm to 200 μm and small diameter particles whose average particle diameter is 0.2 μm to 20 μm.

In the disclosure of this application, in the layer structure including the two layers that are the adhesive layer and the base layer, the particles (the large diameter particles and the small diameter particles) are added to the adhesive layer (the particle-including adhesive layer). As a result, the thickness of the overall adhesive tape can be reduced compared to the approach of disposing one layer as a layer using the particles in addition to the two layers. As a result, the length of the tape capable of being wound in the adhesive tape roll can be increased even in a limited space in the cartridge.

For example, when an adhesive tape is produced adding particles such as a pigment or the like to an adhesive layer thereof, a solvent (used for dilution) included in a layer having an adhesive coated thereon may not sufficiently volatilize even at a drying step conducted thereafter and may remain in the adhesive layer. Because an adverse effect acts on the adhesion performance of the adhesive layer when the solvent remains in the adhesive layer, to avoid this, the coating speed needs to be reduced or the drying conditions need to be enhanced, resulting in an increase of the cost. When specially large particles (for example, particles having the average particle diameter equal to or larger than 30 μm) are used, these large particles are brought into contact with each other or the distances each therebetween are reduced and, as a result, the particles tend to block volatilization paths for the solvent in the adhesive layer causing the above tendency to be conspicuous.

In the disclosure of this application, in addition to the addition of the large diameter particles having the average particle diameter equal to or larger than 30 μm, small diameter particles having the average diameter equal to or smaller than 20 μm are further added together therewith to the particle-including adhesive layer. As a result, the small diameter particles distribute to enter spaces among the large diameter particles in the particle-including adhesive layer (when the particle-including adhesive layer has flowability before being dried). As a result, the large diameter particles can be caused to be distant from each other to some extent (for example, by a distance equal to or larger than 2 μm) and the possibility that the large diameter particles are brought into contact with each other or stick to each other can be reduced. As a result, the volatilization paths for the solvent can be secured and the volatility of the solvent can be improved. As a result, any increase of the production cost can be avoided.

BRIEF DESCRIPTION OF DRAWINGS

FIG. 1 is a perspective view showing an outer appearance on the front side of a print label producing apparatus to which a double-sided adhesive tape cartridge of a first embodiment of the present disclosure is attached.

FIG. 2 is a plan view showing an internal structure on the back side of an apparatus main body of the print label producing apparatus.

FIG. 3 is an explanatory view showing the layer structure of each of a print-receiving tape and a double-sided adhesive tape.

FIG. 4A is an explanatory view showing the layer structure of a print tape.

FIG. 4B is an explanatory view showing the state where the print tape is affixed to an adherend.

FIG. 5 is an explanatory view showing the layer structure of the double-sided adhesive tape without a coloring layer thereof, and the state where the print tape using the double-sided adhesive tape is affixed to the adherend.

FIG. 6 is a view showing production steps for the double-sided adhesive tape.

FIG. 7 is a view showing production steps for the double-sided adhesive tape.

FIG. 8 is a plan view showing the internal structure on the back side of the print label producing apparatus in a modification example where a tape cartridge of a non-laminate type is used.

FIG. 9A is an explanatory view showing the layer structure of an adhesive tape.

FIG. 9B is an explanatory view showing the layer configuration of a print tape.

FIG. 9C is an explanatory view showing a modification example without a coloring layer thereof.

FIG. 9D is an explanatory view showing the modification example without an image-receiving layer thereof.

FIG. 10 is a view showing production steps for the adhesive tape.

FIG. 11A is an explanatory view showing a modification example where a transparent film layer and the coloring layer are replaced with each other.

FIG. 11B is an explanatory view showing a modification example where the transparent film layer and the coloring layer are replaced with each other.

FIG. 11C is an explanatory view showing the modification example without the coloring layer thereof.

FIG. 11D is an explanatory view showing the modification example without the image-receiving layer thereof.

FIG. 12 is a plan view showing the internal structure on the back side of the print label producing apparatus to which a double-sided adhesive tape cartridge of a second embodiment of the present disclosure is attached.

FIG. 13 is an explanatory view showing the layer structure of the double-sided adhesive tape.

FIG. 14A is an explanatory view showing the layer structure of a print tape.

FIG. 14B is an explanatory view showing the state where the print tape is affixed to the adherend.

FIG. 15A is an explanatory view showing the layer structure of a double-sided adhesive tape in a modification example without a coloring layer thereof.

FIG. 15B is an explanatory view showing the state where the print tape is affixed to the adherend.

FIG. 16 is a view showing production steps for the double-sided adhesive tape.

FIG. 17 is a view showing production steps for the double-sided adhesive tape.

FIG. 18 is a view showing production steps for the double-sided adhesive tape.

FIG. 19 is a plan view showing the internal structure on the back side of a print label producing apparatus in a modification example where one more combination of the particle-including adhesive layer•a particle-non-including adhesive layer is disposed.

FIG. 20 is an explanatory view showing the layer structure of the double-sided adhesive tape.

FIG. 21A is an explanatory view showing the layer configuration of a print tape.

FIG. 21B is an explanatory view showing the state where the print tape is affixed to the adherend.

FIG. 22A is an explanatory view showing the layer configuration of a double-sided adhesive tape in a modification example without a coloring layer thereof.

FIG. 22B is an explanatory view showing the state where the print tape is affixed to the adherend.

FIG. 23 is a view showing production steps for the double-sided adhesive tape.

FIG. 24 is a view showing production steps for the double-sided adhesive tape.

FIG. 25 is a view showing production steps for the double-sided adhesive tape.

FIG. 26 is a view showing production steps for the double-sided adhesive tape.

FIG. 27 is a plan view showing the internal structure on the back side of the print label producing apparatus in a modification example where a cartridge of a non-laminate type is used.

FIG. 28A is an explanatory view showing the layer configuration of an adhesive tape.

FIG. 28B is an explanatory view showing the layer configuration of a print tape.

FIG. 28C is an explanatory view showing the modification example without a coloring layer thereof.

FIG. 28D is an explanatory view showing the modification example without an image-receiving layer thereof.

FIG. 29 is a view showing production steps for the adhesive tape.

FIG. 30 is a view showing production steps for the adhesive tape.

FIG. 31A is an explanatory view showing a modification example where the transparent film layer and the coloring layer are replaced with each other.

FIG. 31B is an explanatory view showing the modification example without the coloring layer thereof.

FIG. 31C is an explanatory view showing the modification example without the image-receiving layer thereof.

FIG. 32 is a plan view showing the internal structure on the back side of the print label producing apparatus to which a double-sided adhesive tape cartridge of a third embodiment of the present disclosure is attached.

FIG. 33 is an explanatory view showing the layer configuration of a double-sided adhesive tape.

FIG. 34A is an explanatory view showing the layer configuration of a print tape.

FIG. 34B is an explanatory view showing the state where the print tape is affixed to the adherend.

FIG. 35A is an explanatory view showing the layer configuration of a double-sided adhesive tape in the modification example without a coloring layer thereof.

FIG. 35B is an explanatory view showing the state where the print tape is affixed to the adherend.

FIG. 36 is a view showing production steps for the double-sided adhesive tape.

FIG. 37 is a view showing production steps for the double-sided adhesive tape.

FIG. 38 is a plan view showing the internal structure on the back side of the print label producing apparatus in a modification example where one more particle-including adhesive layer is disposed.

FIG. 39 is an explanatory view showing the layer structure of the double-sided adhesive tape.

FIG. 40A is an explanatory view showing the layer configuration of a print tape.

FIG. 40B is an explanatory view showing the state where the print tape is affixed to the adherend.

FIG. 41A is an explanatory view showing the layer configuration of a double-sided adhesive tape in a modification example without the coloring layer thereof.

FIG. 41B is an explanatory view showing the state where the print tape is affixed to the adherend.

FIG. 42 is a view showing production steps for the double-sided adhesive tape.

FIG. 43 is a view showing production steps for the double-sided adhesive tape.

FIG. 44 is a plan view showing the internal structure on the back side of the print label producing apparatus in a modification example where a cartridge of a non-laminate type is used.

FIG. 45A is an explanatory view showing the layer configuration of an adhesive tape.

FIG. 45B is an explanatory view showing the layer configuration of a print tape.

FIG. 45C is an explanatory view showing a modification example without a coloring layer thereof.

FIG. 45D is an explanatory view showing the modification example without an image-receiving layer thereof.

FIG. 46 is a view showing production steps for the adhesive tape.

FIG. 47A is an explanatory view showing a modification example where the transparent film layer and the coloring layer are replaced with each other.

FIG. 47B is an explanatory view showing the modification example without the coloring layer thereof.

FIG. 47C is an explanatory view showing the modification example without the image-receiving layer thereof.

DETAILED DESCRIPTION OF THE PREFERRED EMBODIMENTS

Embodiments of the present disclosure will be described with reference to the drawings. When "upper", "lower", "front", "back", and "width" are used for a print label producing apparatus 1 in the following description, these correspond to the directions indicated by arrows properly shown in the drawings such as FIG. 1.

<First Embodiment>

The first embodiment of the present disclosure will be described with reference to FIG. 1-FIG. 11.

<Overall Structure of Print Label Producing Apparatus>

FIG. 1 and FIG. 2 show an example of a print label producing apparatus to which an adhesive tape cartridge of this embodiment is attached. In FIG. 1 and FIG. 2, the print label producing apparatus 1 is a handheld electronic device to be held by a hand of a user. The print label producing apparatus 1 includes an apparatus main body 2 and a cover 3 that is attached and detached to/from a back portion face of the apparatus main body 2.

The apparatus main body 2 includes a thin housing 2A having a flattened and substantially cuboidal shape that is elongated in the up-and-down direction. A liquid crystal display part 4 to display print data, a setting screen, and the like is disposed in an upper portion of the front face of the housing 2A and a keyboard part 5 to operate the label producing apparatus 1 is disposed on the lower side of the liquid crystal display part 4. In the keyboard part 5, a group of keys including character keys for characters, symbols, numbers, and the like, and various types of function keys is arranged. A cutting operation lever 6 to cut off a label tape with print is disposed in an upper portion of a side wall portion 2a on one side in the width direction (the left side in FIG. 1, the right side in FIG. 2) of the housing 2A.

<Label Producing Mechanism of Print Label Producing Apparatus>

As shown in FIG. 2, the apparatus main body 2 includes a label producing part 10 and a battery storage part 30. The label producing part 10 and the battery storage part 30 are partitioned from each other by a containing part 8 that has a control circuit board, a motor, and the like not shown contained therein. The battery storage part 30 includes a recess 32 having a rectangular shape, and plural recesses 36 that each are shallow in the up-and-down direction are disposed in a bottom portion 34 of the recess 32 along the width direction thereof. In the battery storage part 30, plural dry batteries not shown are stored at two levels each for the same number of the dry batteries.

The label producing part 10 includes a recessed cartridge holder 12 that is disposed to occupy a large portion of a substantially upper half of the apparatus main body 2 and that is to attach and detach thereto/therefrom an adhesive tape cartridge 11 (hereinafter, properly referred to simply as "cartridge 11"), and a printing•feeding mechanism 13 disposed in an area that includes the other side in the width direction (the left side in FIG. 2) of the cartridge holder 12.

The cartridge 11 is a cartridge called what-is-called "laminate type cartridge" in this embodiment and, as shown in FIG. 2, includes, inside a housing 11A, an adhesive tape roll 14, a print-receiving tape roll 15, an ink ribbon roll 16, an ink ribbon take-up roller 17, and a transporting roller 18. The adhesive tape roll 14 includes a double-sided adhesive tape 150 wound around a spool 50. As shown in an enlarged view in FIG. 2, the double-sided adhesive tape 150 includes an adhesive layer 163 to which a glittering pigment and particles described later are added, a coloring layer 180, a film layer 151, an adhesive layer 170, and a separation material layer 152 that are stacked on each other in this order from the spool 50 positioned on the side of the center in the radial direction (corresponding to an upper side shown in FIG. 3 described later) toward an outer side in the radial direction (corresponding to a lower side shown in FIG. 3 described later). As shown in FIG. 2, the print-receiving tape roll 15 includes, for example, a transparent or a translucent print-receiving tape 110 wound around a spool 60.

The printing•feeding mechanism 13 includes a support shaft 19 of the adhesive tape roll 14, a support shaft 20 of the print-receiving tape roll 15, a support shaft 21 of the ink ribbon roll 16, a driving shaft 22 of the ink ribbon take-up roller 17, a thermal head 23, a platen roller 24, a driving shaft 25 of the transporting roller 18, a pressing roller 26, and the like. The platen roller 24 is together with the pressing roller 26 attached to a roll holder 27 and the positions of the rollers 24 and 26 can be switched between their printing•feeding position (a position shown in FIG. 2) to be in contact with the thermal head 23 and the transporting roller 18, and their stand-by position (not shown) to be distant from the thermal head 23 and the transporting roller 18, based on shaking of the roll holder 27.

When a print label is produced, the positions of the platen roller 24 and the pressing roller 26 are switched to their printing•feeding position. The platen roller 24 whose position is switched to the printing•feeding position is rotated by the driving by a driving shaft not shown on the side of the apparatus main body 2 and presses the print-receiving tape 110 fed out from the print-receiving tape roll 15 and an ink ribbon not shown fed out from the ink ribbon roll 16, to the thermal head 23. As a result, an ink of the ink ribbon is transfer-printed onto the print-receiving tape 110 due to receiving heat by the ink from the thermal head 23. As a result, a desired print R (see FIG. 3 and the like described later) is formed on the print-receiving tape 110 and the platen roller 24 transports the print-receiving tape 110 and the ink ribbon whose print formation comes to an end, toward the transporting roller 18. The ink ribbon whose printing comes to an end thereafter separated from the print-receiving tape 110 to be taken up by the ink ribbon take-up roller 17.

On the other hand, the pressing roller 26 having its position switched to the printing•feeding position presses the print-receiving tape 110 after finishing its printing transported by the platen roller 24 and the double-sided adhesive tape 150 fed out from the adhesive tape roll 14 to the transporting roller 18 that is rotated by the driving by the driving shaft 25. As a result, as shown in the enlarged view in FIG. 2 (see also FIG. 3 and FIG. 4 described later), the transporting roller 18 forms the print tape 100 by bonding the print-receiving tape 110 having the print R formed thereon and the double-sided adhesive tape 150 to each other, feeding a print tape 100 toward a label discharging exit 29 disposed on an upper end of the apparatus main body 2. At a desired time point at which the print tape 100 is discharged from the label discharging exit 29, the user manually operates the cutting operation lever 6 and, as a result, a cutter 28 arranged in the vicinity of the label discharging exit 29 operates to cut off the print tape 100. As a result, the print tape 100 having a desired length (that is, a print label) is formed.

FIG. 3 is an explanatory view showing the layer configurations of the print-receiving tape 110 and the double-sided adhesive tape 150.

As shown in FIG. 3, the double-sided adhesive tape 150 includes the film layer 151, the coloring layer 180 disposed in contact with the upper side as shown (one side in the thickness direction in this embodiment) of the film layer 151, the adhesive layer 163 disposed in contact with the upper side as shown (the one side in the thickness direction in this embodiment) of the coloring layer 180 and that has a thickness of 20 μm to 200 μm, the adhesive layer 170 disposed in contact with the lower side as shown (the other side in the thickness direction in this embodiment) of the film layer 151, and the separation material layer 152 disposed in contact with the lower side as shown (the other side in the thickness direction in this embodiment) of the adhesive layer 170.

This embodiment is characterized in that, in the above, the glittering pigment as the large diameter particles having the average particle diameter of 30 μm to 200 μm is added to the adhesive that constitutes the adhesive layer 163 at a volume ratio to be 5 to 50% (that is a ratio relatively to the overall layer, and the same will hereinafter be applied to all the embodiments and all modification examples). Proper small diameter particles having the average particle diameter of 0.2 μm to 20 μm are further added to the adhesive of the adhesive layer 163 at a volume ratio relative to the large diameter particles to be equal to or higher than 5%. The average particle diameter of the small diameter particles is, for example, equal to or smaller than ⅕ of the average particle diameter of the large diameter particles.

The volume ratio can be calculated using, for example, the following approach. The glittering pigment-including adhesive whose volume and weight are measured is dissolved in a solvent to separate the glittering pigment using centrifugal separation. As a result, the weight of the glittering pigment is determined, and the volume of the glittering pigment is determined by measuring the absolute specific gravity of the glittering pigment particles. The volume of the adhesive can be determined by subtracting the volume of the glittering pigment from the volume of the glittering pigment-including adhesive. The area and the ratio of the pigment present in the cross-section of the adhesive layer can be determined by observing the cross-section using an electron microscope or an optical microscope, and the volume ratio can be determined by conducting volume conversion by continuously increasing the cross-sections to be observed (the same will hereinafter be applied to a modification example of this embodiment, the second embodiment, and a modification example thereof, described later). The average particle diameter can be measured using a known laser diffraction scattering method. The average particle diameter can be measured using, for example, LA-960 manufactured by Horiba Ltd. (the same will hereinafter be applied to modification examples and other embodiments described later). The adhesive force of the adhesive layer 163 is equal to or higher than 3 [N]/10 [mm]. The adhesive force (the sticking force) is measured according to JIS-Z0237. Simply described, the face for the measurement is affixed to a SUS 304 stainless steel plate and, after a specific time period elapses, the face and the plate are peeled an angle of 180° from each other at a speed of 300 mm/min using a tensile testing machine to conduct the measurement (the same will hereinafter be applied to the modification examples and the other embodiments described later).

On the other hand, the print-receiving tape 110 has the print R formed as above on the surface of the side (that is the lower side as shown and that is the other side in the thickness direction in this embodiment) that faces the double-sided adhesive tape 150. The print-receiving tape 110 is bonded to the double-sided adhesive tape 150 through the adhesive layer 163. As a result, the print R is in contact with the adhesive layer 163 between the double-sided adhesive tape 150 and the adhesive layer 163.

FIG. 4A shows the layer configuration of the print tape 100 that is formed by bonding the print-receiving tape 110 and the double-sided adhesive tape 150 to each other, and FIG. 4B shows the state where the separation material layer 152 is peeled off from the print tape 100 and the print tape 100 is affixed to an adherend M by the adhesive layer 170. As a result of the bonding, as shown in FIG. 4A, the print tape 100 includes the print-receiving tape 110, the adhesive layer 163 (to which the glittering pigment and the small diameter particles are added), the coloring layer 180, the film layer 151, the adhesive layer 170, and the separation material layer 152 that are stacked on each other in this order from the upper side as shown (the one side in the thickness direction in this embodiment) toward the lower side as shown (the other side in the thickness direction in this embodiment).

As shown in FIG. 5, the above may be configured to have the adhesive layer 163 disposed in contact with the upper side as shown (the one side in the thickness direction in this embodiment) of the film layer 151 without disposing the coloring layer 180 between the adhesive layer 163 and the film layer 151.

The separation material layer 152 is formed by, for example, coating a separation agent on a base. A paper sheet, a PET film, an OPP film, a polyethylene film, and the like are each usable as the base. A silicone resin, a polyethylene resin, and the like are each usable as the separation agent.

Adhesives such as a urethane resin-based, a silicon resin-based, a vinyl resin-based, a polyester resin-based, a synthetic rubber-based, a natural rubber-based, and an acrylic resin-based adhesives, and the like are each usable as the adhesive of the adhesive layer 163 and the adhesive layer 170.

A glittering pigment formed by coating a color material such as titanium oxide, iron oxide, or the like, or a solid pigment as a color material on the surface of a core material such as that of lepidolite, glass, alumina, a metal, or the like is usable as the glittering pigment to be added to the adhesive layer 163. A glittering pigment creating a color using an interference of the reflected light of the core material without coating any color material on the core material may also be used in accordance with the color tone of the glittering pigment. The "glittering pigment" is the generic name of the pigments each having the glittering property as above and, for example, a pearl pigment, a metallic pigment, and the like are known.

An inorganic pigment such as an oxide and an organic pigment such as a textile printing pigment are each usable as the solid pigment in this case. For example, an oxide such as titanium dioxide or zinc flower; a hydroxide such as alumina hydrate or iron oxide yellow; a sulfide such as zinc sulfide or lithopone; a chromium oxide such as chrome yellow or molybdate orange; a silicate such as white carbon or clay; a sulfate salt such as precipitating barium sulfate or baryta powder; a carbonate such as calcium carbonate or lead white; and, in addition, a ferrocyanide (ferric hexacyanoferrate), carbon (carbon black), and the like are each usable as the inorganic pigment. For example, textile printing pigments including a basic dye such as rhodamine lake or methyl violet lake, an acid dye such as quinoline yellow lake, a vat dye such as malachite green, a mordant dye such as alizarin lake; azo dyes including a soluble azo such as carmine 6B, an insoluble azo such as disazo yellow, a condensed azo such as chromophthal yellow 3G, an azo complex salt such as nickel azo yellow, a benzimidazolone azo such as permanent orange HL; a phthalocyanine pigment such as phthalocyanine blue; a condensed polycyclic dye such as Flavan Slon yellow; a nitro-based pigment such as naphthol yellow S; a nitroso-based pigment such as pigronto green B; a day-night fluorescent pigment such as Lumogen yellow; and, in addition, alkali blue and the like are each usable as the organic pigment.

The material quality of the separation material layer 152, and the materials•components used in the separation agent, the adhesive, the glittering pigment, and the solid pigment are also usable in common in the modification examples and the other embodiments described later.

Production steps for the double-sided adhesive tape 150 will be described with reference to FIG. 6-FIG. 7.

As shown in FIG. 6, the film layer 151 having the coloring layer 180 already formed thereon using, for example, a known printing approach is fed out from a film roll FR and is supplied to an adhesive coating head AH. The adhesive having the above composition is coated on a face opposite to the face with the coloring layer 180 of the film layer 151 by the adhesive coating head AH to establish a three-layer structure including the coloring layer 180, the film layer 151, and the adhesive layer 170. The three-layer structure tape thereafter sequentially passes through a first drying chamber D1, a second drying chamber D2, a third drying chamber D3, a fourth drying chamber D4, and a fifth drying chamber D5 in this order to conduct a drying process therefor in five stages. The number of the drying chambers is not limited to five.

The separation material layer 152 separately fed out from a separation material roll SR is thereafter bonded to the adhesive layer 170 and, as a result, the three-layer structure tape turns into a four-layer structure tape including the coloring layer 180, the film layer 151, the adhesive layer 170, and the separation material layer 152 to thereafter be wound in a first tape roll TR1.

As shown in FIG. 7, the four-layer structure tape including the coloring layer 180, the film layer 151, the adhesive layer 170, and the separation material layer 152 is thereafter fed out from the first tape roll TR1 and, similarly to the above, is supplied to the adhesive coating head AH. The adhesive having the above composition (including the glittering pigment and the small diameter particles) is coated on the face on the side opposite to the side with the film layer 151 of the coloring layer 180 by the adhesive coating head AH. As a result, the tape turns into a five-layer structure tape including the adhesive layer 163 (having the glittering pigment and the small diameter particles added thereto), the coloring layer 180, the film layer 151, the adhesive layer 170, and the separation material layer 152 and, similarly to the above, the tape thereafter sequentially passes through the first to the fifth drying chambers D1-D5 to conduct the drying process therefor. As a result, the double-sided adhesive tape 150 is completed. The double-sided adhesive tape 150 completed in this manner is wound in a third tape roll TR2.

<Advantage of First Embodiment>

As above, in the first embodiment, in the ordinary four-layer structure including the adhesive layer for bonding, the film layer, the adhesive layer for affixing, and the separation material layer, the glittering pigment as the large diameter particles and the small diameter particles are added to the adhesive layer 163 for bonding. As a result, compared to the approach of disposing one layer that uses particles in addition to the four layers, the thickness of the overall double-sided adhesive tape 150 can be reduced. As a result, the length of the tape capable of being wound in the adhesive tape roll 14 can be increased even in the limited space in the cartridge 11. Especially, the increase of the length of the tape can be realized without increasing the number of the layers only by adding the particles to the adhesive layer of the prior art structure that includes the four layers of the adhesive layer, the film layer, the bonding adhesive layer, and the separation material layer.

For example, when the double-sided adhesive tape 150 is produced adding the particles such as the pigment to the adhesive layer as described above with reference to FIG. 6 and FIG. 7, a solvent (used for dilution) included in the layer coated with the adhesive by the adhesive coating head AH may not sufficiently volatilize even at the drying steps conducted thereafter in the drying chambers D1-D5 to remain in the adhesive layer. When the solvent remains in the adhesive layer, an adverse effect acts on the adhesion performance of the adhesive layer. To avoid this, it is necessary to reduce the coating speed or to enhance the drying conditions and this causes an increase of the production cost. When particles each having an especially large particle diameter (for example, particles having the average particle diameter equal to or lager than 30 μm such as those of the glittering pigment of this embodiment) are used, the volatilization paths for the solvent in the adhesive layer tend to be blocked by these large particles that are brought into contact with each other or whose distances each therebetween are reduced, causing the above tendency to be conspicuous.

In the first embodiment, in addition to the addition of the large diameter particles having the average particle diameter equal to or larger than 30 μm (in this example, the glittering pigment, and the same will hereinafter be applied.), the small diameter particles having the average particle diameter equal to or smaller than 20 μm are concurrently added to the adhesive layer 163. As a result, in the adhesive layer 163, when the adhesive layer 163 has flowability before being dried, the small diameter particles distribute to enter spaces among the glittering pigment particles. As a result, the distances each between the glittering pigment particles can each be maintained to some extent (to be, for example, equal to or larger than 0.2 μm) and the probability that the glittering pigment particles are brought into contact with each other and the distances therebetween are reduced can be reduced. As a result, the volatilization paths for the solvent can be secured and the volatility of the solvent can be improved. Any increased of the production cost can therefore be avoided.

The above particle diameters also have technical meaning as follows.

It has been assured that, when the double-sided adhesive tape 150 is produced adding the large diameter particles having the average particle diameter of 30 μm to 200 μm and the small diameter particles having the average particle diameter of 0.2 μm to 20 μm to the adhesive, the volatile component of the adhesive (mainly, the solvent for the dilution) further tends to avoid its volatilization with the larger diameter particles each having a particle diameter equal to or larger than 30 μm.

The amount of the remaining solvent of an actually produced tape can easily be measured using gas chromatograph or the like.

Especially, with scale-shaped particles such as those of the glittering pigment, the solvent further tends to avoid its volatilization because the area in the flat face direction of the particle is significantly large relative to that in the thickness direction.

When the small diameter particles are added to the above, the small particles enter spaces among the large particles and, as a result, the distances each between the large diameter particles of the glittering pigment can each be maintained to some extent (to be, for example, equal to or larger than 2 μm). As a result, the possibility that the large diameter particles of the glittering pigment are brought into contact with each other or brought close to each other can be reduced. As a result, the volatilization paths for the solvent can be secured and the volatility of the solvent can be improved.

At this time, preferably, the particle diameter of each of the small diameter particles is equal to or smaller than 20 μm with which any influence on the volatility of the solvent tends to be avoided.

A pigment other than the above glittering pigments may also be used as the large diameter particles. A proper pigment (such as, for example, a solid pigment), and beads made of a resin or glass may also be used as the small diameter particles. When a pigment is also used as the small diameter particles, due to the addition of the pigment of the small diameter particles, the volume ratio of the glittering pigment to be the large diameter particles can be reduced and the remaining amount of the solvent can be reduced without significantly degrading the glittering impression and the color impression. The visual effect by the two types of pigment can be acquired using the one layer. Seen from the one side in the thickness direction (for example, the upper side in FIG. 4) (see a dotted line arrow in FIG. 4B), the depth impression can be acquired by mixing the two types of pigment each having the particle diameter distribution different from that of each other.

In the first embodiment, especially, the adhesive force of the adhesive layer 163 is equal to or larger than 3 [N]/10 [mm]. As a result, the adhesiveness by the adhesive layer 163 can be secured.

In the first embodiment, especially, the glittering pigment as the large diameter particles having the average particle diameter of 30 μm to 200 μm is added at the volume ratio to be 5 to 50%. This has technical meaning as follows.

Preferably, the volume ratio thereof is smaller than 50% to secure the quality of the adhesiveness and the like because the volatility of the solvent is extremely degraded when the volume ratio thereof is equal to or greater than 50%.

In the first embodiment, especially, the proper small diameter particles having the average particle diameter of 0.2 μm to 20 μm are added to the adhesive of the adhesive layer 163 at a volume ratio relative to the large diameter particles to be equal to or greater than 5%. This has technical meaning as follows.

For example, assuming that the difference in the diameter between the small diameter particle and the large diameter particle is an amount corresponding to a five-fold value of the diameter of the small diameter particle, the difference in the number of the particles corresponds to a 125-fold value because the difference in the number of the particles is in proportion to the cube of the difference in the diameter. Assuming that the volume ratio of the small diameter particles is even 5%, the six-fold number of small diameter particles are present relative to the number of the large diameter particles and this is sufficient as to the effect. It can be considered that, when the difference in the particle diameter between the small diameter particles and the large diameter particles is at least a three or more-fold value, the number of the large diameter particles and that of the small diameter particles are substantially equal to each other stochastically and a sufficient effect can be achieved.

<Modification Examples of First Embodiment>

The first embodiment is not limited to the above disclosure and various modifications can be made thereto within the scope not departing from the gist and the technical idea thereof. Modification examples thereof will sequentially be described below.

(1-1) Application to Non-Laminate Cartridge

This modification example is different from the first embodiment that uses the laminate cartridge 11, and is an example where a cartridge called what-is-called "non-laminate" (more particularly, "receptor") cartridge is used. The equivalent components to those of the first embodiment are given the same reference numerals and will not again be described or will simply be described.

FIG. 8 is a plan view showing the internal structure on the back side of the apparatus main body of the print label producing apparatus in this modification example, corresponding to FIG. 2 of the first embodiment. In FIG. 8, the cartridge 11 used in this embodiment includes, inside the housing 11A, an adhesive tape roll 14 (whose detailed layer structure will be descried later), the ink ribbon roll 16, the ink ribbon take-up roller 17, and the transporting roller 18.

The adhesive tape roll 14 includes the adhesive tape 150N in relation to this embodiment wound around the spool 50. As shown in an enlarged view in FIG. 8, the adhesive tape 150N includes an image-receiving layer 210, the coloring layer 180 same as above, a transparent film layer 151A that is transparent (or may be translucent, and the same will hereinafter be applied), an adhesive layer 161 having large diameter particles of a glittering pigment and small diameter particles of a glittering pigment added thereto, and the separation material layer 152 that are stacked on each other in this order from the spool 50 positioned on the side of the center in the radial direction (corresponding to the upper side shown in FIG. 9 described later) toward the outer side in the radial direction (corresponding to the lower side shown in FIG. 9 described later).

When the print label is produced, the platen roller 24 presses the adhesive tape 150N fed out from the adhesive tape roll 14 and an ink ribbon not shown fed out from the ink ribbon roll 16 to the thermal head 23. As a result, similarly to the first embodiment, the ink of the ink ribbon is transfer-printed onto the image-receiving layer 210 of the adhesive tape 150N due to receiving of heat by the ink from the thermal head 23. As a result, a desired print R (see FIG. 9B and the like described later) is formed on the adhesive tape 150N to establish a print tape 100N, and the platen roller 24 transports the print tape 100N whose print formation comes to an end and the ink ribbon toward the transporting roller 18. The transporting roller 18 thereafter further transports the print tape 100N toward the label discharging exit 29 disposed on the upper end of the apparatus main body 2. Similarly to the first embodiment, at the desired time point at which the print tape 100N is discharged from the label discharging exit 29, a user manually operates the cutting operation lever 6 and, as a result, the cutter 28 arranged in the vicinity of the label discharging exit 29 operates to cut off the print tape 100N. As a result, the print tape 100N having a desired length (that is, the print label) is formed.

<Details of Layer Configuration of Tape>

FIGS. 9 are explanatory views showing the layer configurations of the adhesive tape 150N and the print tape 100N, corresponding to FIG. 3 and FIG. 4 of the first embodiment.

As shown in FIG. 9A, the adhesive tape 150N includes the transparent film layer 151A, the coloring layer 180 disposed in contact with the upper side as shown (the other side in the thickness direction in this modification example) of the transparent film layer 151A, the image-receiving layer disposed in contact with the upper side as shown (the other side in the thickness direction in this modification example) of the coloring layer 180, the adhesive layer 161 disposed in contact with the lower side as shown (the one side in the thickness direction in this modification example) of the transparent film layer 151A, and the separation material layer 152 disposed in contact with the lower side as shown (the one side in the thickness direction in this modification example) of the adhesive layer 161 and covering the adhesive layer 161.

Similarly to the first embodiment, this modification example is characterized in that, in the above, similarly to the adhesive layer 163, the large diameter particles of the glittering pigment having the average particle diameter of 30 μm to 200 μm are added to the adhesive that constitutes the adhesive layer 161 having a thickness of 20 μm to 200 μm at a volume ratio to be 5 to 50%. Small diameter particles of the glittering pigment having the average particle diameter of 0.2 μm to 200 μm are further added to the adhesive of the adhesive layer 161. The adhesive force of the adhesive layer 161 is equal to or higher than 3 [N]/10 [mm].

The coloring layer 180 has transmittance equal to or higher than 20%. The image-receiving layer 210 also has transmittance equal to or higher than 20%.

FIG. 9B shows the layer configuration of the print tape 100N whose image-receiving layer 210 of the adhesive tape 150N has the print R formed thereon.

The production steps for the adhesive tape 150N will be described with reference to FIG. 10.

As shown in FIG. 10, the transparent film layer 151A having the image-receiving layer 210 and the coloring layer 180 already formed thereon using, for example, a known printing approach is fed out from the film roll FR and is supplied to the adhesive coating head AH. The adhesive having the above composition (including the large diameter particles and the small diameter particles of the glittering pigment) is coated on the face opposite to the face with the coloring layer 180 of the transparent film layer 151A by the adhesive coating head AH to establish a four-layer structure including the image-receiving layer 210, the coloring layer 180, the transparent film layer 151A, and the adhesive layer 161 (having the large diameter particles and the small diameter particles of the glittering pigment added thereto). The four-layer structure tape thereafter sequentially passes through the first drying chamber D1, the second drying chamber, the third drying chamber D3, the fourth drying chamber D4, and the fifth drying chamber D5 in this order and, as a result, the drying process is conducted therefor in the five stages. The number of the drying chambers is not limited to five.

The separation material layer 152 separately fed out from the separation material roll SR is thereafter bonded to the adhesive layer 161 and, as a result, the four-layer structure tape is completed as the adhesive tape 150N having a five-layer structure of the image-receiving layer 210, the coloring layer 180, the transparent film layer 151A, the adhesive layer 161, and the separation material layer 152. The adhesive tape 150N completed in this manner is wound in the first tape roll TR1.

As shown in FIG. 9C, the above may be configured to have the image-receiving layer 210 disposed in contact with the upper side as shown (the other side in the thickness direction in this modification example) of the transparent film layer 151A without disposing the coloring layer 180 between the image-receiving layer 210 and the transparent film layer 151A. As shown in FIG. 9D, the above may also be configured to have the coloring layer 180 disposed in contact with the upper side as shown (the other side in the thickness direction in this modification example) of the transparent film layer 151A without disposing the image-receiving layer 210.

In this modification example, the same advantage as that of the first embodiment is also achieved. In the layer structure including the three layers of the film layer, the adhesive layer, and the separation material layer, the particles (that are the large diameter particles and the small diameter particles of the glittering pigment in this example) are added to the adhesive layer 161. As a result, compared to the approach of disposing one layer using the particles therein in addition to those three layers, the thickness of the overall adhesive tape 150N can be reduced. As a result, the length of the tape capable of being wound in the adhesive tape roll 14 can be increased even in a limited space in the cartridge 11. Especially, the increase of the length of the tape can be realized without increasing the number of the layers only by adding the particles to the adhesive layer of the prior art structure that includes the three layers of the film layer, the affixing adhesive layer, and the separation material layer.

Similarly to the above, in this modification example, in addition to the addition of the large diameter particles having the average particle diameter equal to or larger than 30 μm (that are those of the glittering pigment in this example, and the same will hereinafter be applied), the small diameter particles having the average particle diameter equal to or smaller than 20 μm (that are those of the glittering pigment in this example, and the same will hereinafter be applied) are further added concurrently therewith to the adhesive layer 161. As a result, in the adhesive layer 161, the large diameter particles of the glittering pigment can be caused to be distant from each other to some extent (for example, by a distance equal to or larger than 2 μm) and the possibility that the large diameter particles are brought into contact with each other or are brought close to each other can be reduced. As a result, the volatilization paths for the solvent can be secured and the volatility of the solvent can be improved. Any increase of the production cost can therefore be avoided. The adhesive force of the adhesive layer 161 is equal to or higher than 3 [N]/10 [mm] and, as a result, the adhesiveness by the adhesive layer 161 can be secured.

(1-2) Replacement of Transparent Film Layer and Coloring Layer with Each Other

As shown in FIG. 11A and FIG. 11B, the image-receiving layer 210, the transparent film layer 151A, the coloring layer 180, the adhesive layer 161, and the separation material layer 152 may be stacked on each other in this order from the upper side as shown (the other side in the thickness direction in this modification example) toward the lower side as shown (the one side in the thickness direction in this modification example) by replacing the transparent film layer 151A and the coloring layer 180 with each other in the layer configuration of the adhesive tape 150N and the print tape 100N shown in FIG. 9A and FIG. 9B. As shown in FIG. 11C, the coloring layer 180 may not be disposed in the layer configuration of the adhesive tape 150N shown in FIG. 11A (in this case, as a result, the layer configuration same as that in FIG. 9C is established) or, as shown in FIG. 11D, the image-receiving layer 210 may not be disposed in the layer configuration of the adhesive tape 150N shown in FIG. 11A. In these cases, the same advantage as above is also achieved.

<Second Embodiment>

The second embodiment of the present disclosure will be described with reference to FIG. 12-FIG. 31. The equivalent components to those of the first embodiment and the modification example thereof are given the same reference numerals and will not again be described or will simply be described.

Similarly to the first embodiment, this embodiment handles the case where a cartridge of a what-is-called laminate type is used. FIG. 12 shows a plan view showing the internal structure on the back side of the apparatus main body of the print label producing apparatus in the third embodiment, corresponding to FIG. 2 of the first embodiment. In FIG. 12, as shown in an enlarged view in FIG. 12, the double-sided adhesive tape 150 wound in the adhesive tape roll 14 included in the housing 11A of the cartridge 11 of this embodiment includes an adhesive layer 160 having no particle added thereto, an adhesive layer 162 having desired particles (that are those of the pigment in this example, and the same will hereinafter be applied) added thereto, the coloring layer 180, the film layer 151, the adhesive layer 170, and the separation material layer 152 that are stacked on each other in this order from the spool 50 positioned on the side of the center in the radial direction (corresponding to the upper side shown in FIG. 13 described later) toward the outer side in the radial direction (corresponding to the lower side shown in FIG. 13 described later). Similarly to the above, as shown in FIG. 12, the print-receiving tape roll 15 includes, for example, the transparent or the translucent print-receiving tape 110 wound around the spool 60. The housing 11A also includes the ink ribbon roll 16 same as above.

<Details of Layer Configuration of Tape>

FIG. 13 is an explanatory view showing the layer configurations of the print-receiving tape 110 and the double-sided adhesive tape 150.

As shown in FIG. 13, the double-sided adhesive tape 150 includes the film layer 151, the coloring layer 180 disposed in contact with the upper side as shown (one side in the thickness direction in the configuration in FIG. 12-FIG. 15) of the film layer 151, the adhesive layer 162 disposed in contact with the upper side as shown (the one side in the thickness direction in the configuration in FIG. 12-FIG. 15) of the coloring layer and including the adhesive to which the pigment is added at a desired volume ratio (for example, 5% to 50%), the adhesive layer 160 disposed in contact with the upper side as shown (the one side in the thickness direction in the configuration in FIG. 12-FIG. 15) of the adhesive layer 162 and including an adhesive to which no particle is added, an adhesive layer 170 disposed in contact with the lower side as shown (the other side in the thickness direction in the configuration in FIG. 12-FIG. 15) of the film layer 151, and the separation material layer 152 disposed in contact with the lower side as shown (the other side in the thickness direction in the configuration in FIG. 12-FIG. 15) of the adhesive layer 170 and covering the adhesive layer 170.

This embodiment is characterized in that, in the above, a thickness tA of the adhesive layer 160 is smaller than a thickness tB of the adhesive layer 162 and the sum of the thickness tA of the adhesive layer 160 and the thickness tB of the adhesive layer 162 is larger than a thickness tC of the adhesive layer 170. The volume ratio of the pigment added to the adhesive layer 162 can be measured using the same approach as that described in the first embodiment.

On the other hand, the print-receiving tape 110 has the print R formed as above on the surface of the side facing the double-sided adhesive tape 150 (the lower side as shown and the other side in the thickness direction in the configuration in FIG. 12-FIG. 15). The print-receiving tape 110 is bonded to the double-sided adhesive tape 150 through the adhesive layer 160.

FIG. 14A shows the layer configuration of the print tape 100 that is formed by bonding the print-receiving tape 110 and the double-sided adhesive tape 150 to each other. FIG. 14B shows the state where the separation material layer 152 is peeled off from the print tape 100 and the print tape 100 is affixed to the adherend by the adhesive layer 170. As a result of the bonding, as shown in FIG. 14A, the print tape 100 includes the print-receiving tape 110, the adhesive layer 160 (having no particle added thereto), the adhesive layer 162 (having the pigment added thereto), the coloring layer 180, the film layer 151, the adhesive layer 170, and the separation material layer 152 that are stacked on each other in this order from the upper side as shown (the one side in the thickness direction in the configuration in FIG. 12-FIG. 15) toward the lower side as shown (the other side in the thickness direction in the configuration in FIG. 12-FIG. 15).

As shown in FIG. 15A, the above may be configured to have the adhesive layer 162 disposed in contact with the upper side as shown (the one side in the thickness direction in the configuration in FIG. 12-FIG. 15) of the film layer 151 without disposing the coloring layer 180 between the adhesive layer 162 and the film layer 151. FIG. 15B shows the state where the separation material layer 152 is peeled off from the print tape 100 formed by bonding the double-sided adhesive tape 150 configured as above and the print-receiving tape 110 to each other, and the print tape 100 is affixed to the adherend by the adhesive layer 170.

Production steps for the double-sided adhesive tape 150 will be described with reference to FIG. 16-FIG. 18.

Similarly to FIG. 6 described above, in FIG. 16, the film layer 151 having the coloring layer 180 already formed thereon using, for example, a known printing approach is fed out from the film roll FR and is supplied to the adhesive coating head AH. The adhesive having the above composition is coated on the face opposite to the face with the coloring layer 180 of the film layer 151 by the adhesive coating head AH to establish a three-layer structure of the coloring layer 180, the film layer 151, and the adhesive layer 170. The three-layer structure tape thereafter sequentially passes through the first drying chamber D1, the second drying chamber, the third drying chamber D3, the fourth drying chamber D4, and the fifth drying chamber D5 in this order and, as a result, the drying process is conducted therefor in the five stages. The number of the drying chambers is not limited to five.

The separation material layer 152 separately fed out from the separation material roll SR is thereafter bonded to the adhesive layer 170 and, as a result, the three-layer structure tape turns into a four-layer structure tape including the coloring layer 180, the film layer 151, the adhesive layer 170, and the separation material layer 152. The four-layer structure tape is thereafter wound in the first tape roll TR1.

As shown in FIG. 17, the four-layer structure tape including the coloring layer 180, the film layer 151, the adhesive layer 170, and the separation material layer 152 is thereafter fed out from the first tape roll TR1 and, similarly to the above, is supplied to the adhesive coating head AH. The adhesive having the above composition (including, for example, the glittering pigment as the above particles) is coated on the face on the side opposite to the side with the film layer 151 of the coloring layer 180 by the adhesive coating head AH to establish a five-layer structure including the adhesive layer 162 (having the pigment added thereto), the coloring layer 180, the film layer 151, the adhesive layer 170, and the separation material layer 152. Similarly to the above, the tape thereafter sequentially passes through the first to the fifth drying chambers D1-D5 to conduct the drying process therefor to be wound in the second tape roll TR2.

As shown in FIG. 18, the five-layer structure tape including the adhesive layer 162, the coloring layer 180, the film layer 151, the adhesive layer 170, and the separation material layer 152 is thereafter fed out from the second tape roll TR2 and, similarly to the above, is supplied to the adhesive coating head AH. The adhesive having the above composition (including no particle) is coated on the face on the side opposite to the side with the coloring layer 180 of the adhesive layer 162 by the adhesive coating head AH. As a result, the tape has a six-layer structure including the adhesive layer 160 (having no particle added thereto), the adhesive layer 162 (having the pigment added thereto), the coloring layer 180, the film layer 151, the adhesive layer 170, and the separation material layer 152 and, similarly to the above, the tape thereafter sequentially passes through the first to the fifth drying chambers D1-D5 to conduct the drying process therefor. As a result, the double-sided adhesive tape 150 is completed. The double-sided adhesive tape 150 completed in this manner is wound in a third tape roll TR3.

The description has been made with reference to FIG. 16-FIG. 18 taking the example of the case where the adhesive coating head AH is disposed only at one point, while an additional adhesive coating head AH may newly be disposed downstream of the drying chamber D5 in the transport path. In this case, the coating process for the adhesive layer 160 (described with reference to FIG. 18) can be conducted continuously and immediately after the coating process and the drying process in the drying chambers D1-D5 conducted for the adhesive layer 162 in FIG. 17.

<Advantage of Second Embodiment>

As above, in the second embodiment, the two adhesive layers are disposed on the one side in the thickness direction of the film layer 151. The adhesive layer 162 including the particles (that are those of the pigment in the above example and that may be another additive particles, and the same will hereinafter be applied) is disposed on the one side in the thickness direction of the film layer 151, and the adhesive layer 160 including no particle is disposed on the one side in the thickness direction of the adhesive layer 162. The desired effect (that is the desired color tone in the example of the pigment) by the addition of the particles can be achieved by adding the particles to the adhesive layer 162 disposed on the inner layer side, suppressing any degradation of the adhesiveness caused by the addition of the particles by adding no particle to the adhesive layer 160 exposed on the surface side.

The reason why the adhesiveness of the adhesive layer 160 needs to be higher than that of the adhesive layer 162 is as follows. As described with reference to FIG. 17, the adhesive layer 162 disposed on the one side in the thickness direction of the film layer 151 (having the coloring layer 180 already formed thereon) is bonded to the coloring layer 180 in the state where the layers are controlled by the production equipment of the plant shown in, for example, FIG. 16-FIG. 18 during the production. In contrast, the adhesive layer 160 is bonded to the print-receiving tape 110 in the print label producing apparatus 1 when a print label is produced as above. As a result, the adhesive force of the adhesive layer 161 needs to be higher than that of the adhesive layer 162.

In the second embodiment, especially, the thickness tA of the adhesive layer 160 is smaller than the thickness tB of the adhesive layer 162. This has the following meaning. The adhesive layer 160 has no particle added thereto and has the high adhesiveness and, as a result, the adhesive layer 160 can maintain its relatively high adhesiveness even when its thickness is reduced to be smaller than that of the adhesive layer 162.

In the second embodiment, especially, the sum of the thickness tA of the adhesive layer 160 and the thickness tB of the adhesive layer 162 is larger than the thickness tC of the adhesive layer 170. Any degradation of the adhesiveness of the adhesive layer 162 caused by the addition of the particles thereto can be compensated by setting the sum of the thickness tA of the adhesive layer 160 and the thickness tB of the adhesive layer 162 to be relatively large and reliable adhesiveness can therefore be acquired by the overall two adhesive layers 160 and 162.

<Modification Example of Second Embodiment>

The second embodiment is not limited to the above disclosure and various modifications can be made thereto within the scope not departing from the gist and the technical idea thereof. Modification examples thereof will sequentially be described below.

(2-1) Case Where One More Combination of Particle-Including Adhesive Layer•Particle-Non-Including Adhesive Layer is Disposed FIG. 19 shows the internal structure on the back side of the apparatus main body of the print label producing apparatus in this modification example, corresponding to FIG. 2 for the second embodiment. In FIG. 19, similarly to the second embodiment, the cartridge 11 used in this modification example also includes, inside the housing 11A, an adhesive tape roll 14 (whose detailed layer configuration will be described later), the ink ribbon roll 16, the ink ribbon take-up roller 17, and the transporting roller 18.

The adhesive tape roll 14 includes the double-sided adhesive tape 150 in relation to this embodiment wound around the spool 50. As shown in an enlarged view in FIG. 19, the double-sided adhesive tape 150 includes an adhesive layer 160U same as the adhesive layer 160 of the second embodiment and having no particles added thereto, an adhesive layer 162U to which desired particles (that are those of a pigment in this example, and the same will hereinafter be applied) are added, the coloring layer 180, the transparent film layer 151A that is transparent (or may be translucent, and the same will hereinafter be applied), an adhesive layer 162L having the same composition as that of the adhesive layer 162U, an adhesive layer 160L having the same composition as that of the adhesive layer 160U, and the separation material layer 152 that are stacked on each other in this order from the spool 50 positioned on the side of the center in the radial direction (corresponding to the upper side as shown in FIG. 20 described later) toward the outer side in the radial direction (corresponding to the lower side shown in FIG. 3 described later). Similarly to the case shown in FIG. 2, the print-receiving tape roll 15 includes, for example, a transparent or a translucent print-receiving tape 110 wound around the spool 60. The housing 11A also includes the ink ribbon 16 same as above.

<Details of Layer Configuration of Tape>

FIG. 20 is an explanatory view showing the layer configurations of the print-receiving tape 110 and the double-sided adhesive tape 150.

As shown in FIG. 20, the double-sided adhesive tape 150 of this modification example includes the transparent film layer 151A, the coloring layer 180 disposed in contact with the upper side as shown (the one side in the thickness direction in this modification example) of the transparent film layer 151A, the adhesive layer 162U disposed in contact with the upper side as shown (the one side in the thickness direction in this modification example) of the coloring layer and having a pigment added thereto at a desired volume ratio (for example, 5% to 50%) similarly to the second embodiment, the adhesive layer 160U disposed in contact with the upper side as shown (the one side in the thickness direction in this modification example) of the adhesive layer 162U and having no particle added thereto similarly to the second embodiment, the adhesive layer 162L disposed in contact with the lower side as shown (the other side in the thickness direction in this modification example) of the transparent film layer 151A and same as the adhesive layer 162U, the adhesive layer 160L disposed in contact with the lower side as shown (the other side in the thickness direction in this modification example) of the adhesive layer 162L and same as the adhesive layer 160U, and the separation material layer 152 disposed in contact with the lower side as shown (the other side in the thickness direction in this modification example) of the adhesive layer 160L and covering the adhesive layer 160L.

This modification example is characterized in that, similarly to the second embodiment, the thickness to of the adhesive layer 160U on the upper side as shown is smaller than the thickness tB of the adhesive layer 162U on the upper side as shown (see FIG. 20) and the thickness tD of the adhesive layer 160L on the lower side as shown is smaller than the thickness tC of the adhesive layer 162L on the lower side as shown (see FIG. 20). The volume ratio of the pigment to be added to the adhesive layer 162 can be measured using the same approach as that described in the first embodiment.

The coloring layer 180 has transmittance that is equal to or higher than 20%.

On the other hand, similarly to the second embodiment, the print-receiving tape 110 has the print R formed as above on the surface of the side (that is the lower side as shown and that is the other side in the thickness direction in this modification example) that faces the double-sided adhesive tape 150. The print-receiving tape 110 is bonded to the double-sided adhesive tape 150 through the adhesive layer 160U.

FIG. 21A shows the layer configuration of the print tape 100 that is formed by bonding the print-receiving tape 110 and the double-sided adhesive tape 150 to each other and FIG. 21B shows the state where the separation material layer 152 is peeled off from the print tape 100 and the print tape 100 is affixed to the adherend M by the adhesive layer 160L. As a result of the bonding, as shown in FIG. 21A, the print tape 100 includes the print-receiving tape 110, the adhesive layer 160U (having no particle added thereto), the adhesive layer 162U (having the pigment added thereto), the coloring layer 180, the transparent film layer 151A, the adhesive layer 162L (having the pigment added thereto), the adhesive layer 160L (having no particle added thereto), and the separation material layer 152 that are stacked on each other in this order from the upper side as shown (the one side in the thickness direction in this modification example) toward the lower side as shown (the other side in the thickness direction in this modification example).

As shown in FIG. 22A, the above may be configured to have the adhesive layer 162U disposed in contact with the upper side as shown (the one side in the thickness direction in this modification example) of the transparent film layer 151A without disposing the coloring layer 180 between the adhesive layer 162U and the transparent film layer 151A. FIG. 22B shows the state where the separation material layer 152 is peeled off from the print tape 100 formed by bonding the double-sided adhesive tape 150 having this configuration and the print-receiving tape 110 to each other and the print tape 100 is affixed to the adherend M by the adhesive layer 160L.

Production steps for the double-sided adhesive tape 150 will be described with reference to FIG. 23-FIG. 26.

As shown in FIG. 23, the transparent film layer 151A having the coloring layer 180 already formed thereon using, for example, a known printing approach is fed out from the film roll FR and is supplied to the adhesive coating head AH. The adhesive having the above composition (including the pigment) is coated on the face opposite to the face with the coloring layer 180 of the transparent film layer 151A by the adhesive coating head AH to establish a three-layer structure of the coloring layer 180, the transparent film layer 151A, and the adhesive layer 162L (having the pigment added thereto). The three-layer structure tape thereafter sequentially passes through the first drying chamber D1, the second drying chamber, the third drying chamber D3, the fourth drying chamber D4, and the fifth drying chamber D5 in this order to conduct the drying process therefor in five stages to be wound in the first tape roll TR1. The number of the drying chambers is not limited to five.

As shown in FIG. 24, the three-layer structure tape including the coloring layer 180, the transparent film layer 151, and the adhesive layer 162L is thereafter fed out from the first tape roll TR1 and, similarly to the above, is supplied to the adhesive coating head AH. The adhesive having the above composition (including no particles) is coated on the face on the side opposite to the transparent film layer 151A of the adhesive layer 161 by the adhesive coating head AH. As a result, the tape turns into a four-layer structure tape including the coloring layer 180, the transparent film layer 151A, the adhesive layer 162L (having the pigment added thereto), and the adhesive layer 160L (having no pigment added thereto) and, similarly to the above, the tape thereafter sequentially passes through the first to the fifth drying chambers D1-D5 to conduct the drying process therefor. The separation material layer 152 separately fed out from the separation material roll SR is thereafter bonded to the adhesive layer 160L and, as a result, the four-layer structure tape turns into a five-layer structure tape including the coloring layer 180, the transparent film layer 151A, the adhesive layer 162L, an adhesive layer 160L, and the separation material layer 152 to thereafter be wound in the second tape roll TR2.

As shown in FIG. 25, the five-layer structure tape including the coloring layer 180, the transparent film layer 151, the adhesive layer 162L, the adhesive layer 160L, and the separation material layer 152 is thereafter fed out from the second tape roll TR2 and, similarly to the above, is supplied to the adhesive coating head AH. The adhesive having the above composition (including the pigment) is coated on the face on the side opposite to the side with the transparent film layer 151A of the coloring layer 180 by the adhesive coating head AH. As a result, the tape has a six-layer structure of the adhesive layer 162U (having the pigment added thereto), the coloring layer 180, the transparent film layer 151A, the adhesive layer 162L (having the pigment added thereto), the adhesive layer 160L (having no pigment added thereto), and the separation material layer 152 and, similarly to the above, the tape thereafter sequentially passes through the first to the fifth drying chambers D1-D5 to conduct the drying process therefor to be wound in the third tape roll TR3.

As shown in FIG. 26, the six-layer structure tape including the adhesive layer 162U (having the pigment added thereto), the coloring layer 180, the transparent film layer 151A, the adhesive layer 162L, the adhesive layer 160L, and the separation material layer 152 is thereafter fed out from the third tape roll TR3 and, similarly to the above, is supplied to the adhesive coating head AH. The adhesive having the above composition (including no particle) is coated on the face on the side opposite to the side with the coloring layer 180 of the adhesive layer 162U by the adhesive coating head AH. As a result, the tape has a seven-layer structure tape including the adhesive layer 160U (having no pigment), the adhesive layer 162U (having the pigment added thereto), the coloring layer 180, the transparent film layer 151A, the adhesive layer 162L (having the pigment added thereto), the adhesive layer 160L (having no pigment added thereto), and the separation material layer 152 and, similarly to the above, the tape thereafter sequentially passes through the first to the fifth drying chambers D1-D5 to conduct the drying process therefor. As a result, the double-sided adhesive tape 150 is completed. The adhesive tape 150 completed in this manner is wound in a fourth tape roll TR4.

The description has been made with reference to FIG. 23-FIG. 26 taking the example of the case where the adhesive coating head AH is disposed only at one point, while an additional adhesive coating head AH may newly be disposed downstream of the drying chamber D5 in the transport path. In this case, the coating process for the adhesive layer 160L (described with reference to FIG. 24) can be conducted continuously and immediately after the coating process and the drying process in the drying chambers D1-D5 conducted for the adhesive layer 162L in FIG. 23.

In this modification example, the same advantage as that of the second embodiment is achieved. The two adhesive layers are disposed on each of the one side in the thickness direction (the upper side in FIG. 20) and the other side in the thickness direction (the lower side in FIG. 20) of the transparent film layer 151A. The adhesive layer 162U including the particles (that are those of the pigment in the example and that may be those of another additive or the like, and this will hereinafter be applied) is disposed on the one side in the thickness direction of the transparent film layer 151A and the adhesive layer 160U including no particle is further disposed on the one side in the thickness direction thereof. The adhesive layer 162L including the particles (that are those of the pigment in the above example and that may be those of another additive or the like, and this will hereinafter be applied) is disposed on the other side in the thickness direction of the transparent film layer 151A and the adhesive layer 160L including no particle is further disposed on the other side in the thickness direction thereof.

The desired effect (that is the desired color tone in the example of the pigment) by the addition of the particles can be achieved by adding the particles to the adhesive layers 162U and 162L disposed on the inner layer side, suppressing any degradation of the adhesiveness caused by the addition of the particles by adding no particle to the adhesive layers 160U and 160L exposed on the surface side.

The adhesive layer 160L on the other side in the thickness direction (the adhesive layer covered by the separation material layer 152) functions as an affixing adhesive layer for affixing to the adherend M and, because no particle is added thereto, also achieves an advantage that any transfer printing of the particles to the adherend M can be suppressed.

Similarly to the second embodiment, the thickness to of the adhesive layer 160U on the one side in the thickness direction is smaller than the thickness tB of the adhesive layer 162U and the thickness tD of the adhesive layer 160L on the other side in the thickness direction is smaller than the thickness tC of the adhesive layer 162L. Similarly to the above, this achieves an advantage that, because the adhesive layers 160U and 160L each have no particles added thereto and each therefore have high adhesiveness, relatively high adhesiveness thereof can be maintained even when the thicknesses thereof are reduced to be smaller than the thicknesses of the adhesive layers 162U and 162L.

(2-2) Application to Non-Laminate Cartridge

Similarly to FIG. 8 of the first embodiment, in this modification example, the cartridge called what-is-called "non-laminate" (more particularly, "receptor") cartridge is used. In FIG. 27 corresponding to FIG. 8, the cartridge 11 used in this modification example includes, similarly to that of FIG. 8, inside the housing 11A, the adhesive tape roll 14 (whose detailed layer configuration will be descried later), the ink ribbon roll 16, the ink ribbon take-up roller 17, and the transporting roller 18.

The adhesive tape roll 14 includes an adhesive tape 150N in relation to this modification example wound around the spool 50. As shown in an enlarged view in FIG. 27, the adhesive tape 150N includes the image-receiving layer 210, the coloring layer 180, the transparent film layer 151A that is transparent (or may be translucent similarly to the above, and the same will hereinafter be applied), the adhesive layer 162 having the desired particles same as those of the second embodiment and the modification example of (2-1) (that are those of the pigment in this example, and the same will hereinafter be applied) added thereto, the adhesive layer 160 having no particle added thereto, and the separation material layer 152 that are stacked on each other in this order from the spool 50 positioned on the side of the center in the radial direction (corresponding to the upper side shown in FIG. 28 described later) toward the outer side in the radial direction (corresponding to the lower side shown in FIG. 28 described later).

<Details of Layer Configuration of Tape>

FIG. 28A is an explanatory view showing the layer configurations of the adhesive tape 150N and a print tape 100N.

As shown in FIG. 28A, the adhesive tape 150N includes the transparent film layer 151A, the coloring layer 180 disposed in contact with the upper side as shown (the other side in the thickness direction in this modification example) of the transparent film layer 151A, the image-receiving layer 210 disposed in contact with the upper side as shown (the other side in the thickness direction in this modification example) of the coloring layer, the adhesive layer 162 disposed in contact with the lower side as shown (the one side in the thickness direction in this modification example) of the transparent film layer 151A, the adhesive layer 160 disposed in contact with the lower side as shown of the adhesive layer 162 and having no particle added thereto, and the separation material layer 152 disposed in contact with the lower side as shown (the one side in the thickness direction in this modification example) of the adhesive layer 160.

Similarly to the second embodiment, in this modification example, the adhesive layer 162 has the pigment added thereto at the desired volume ratio (for example, 5% to 50%). The volume ratio of the pigment in this case can be measured using the same approach as that described in the first embodiment. The coloring layer 180 has transmittance that is equal to or higher than 20%. In this modification example, the image-receiving layer 210 also has transmittance that is equal to or higher than 20%.

FIG. 28B shows the layer configuration of the print tape 100N whose image-receiving layer 210 of the adhesive tape 150N has the print R formed thereon.

Production steps for the adhesive tape 150N will be described with reference to FIG. 29 and FIG. 30.

As shown in FIG. 29, the transparent film layer 151A having the image-receiving layer 210 and the coloring layer 180 already formed thereon using, for example, a known printing approach is fed out from the film roll FR and is supplied to the adhesive coating head AH. The adhesive having the above composition (including the pigment) is coated on the face opposite to the face with the coloring layer 180 of the transparent film layer 151A by the adhesive coating head AH to establish a four-layer structure of the image-receiving layer 210, the coloring layer 180, the transparent film layer 151A, and the adhesive layer 162 (having the pigment added thereto). The four-layer structure tape thereafter sequentially passes through the first drying chamber D1, the second drying chamber, the third drying chamber D3, the fourth drying chamber D4, and the fifth drying chamber D5 in this order to conduct the drying process therefor in the five stages to be wound in the first tape roll TR1. The number of the drying chambers is not limited to five.

As shown in FIG. 30, the four-layer structure tape including the image-receiving layer 210, the coloring layer 180, the transparent film layer 151A, and the adhesive layer 162 is thereafter fed out from the first tape roll TR1 and, similarly to the above, is supplied to the adhesive coating head AH. The adhesive having the above composition (and having no particle added thereto) is coated on the face on the side opposite to the side with the transparent film layer 151A of the adhesive layer 162 by the adhesive coating head AH. As a result, the tape has a five-layer structure of the image-receiving layer 210, the coloring layer 180, the transparent film layer 151A, the adhesive layer 162 (having the pigment added thereto), and the adhesive layer 160 (having no particle added thereto) and, similarly to the above, the tape thereafter sequentially passes through the first to the fifth drying chambers D1-D5 to conduct the drying process therefor. The separation material layer 152 separately fed out from the separation material roll SR is thereafter bonded to the adhesive layer 160 and, as a result, a six-layer structure adhesive tape 150N is completed including the image-receiving layer 210, the coloring layer 180, the transparent film layer 151A, the adhesive layer 162, the adhesive layer 160, and the separation material layer 152. The adhesive tape 150N completed in this manner is wound in the second tape roll TR2.

The description has been made with reference to FIG. 29-FIG. 30 taking the example of the case where the adhesive coating head AH is disposed only at one point, while an additional adhesive coating head AH may newly be disposed downstream of the drying chamber D5 in the transport path. In this case, the coating process for the adhesive layer 160 and the bonding process for the separation material layer 152 (described with reference to FIG. 30) can be conducted continuously and immediately after the coating process and the drying process in the drying chambers D1-D5 conducted for the adhesive layer 162 in FIG. 29.

As shown in FIG. 28C, the above may be configured to have the image-receiving layer 210 disposed in contact with the upper side as shown (the other side in the thickness direction in this modification example) of the transparent film layer 151A without disposing the coloring layer 180 between the image-receiving layer 210 and the transparent film layer 151A. As shown in FIG. 28D, the above may also be configured to have the coloring layer 180 disposed in contact with the upper side as shown (the other side in the thickness direction in this modification example) of the transparent film layer 151A without disposing the image-receiving layer 210.

In this modification example, the same advantage as that of the second embodiment is achieved. The two adhesive layers are disposed on the one side in the thickness direction (the lower side in FIG. 28) of the transparent film layer 151A. The adhesive layer 162 including the particles (that are those of the pigment in the example while that may be those of another additive or the like, and the same will hereinafter be applied) is disposed on the one side in the thickness direction of the transparent film layer 151A, and the adhesive layer 160 having no particle is further disposed on the one side in the thickness direction of the adhesive layer 162. The desired effect (that is the desired color tone in the example of the pigment) by addition of particles can be achieved by adding the particles to the adhesive layer 162 disposed on the inner layer side, suppressing any degradation of the adhesiveness caused by the addition of the particles by adding no particle to the adhesive layer 160 exposed on the surface side. The adhesive layer 160 functions as an affixing adhesive layer for affixing to the adherend M in this modification example and, because no particle is added thereto, also achieves an advantage that any transfer printing of the particles to the adherend M can be suppressed.

The reason why the adhesiveness of the adhesive layer 160 needs to be higher than that of the adhesive layer 162 is, similarly to the above, as follows. As described with reference to FIG. 29, the adhesive layer 162 disposed on the one side in the thickness direction of the transparent film layer 151A (having the coloring layer 180 already formed thereon) is bonded to the transparent film layer 151A in the state where the layers are controlled by the production equipment of the plant shown in, for example, FIG. 29-FIG. 30 during the production. In contrast, as to the adhesive layer 160, because no adherend thereof is determined and the user conducts the bonding, the adhesiveness of the adhesive layer 160 needs to be higher than that of the adhesive layer 162.

(2-3) Replacement of Transparent Film Layer and Coloring Layer with Each Other

As shown in FIG. 31A, the image-receiving layer 210, the transparent film layer 151A, the coloring layer 180, the adhesive layer 162, the adhesive layer 160, and the separation material layer 152 may be stacked on each other in this order from the upper side as shown (the other side in the thickness direction) toward the lower side as shown (the one side in the thickness direction) by replacing the transparent film layer 151A and the coloring layer 180 with each other in the layer configuration of the adhesive tape 150N shown in FIG. 28A. As shown in FIG. 31B, the coloring layer 180 may not be disposed in the layer configuration of the adhesive tape 150N shown in FIG. 31A (in this case, as a result, the layer configuration same as that in FIG. 28C is established) or, as shown in FIG. 31C, the image-receiving layer 210 may not be disposed in the layer configuration of the adhesive tape 150N shown in FIG. 31A. In these cases, the same advantage as above is achieved.

<Third Embodiment>

The third embodiment of the present disclosure will be described with reference to FIG. 32-FIG. 47. The equivalent components to those of the first embodiment, the second embodiment, and the modification examples thereof are given the same reference numerals and will not again be described or will simply be described.

Similarly to the first and the second embodiments, this embodiment handles the case where the what-is-called laminate cartridge is used. FIG. 32 shows a plan view showing the internal structure on the back side of the apparatus main body of the print label producing apparatus in the third embodiment, corresponding to FIG. 2 of the first embodiment. In FIG. 32, as shown in an enlarged view in FIG. 32, the double-sided adhesive tape 150 wound in the adhesive tape roll 14 included in the housing 11A of the cartridge 11 of this embodiment includes an adhesive layer 164 having desired particles (that are those of the pigment in this example, and the same will hereinafter be applied) added thereto, the coloring layer 180, the film layer 151, the adhesive layer 170, and the separation material layer 152 that are stacked on each other in this order from the spool 50 positioned on the side of the center in the radial direction (corresponding to the upper side shown in FIG. 33 described later) toward the outer side in the radial direction (corresponding to the lower side shown in FIG. 33 described later). Similarly to the above, as shown in FIG. 32, the print-receiving tape roll 15 includes, for example, the transparent or translucent print-receiving tape 110 that is wound around the spool 60. The housing 11A also includes the ink ribbon roll 16 same as above.

<Details of Layer Configuration of Tape>

FIG. 33 is an explanatory view showing the layer configurations of the print-receiving tape 110 and the double-sided adhesive tape 150.

As shown in FIG. 33, the double-sided adhesive tape 150 includes the film layer 151, the coloring layer 180 disposed in contact with the upper side as shown (the one side in the thickness direction in the configuration in FIG. 33-FIG. 35) of the film layer 151, the adhesive layer 164 disposed in contact with the upper side as shown (the one side in the thickness direction in the configuration in FIG. 33-FIG. 35) of the coloring layer 180 and including the adhesive to which the pigment is added, the adhesive layer 170 disposed in contact with the lower side as shown (the other side in the thickness direction in the configuration in FIG. 33-FIG. 35) of the film layer 151, and the separation material layer 152 disposed in contact with the lower side as shown (the other side in the thickness direction in the configuration in FIG. 33-FIG. 35) of the adhesive layer 170 and covering the adhesive layer 170.

This embodiment is characterized in that, in the above, when the adhesive layer 164 having the particles added thereto is partitioned into a one-side region 164o on the upper side as shown (the one side in the thickness direction in the configuration in FIG. 33-FIG. 35) and an other-side region 164i on the lower side as shown (the other side in the thickness direction in the configuration in FIG. 33-FIG. 35) through a plane that virtually bisects the adhesive layer 164 (and that is represented by "bisector k" in FIG. 33, and this will hereinafter be simply referred to as "through the bisector k" or the like), the volume ratio of the pigment relative to the adhesive in the other-side region 164i is greater than the volume ratio of the pigment relative to the adhesive in the one-side region 164o. In other words, as represented in FIG. 33, the concentration of the pigment in the adhesive in the other-side region 164i is higher than the concentration of the pigment in the adhesive in the one-side region 164o. For example, the volume ratio of the particles in the one-side region 164o to be the side to be exposed on the surface side is set to be smaller than that of the other-side region 164i by using the gravity falling of the particles (that are those of the pigment in this example) by, for example, reducing the solid content concentration or the coating speed to be lower than the ordinary ones or taking the drying time period after the coating to be longer than the ordinary one during the coating (see FIG. 37 and the like described later). For example, the volume ratio of the particles in the other-side region 164i is greater than a 1.5-fold value of the volume ratio of the particles in the one-side region 164o. The technical meaning of the fact that the volume ratio of the particles in the other-side region 164i is greater than a 1.5-fold value of the volume ratio of the particles in the one-side region 164o is as follows. This is because it is ideal that more pigment particles concentrate on the bisected lower side to secure the adhesive force.

In the third embodiment, the volume ratio of the added pigment can be determined using, for example, the following methods (the same will be applied to modification examples of this embodiment). The weight of the pigment present in each of the upper side and the lower side partitioned by bisecting the layer is determined by separating the pigment-including adhesive layer along the bisector k, thereafter measuring the volume and the weight of each of the separated adhesive layers, dissolving each of the separated adhesive layers, and separating the pigment using centrifugal separation or the like, as the first approach. Because the same pigment is included, the weight ratios of the pigment correspond to the volume ratios thereof.

The area of the pigment present in each of the upper side and the lower side of the bisector k of the cross-section of the adhesive layer can be measured by observing the cross-section using an electron microscope or an optical microscope, and the conversion into the volume is conducted by continuously increasing the cross-sections to be observed to thereby be able to determine the volume ratios of the pigment present in the upper side and the lower side, as the second approach.

The concentration of the pigment does not need to necessarily be uniform in each of the one-side region 164o and the other-side region 164i and, for example, the regions may each have a concentration gradient such as, for example, a gradual decrease of the concentration from a lower point to an upper point as shown. When the pigment concentration in the one-side region 164o is virtually observed to be lower than the pigment concentration in the other-side region 164i, for example, the adhesive layer 164 may have a concentration gradient such as, for example, a gradual decrease of the concentration from a lower point to an upper point as shown for the overall adhesive layer 164.

Because the above approach (that is, the approach using the gravity falling of the particles) is employed for the adhesive coating or the drying process, the particle diameter of each of the particles (that are those of the pigment in the example) need to be large to some extent. In this example, the average particle diameter of the pigment in the adhesive layer 164 is, for example, equal to or larger than 10 [μm]. The technical meaning of the fact that the average particle diameter is equal to or larger than 10 µm is as follows. It is known that the sedimentation speed of a particle depends on the magnitude of the particle diameter and is in proportion to the square of the particle diameter. For a particle of 10 µm or smaller, the sedimentation of the particle takes time and realization thereof is difficult.

Especially, the average particle diameter of the pigment in the other-side region 164*i* is larger than the average particle diameter of the particles in the one-side region 164*o* (see the representation in FIG. 33). For example, the average particle diameter of the pigment in the other-side region 164*i* is larger than a 1.5-fold value of the average particle diameter of the pigment in the one-side region 164*o*.

The technical meaning of the fact that the average particle diameter of the particles in the other-side region 164*i* is larger than a 1.5-fold value of the average particle diameter of the particles in the one-side region 164*o* is as follows. This is because it is ideal that more pigment particles concentrate on the bisected lower side to secure the adhesive force.

The adhesive force of the adhesive layer 164 is equal to or higher than 3 [N]/10 [mm].

The print-receiving tape 110 has the print R formed on the surface of the side (that is the lower side as shown and that is the other side in the thickness direction in the configuration in FIG. 33-FIG. 35) facing the double-sided adhesive tape 150. The print-receiving tape 110 is bonded to the double-sided adhesive tape 150 through the adhesive layer 164.

FIG. 34A shows the layer configuration of the print tape 100 that is formed by bonding the print-receiving tape 110 and the double-sided adhesive tape 150 to each other and FIG. 34B shows the state where the separation material layer 152 is peeled off from the print tape 100 and the print tape 100 is affixed to the adherend M by the adhesive layer 170. As a result of the bonding, as shown in FIG. 34A, the print tape 100 includes the print-receiving tape 110, the adhesive layer 164 (including the one-side region 164*o* to be the upper half thereof as shown and the other-side region 164*i* to be the lower half thereof as shown), the coloring layer 180, the film layer 151, the adhesive layer 170, and the separation material layer 152 that are stacked on each other in this order from the upper side as shown (one side in the thickness direction in the configuration in FIG. 33-FIG. 35) toward the lower side as shown (the other side in the thickness direction in the configuration in FIG. 33-FIG. 35).

As shown in FIG. 35A, the above may be configured to have the adhesive layer 164 disposed in contact with the upper side as shown (the one side in the thickness direction in the configuration of FIG. 33-FIG. 35) of the film layer 151 without disposing the coloring layer 180 between the adhesive layer 164 and the film layer 151. FIG. 35B shows the state where the separation material layer 152 is peeled off from the print tape 100 formed by bonding the double-sided adhesive tape 150 having this configuration and the print-receiving tape 110 to each other, and the print tape 100 is affixed to the adherend M by the adhesive layer 170.

Production steps for the double-sided adhesive tape 150 will be described with reference to FIG. 36-FIG. 37.

Similarly to FIG. 16, in FIG. 36, the film layer 151 having the coloring layer 180 already formed thereon using, for example, a known printing approach is fed out from the film roll FR and is supplied to the adhesive coating head AH. The adhesive having the above composition is coated on the face opposite to the face with the coloring layer 180 of the film layer 151 by the adhesive coating head AH to establish a three-layer structure of the coloring layer 180, the film layer 151, and the adhesive layer 170. The three-layer structure tape thereafter sequentially passes through the first drying chamber D1, the second drying chamber, the third drying chamber D3, the fourth drying chamber D4, and the fifth drying chamber D5 in this order to conduct the drying process therefor in five stages. The three-layer structure tape is wound in the first tape roll TR1. The number of the drying chambers is not limited to five.

The separation material layer 152 separately fed out from the separation material roll SR is thereafter bonded to the adhesive layer 170 and, as a result, the three-layer structure tape turns into a four-layer structure tape including the coloring layer 180, the film layer 151, the adhesive layer 170, and the separation material layer 152 to thereafter be wound in the first tape roll TR1.

As shown in FIG. 37, the four-layer structure tape including the coloring layer 180, the film layer 151, the adhesive layer 170, and the separation material layer 152 is thereafter fed out from the first tape roll TR1 and, similarly to the above, is supplied to the adhesive coating head AH. The adhesive having the above composition (including, for example, the pigment as the above particles) is coated on the face on the side opposite to the side with the film layer 151 of the coloring layer 180 by the adhesive coating head AH. As a result, the tape has a five-layer structure of the adhesive layer 164 (having the pigment added thereto), the coloring layer 180, the film layer 151, the adhesive layer 170, and the separation material layer 152 and, similarly to the above, the tape thereafter sequentially passes through the first to the fifth drying chambers D1-D5 to conduct the drying process therefor. At this time, as above, the volume ratio of the particles in the one-side region 164*o* to be the side to be exposed on the surface side can be set to be smaller than that of the other-side region 164*i* in the adhesive layer 164 by reducing the solid content concentration or the coating speed to be lower than the ordinary ones during the adhesive coating by the adhesive coating head AH or taking the drying time period after the coating in the first to the fifth drying chambers D1-D5 to be longer than the ordinary one. When the drying process for the adhesive layer 164 (having the pigment added thereto), the coloring layer 180, the film layer 151, the adhesive layer 170, and the separation material layer 152 comes to an end, the double-sided adhesive tape 150 is completed. The double-sided adhesive tape 150 completed in this manner is wound in the second tape roll TR2.

The description has been made with reference to FIG. 36 and FIG. 37 taking the example of the case where the adhesive coating head AH is disposed only at one point, while an additional adhesive coating head AH may newly be disposed downstream of the drying chamber D5 in the transport path.

<Advantage of Third Embodiment>

As above, the adhesive layer 164 is disposed on the one side in the thickness direction of the film layer 151 in the third embodiment. In this case, when the adhesive layer 164 is bisected by the bisector k, the volume ratio of the adhesive is greater in the other-side region 164*i* than in the one-side region 164*o*. The volume ratio of the particles (that are those of the pigment in this case, and the same will hereinafter be applied) in the one-side region 164*o* to be the side to be exposed on the surface side is smaller (than that in the other-side region 164*i*). This is because the adhesiveness of the one-side region 164*o* needs to be higher than that of the other-side region 164*i*.

The reason why the adhesiveness of the one-side region 164*o* needs to be higher than that of the other-side region 164*i* is as follows. As described with reference to FIG. 37, the other-side region 164*i* disposed on the one side in the thickness direction of the film layer 151 (having the coloring layer 180 already formed thereon) is bonded to the coloring layer 180 in the state where the layers are controlled by the production equipment of the plant shown in, for example, FIG. 36 and FIG. 37 during the production. In contrast, the one-side region 164*o* is bonded to the print-receiving tape 110 in the print label producing apparatus 1 when the print label is produced as above. The adhesiveness of the one-side region 164*o* therefore needs to be higher than that of the other-side region 164*i*.

The volume ratio of the particles in the one-side region 164*o* is smaller than that of the other-side region 164*i* as above and, as a result, any degradation of the adhesiveness caused by the addition of the particles to the adhesive layer 164 can be suppressed without, for example, increasing the thickness of the adhesive layer 164. The desired effect (that is the desired color tone in the example of the pigment) by the addition of the particles can be achieved (without reducing the amount of the particles as the overall adhesive layer) by adding more particles to the other-side region 164*i* on the inner layer side by the amount corresponding to the reduced volume ratio of the particles in the one-side region 164*o*.

In the third embodiment, especially, the average particle diameter of the particles in the other-side region 164*i* is larger than the average particle diameter of the particles in the one-side region 164*o*. As a result, the occupancy of the particles in the one-side region 164*o* to be the side to be exposed on the surface side can reliably be set to be smaller (than that of the other-side region 164*i*) and any degradation of the adhesiveness caused by the addition of the particles can be suppressed.

In the third embodiment, especially, the pigment as the particles is added to the adhesive layer 164. The desired color development can be achieved by securing the volume ratio of the pigment in the overall adhesive layer 164 using the above approach.

In the third embodiment, especially, the adhesive force of the adhesive layer 164 is equal to or higher than 3 [N]/10 [mm] and, as a result, the adhesiveness by the adhesive layer 164 can be secured.

<Modification Example of Third Embodiment>

The third embodiment is not limited to the above disclosure and various modifications can be made thereto within the scope not departing from the gist and the technical idea thereof. The modification examples thereof will sequentially be described below.

(3-1) Case Where One More Particle-Including Adhesive Layer is Disposed

FIG. 38 shows the internal structure on the back side of the apparatus main body of the print label producing apparatus in this modification example, corresponding to FIG. 32 of the third embodiment. In FIG. 38, similarly to the third embodiment, the cartridge 11 used in this modification example includes, in the housing 11A, the adhesive tape roll 14 (whose detailed layer configuration will be described later), the ink ribbon roll 16, the ink ribbon take-up roller 17, and the transporting roller 18.

The adhesive tape roll 14 includes the double-sided adhesive tape 150 in relation to this embodiment wound around the spool 50. As shown in an enlarged view in FIG. 38, the double-sided adhesive tape 150 includes an adhesive layer 164U having desired particles (that are those of the pigment in this example, and the same will hereinafter be applied) added thereto and including the one-side region 164*o* and the other-side region 164*i* similarly to the adhesive layer 164 of the third embodiment, the coloring layer 180, the transparent film layer 151A that is transparent (or may be translucent, and the same will hereinafter be applied), the adhesive layer 164L having the desired particles added thereto and including the one-side region 164*o* and the other-side region 164*i* similarly to the adhesive layer 164U, (and having an inverse positional relation in the thickness direction as to the one-side region 164*o* and the other-side region 164*i*, and the details thereof will be described later), and the separation material layer 152 that are stacked on each other in this order from the spool 50 positioned on the side of the center in the radial direction (corresponding to the upper side as shown in FIG. 39 described later) toward the outer side in the radial direction (corresponding to the lower side shown in FIG. 39 described later). Similarly to the case shown in FIG. 2, the print-receiving tape roll 15 includes, for example, a transparent or a translucent print-receiving tape 110 wound around the spool 60. The housing 11A also includes the ink ribbon 16 similarly to the above.

<Details of Layer Configuration of Tape>

FIG. 39 is an explanatory view showing the layer configurations of the print-receiving tape 110 and the double-sided adhesive tape 150.

As shown in FIG. 39, the double-sided adhesive tape 150 in this modification example includes the transparent film layer 151A, the coloring layer 180 disposed in contact with the upper side as shown (the one side in the thickness direction in this modification example) of the transparent film layer 151A, the adhesive layer 164U disposed in contact with the upper side as shown (the one side in the thickness direction in this modification example) of the coloring layer, the adhesive layer 164L disposed in contact with the lower side as shown (the other side in the thickness direction in this modification example) of the transparent film layer 151A, and the separation material layer 152 disposed in contact with the lower side as shown (the other side in the thickness direction in this modification example) of the adhesive layer 164L and covering the adhesive layer 164L.

This modification example is characterized in that, similarly to the adhesive layer 164 of the third embodiment, when the adhesive layer 164U having the particles added thereto is partitioned into the one-side region 164*o* on the upper side as shown (the one side in the thickness direction in this modification example) and the other-side region 164*i* on the lower side as shown (the other side in the thickness direction in this modification example) through a plane that virtually bisects the adhesive layer 164U (and that is represented by "bisector kl" in FIG. 39, and this will hereinafter be simply referred to as "through the bisector kl" or the like), the volume ratio of the pigment relative to the adhesive in the other-side region 164*i* is greater than the volume ratio of the pigment relative to the adhesive in the one-side region 164*o*. In other words, as represented in FIG. 39, the concentration of the pigment in the adhesive in the other-side region 164*i* is higher than the concentration of the pigment in the adhesive in the one-side region 164*o*. For example, the volume ratio of the particles in the one-side region 164*o* to be the side to be exposed on the surface side is set to be smaller than that of the other-side region 164*i* by, for example, reducing the solid content concentration or the coating speed to be lower than the ordinary ones during the coating (see FIG. 42, FIG. 43, and the like described later) or taking the drying time period after the coating to be longer than the ordinary one. As to the volume ratio of the added pigment, similarly to the above, the particle diameter and the volume rate of the particles present in each of the upper portion and the lower portion of the bisector k can be measured by, for example, observing the cross-section of the adhesive layer using an optical microscope, an electron microscope, or the like.

Similarly to the above, when the adhesive layer 164L having the particles added thereto is partitioned into the other-side region 164i on the upper side as shown (the one side in the thickness direction in this modification example) and the one-side region 164o on the lower side as shown (the other side in the thickness direction in this modification example) through a plane that virtually bisects the adhesive layer 164L (and that is represented by "bisector k2" in FIG. 39, and this will hereinafter be simply referred to as "through the bisector k2" or the like), the volume ratio of the pigment relative to the adhesive in the other-side region 164i is greater than the volume ratio of the pigment relative to the adhesive in the one-side region 164o. In other words, as represented in FIG. 39, the concentration of the pigment in the adhesive in the other-side region 164i is higher than the concentration of the pigment in the adhesive in the one-side region 164o (of which the detailed approach is same as above, see FIG. 42, FIG. 43, and the like described later) and the volume ratio of the particles in the one-side region 164o to be the side to be exposed on the surface side is set to be smaller than that of the other-side region 164i. Similarly to the above, as to the volume ratio of the added pigment, the particle diameter and the volume rate of the particles present in each of the upper portion and the lower portion of the bisector k can be measured by, for example, observing the cross-section of the adhesive layer using an optical microscope, an electron microscope, or the like.

As to each of the adhesive layers 164U and 164L, in the one-side region 164o and the other-side region 164i, the concentration of the pigment does not necessarily need to be uniform and, for example, the adhesive layers may have concentration gradients such as that whose concentration is gradually reduced from a lower point toward an upper point as shown in the adhesive layer 164U and that whose concentration is gradually reduced from an upper point toward a lower point as shown in the adhesive layer 164L. When the pigment concentration in the one-side region 164o is virtually observed to be lower than the pigment concentration in the other-side region 164i, the overall adhesive layer 164U may have a concentration gradient such as, for example, that whose concentration is gradually reduced from a lower point toward an upper point as shown and the overall adhesive layer 164L may have a concentration gradient such as, for example, that whose concentration is gradually reduced from an upper point toward a lower point as shown.

As represented in FIG. 39, as to the adhesive layers 164U and 164L, the average particle diameter of the pigment in the other-side region 164i is set to be larger than the average particle diameter in the one-side region 164o using the above approach employed during the adhesive coating, the drying process, and the like.

The adhesive force of each of the adhesive layers 164U and 164L is equal to or higher than 3 [N]/10 [mm].

On the other hand, the print-receiving tape 110 has the print R formed as above on the surface of the side (that is the lower side as shown and that is the other side in the thickness direction in this modification example) that faces the double-sided adhesive tape 150. The print-receiving tape 110 is bonded to the double-sided adhesive tape 150 through the adhesive layer 164U.

FIG. 40A shows the layer configuration of the print tape 100 formed by bonding the print-receiving tape 110 and the double-sided adhesive tape 150 to each other and FIG. 40B shows the state where the separation material layer 152 is peeled off from the print tape 100 and the print tape 100 is affixed to an adherend M by the adhesive layer 164L. As a result of the bonding, as shown in FIG. 40A, the print tape 100 includes the print-receiving tape 110, the adhesive layer 164U (including the one-side region 164o to be the upper half thereof as shown and the other-side region 164i to be the lower half thereof as shown), the coloring layer 180, the transparent film layer 151A, the adhesive layer 164L (including the other-side region 164i to be the upper half thereof as shown and the one-side region 164o to be the lower half thereof as shown), and the separation material layer 152 that are stacked on each other in this order from the upper side as shown (the one side in the thickness direction in this modification example) toward the lower side as shown (the other side in the thickness direction in this modification example).

As shown in FIG. 41A, the above may be configured to have the adhesive layer 164U disposed in contact with the upper side as shown (the one side in the thickness direction in this modification example) of the transparent film layer 151A without disposing the coloring layer 180 between the adhesive layer 164U and the transparent film layer 151A. FIG. 41B shows the state where the separation material layer 152 is peeled off from the print tape 100 formed by bonding the double-sided adhesive tape 150 having this configuration and the print-receiving tape 110 to each other and the print tape 100 is affixed to the adherend M by the adhesive layer 164L.

Production steps for the double-sided adhesive tape 150 will be described with reference to FIG. 42-FIG. 43.

As shown in FIG. 42, the transparent film layer 151A having the coloring layer 180 already formed thereon using, for example, a known printing approach is fed out from the film roll FR and is supplied to the adhesive coating head AH. The adhesive having the above composition (including the pigment) is coated on the face opposite to the face with the coloring layer 180 of the transparent film layer 151A by the adhesive coating head AH to establish a three-layer structure of the coloring layer 180, the transparent film layer 151A, and the adhesive layer 164L (having the pigment added thereto). The three-layer structure tape thereafter sequentially passes through the first drying chamber D1, the second drying chamber, the third drying chamber D3, the fourth drying chamber D4, and the fifth drying chamber D5 in this order and, as a result, the drying process is conducted therefor in five stages. At this time, as above, in the adhesive layer 164L, the volume ratio of the particles in the one-side region 164o to be the side to be exposed on the surface side can be set to be smaller than that of the other-side region 164i by reducing the solid content concentration or the coating speed to be lower than the ordinary ones during the adhesive coating or taking the drying time period after the coating in the first to the fifth drying chambers D1-D5 to be longer than the ordinary one. When the drying process for the tape including the three layers of the adhesive layer 164L (having the pigment added thereto), the transparent film layer 151A, and the coloring layer 180 comes to an end, the separation material layer 152 separately fed out from the separation material roll SR is bonded to the adhesive layer 164L and, as a result, the three-layer structure tape turns into a four-layer structure tape including the coloring layer 180, the transparent film layer 151A, the adhesive layer 164L, and the separation material layer 152 to thereafter be wound in the first tape roll TR1. The number of the drying chambers is not limited to five.

As shown in FIG. 43, the four-layer structure tape including the coloring layer 180, the transparent film layer 151A, the adhesive layer 164L, and the separation material layer 152 is thereafter fed out from the first tape roll TR1 and, similarly to the above, is supplied to the adhesive coating head AH. The adhesive having the above composition (including the pigment) is coated on the face opposite to the face with the transparent film layer 151A of the coloring layer 180 by the adhesive coating head AH. As a result, the tape has a five-layer structure of the adhesive layer 164U (having the pigment added thereto), the coloring layer 180, the transparent film layer 151A, the adhesive layer 164L (having the pigment added thereto), and the separation material layer 152 and, similarly to the above, the tape thereafter sequentially passes through the first to the fifth drying chambers D1-D5 to conduct the drying process therefor. At this time, similarly to the above, in the adhesive layer 164U, the volume ratio of the particles in the one-side region 164o to be the side to be exposed on the surface side can be set to be smaller than that of the other-side region 164i by reducing the solid content concentration or the coating speed to be lower than the ordinary ones during the adhesive coating by the adhesive coating head AH or taking the drying time period after the coating in the first to the fifth drying chambers D1-D5 to be longer than the ordinary one. When the drying process for the tape including the five layers of the adhesive layer 164U (having the pigment added thereto), the coloring layer 180, the transparent film layer 151A, the adhesive layer 164L (having the pigment added thereto), and the separation material layer 152 comes to an end, the double-sided adhesive tape 150 is completed. The double-sided adhesive tape 150 completed in this manner is wound in the second tape roll TR2.

The description has been made with reference to FIG. 42 and FIG. 43 taking the example of the case where the adhesive coating head AH is disposed only at one point, while an additional adhesive coating head AH may newly be disposed downstream of the drying chamber D5 in the transport path.

In this modification example, the same advantage as that of the third embodiment can be achieved. The adhesive layer 164U is disposed on the one side in the thickness direction of the transparent film layer 151A and the adhesive layer 164L is disposed on the other side in the thickness direction of the transparent film layer 151A. When the adhesive layer 164U is bisected by the bisector k1, the volume ratio of the adhesive is greater in the other-side region 164i thereof than in the one-side region 164o thereof. When the adhesive layer 164L is bisected by the bisector k2, the volume ratio of the adhesive is greater in the other-side region 164i thereof than in the one-side region 164o thereof. In both of the adhesive layers 164U and 164L, the volume ratio of the particles (that are those of the pigment in this example, and the same will hereinafter be applied) in the one-side region 164o to be the side to be exposed on the surface side is smaller (than that in the other-side region 164i). This is because the adhesiveness of the one-side region 164o needs to be higher than that of the other-side region 164i.

The reason why the adhesiveness of the one-side region 164o needs to be higher than that of the other-side region 164i in the adhesive layer 164U is as follows. As described with reference to FIG. 43, the other-side region 164i disposed on the transparent film layer 151A (having the coloring layer 180 already formed thereon) is bonded to the coloring layer 180 in the state where the layers are controlled by the production equipment of the plant shown in, for example, FIG. 42 and FIG. 43 during the production. In contrast, the one-side region 164o is bonded to the print-receiving tape 110 in the print label producing apparatus 1 when the print label is produced as above. The adhesiveness of the one-side region 164o therefore needs to be higher than that of the other-side region 164i.

The reason why the adhesiveness of the one-side region 164o needs to be higher than that of the other-side region 164i in the adhesive layer 164L is as follows. As described with reference to FIG. 42, the other-side region 164i disposed on the transparent film layer 151A (having the coloring layer 180 already formed thereon) is bonded to the transparent film layer 151A in the state where the layers are controlled by the production equipment of the plant shown in, for example, FIG. 42 and FIG. 43 during the production. In contrast, because any object for bonding to the one-side region 164o is not determined and the user conducts this bonding, the adhesiveness of the one-side region 164o needs to be higher than that of the other-side region 164i.

The volume ratio of the particles in the one-side region 164o is smaller than that of the other-side region 164i as above and, as a result, any degradation of the adhesiveness caused by the addition of the particles to the adhesive layers 164U and 164L can be suppressed without, for example, increasing the thickness of each of the adhesive layers 164U and 164L. The desired effect (that is the desired color tone in the example of the pigment) by the addition of the particles can be achieved (without reducing the amount of the particles as the overall adhesive layer) by adding more particles to the other-side region 164i on the inner layer side by the amount corresponding to the reduced volume ratio of the particles in the one-side region 164o.

The adhesive layer 164L on the other side in the thickness direction (the adhesive layer covered by the separation material layer 152) functions as an affixing adhesive layer for affixing to the adherend M and, because the one-side region 164o having the low particle concentration is present in the outermost layer as above, an advantage of being able to suppress any transfer printing of the particles to the adherend M is also achieved.

In this modification example, similarly to the third embodiment, the average particle diameter of the particles in the other-side region 164i is larger than the average particle diameter of the particles in the one-side region 164o. As a result, the occupancy of the particles in the one-side region 164o to be the side to be exposed on the surface side can reliably be set to be low and any degradation of the adhesiveness caused by the addition of the particles can be suppressed. The pigment is added as the particles to the adhesive layers 164U and 164L while the desired color development can be achieved by securing the volume ratio of the pigment in the overall adhesive layers 164U and 164L using the above approach.

The adhesive force of each of the adhesive layers 164U and 164L is equal to or higher than 3 [N]/10 [mm] and, as a result, the adhesiveness by each of the adhesive layers 164U and 164L can be secured.

(3-2) Application to Non-Laminate Cartridge

Similarly to FIG. 27 of the second embodiment, in this modification example, the cartridge called what-is-called "non-laminate" (more particularly, "receptor") cartridge is used. In FIG. 44 corresponding to FIG. 27, similarly to FIG. 27, the cartridge 11 used in this modification example includes, inside the housing 11A, the adhesive tape roll 14 (whose detailed layer configuration will be descried later), the ink ribbon roll 16, the ink ribbon take-up roller 17, and the transporting roller 18.

The adhesive tape roll 14 includes an adhesive tape 150N in relation to this modification example wound around the spool 50. As shown in an enlarged view in FIG. 44, the adhesive tape 150N includes the image-receiving layer 210, the coloring layer 180, the transparent film layer 151A that is transparent as above (or may be translucent, and the same will hereinafter be applied), the adhesive layer 164L same as that of the modification example in (3-1), and the separation material layer 152 that are stacked on each other in this order from the spool 50 positioned on the side of the center in the radial direction (corresponding to the upper side shown in FIG. 45 described later) toward the outer side in the radial direction (corresponding to the lower side shown in FIG. 45 described later).

<Details of Layer Configuration of Tape>

FIG. 45A and FIG. 45B are explanatory views each showing the layer configurations of the adhesive tape 150N and the print tape 100N.

As shown in FIG. 45A, the adhesive tape 150N includes the transparent film layer 151A, the coloring layer 180 disposed in contact with an upper side as shown (the other side in the thickness direction in this modification example) of the transparent film layer 151A, the image-receiving layer 210 disposed in contact with the upper side as shown (the other side in the thickness direction in this modification example) of the coloring layer, the adhesive layer 164L disposed in contact with the lower side as shown (the one side in the thickness direction in this modification example) of the transparent film layer 151A, and the separation material layer 152 disposed in contact with the lower side as shown (the one side in the thickness direction in this modification example) of the adhesive layer 164L and covering the adhesive layer 164L.

Similarly to the modification example in (3-1), in this modification example, when the adhesive layer 164L having the particles added thereto is partitioned into the other-side region 164i on the upper side as shown (the other side in the thickness direction in this modification example) and the one-side region 164o on the lower side as shown (the one side in the thickness direction in this modification example) through a plane that virtually bisects the adhesive layer 164L (and that is represented by "bisector k2" in FIG. 45), the volume ratio of the pigment relative to the adhesive in the other-side region 164i is greater than the volume ratio of the pigment relative to the adhesive in the one-side region 164o. In other words, as represented in FIG. 45, the concentration of the pigment in the adhesive in the other-side region 164i is higher than the concentration of the pigment in the adhesive in the one-side region 164o (the specific approach is same as above, see FIG. 46 and the like described later) and the volume ratio of the particles in the one-side region 164o to be the side to be exposed on the surface side is smaller than that of the other-side region 164i. As to the volume ratio of the added pigment, similarly to the above, the particle diameter and the volume ratio of the particles present in the upper portion and the lower portion of the bisector k can be measured by, for example, observing the cross-section of the adhesive layer using an optical microscope, an electron microscope, or the like.

In the adhesive layer 164L, similarly to the above, in the one-side region 164o and in the other-side region 164i, the concentration of the pigment does not necessarily need to be uniform and the adhesive layer 164L may have a concentration gradient such as that whose concentration is gradually reduced from an upper point toward a lower point as shown. When the pigment concentration in the one-side region 164o is virtually observed to be lower than the pigment concentration in the other-side region 164i, for example, the overall adhesive layer 164L may have a concentration gradient such as that whose concentration is gradually reduced from an upper point toward a lower point thereof.

As represented in FIG. 45, in the adhesive layer 164L, the average particle diameter of the pigment in the other-side region 164i is set to be larger than the average particle diameter of the particles in the one-side region 164o by employing the above approach during the adhesive coating or the drying process.

The adhesive force of the adhesive layer 164L is equal to or higher than 3 [N]/10 [mm].

The coloring layer 180 has transmittance that is equal to or higher than 20%. In this modification example, the image-receiving layer 210 also has transmittance that is equal to or higher than 20%.

FIG. 45B shows the layer configuration of the print tape 100N whose image-receiving layer 210 of the adhesive tape 150N has the print R formed thereon.

Production steps for the adhesive tape 150N will be described with reference to FIG. 46.

As shown in FIG. 46, the transparent film layer 151A having the image-receiving layer 210 and the coloring layer 180 already formed thereon using, for example, a known printing approach is fed out from the film roll FR and is supplied to the adhesive coating head AH. The adhesive having the above composition (including the pigment) is coated on the face opposite to the face with the coloring layer 180 of the transparent film layer 151A by the adhesive coating head AH to establish a four-layer structure including the image-receiving layer 210, the coloring layer 180, the transparent film layer 151A, and the adhesive layer 164L (having the pigment added thereto). The four-layer structure tape thereafter sequentially passes through the first drying chamber D1, the second drying chamber, the third drying chamber D3, the fourth drying chamber D4, and the fifth drying chamber D5 in this order to conduct the drying process therefor in the five stages. At this time, as above, the volume ratio of the particles in the one-side region 164o to be the side to be exposed on the surface side can be set to be smaller than that of the other-side region 164i by reducing the solid content concentration or the coating speed to be lower than the ordinary ones during the adhesive coating by the adhesive coating head AH or taking the drying time period after the coating in the first to the fifth drying chambers D1-D5 to be longer than the ordinary one. When the drying process for the four-layer structure tape including the adhesive layer 164L (having the pigment added thereto), the transparent film layer 151A, the coloring layer 180, and the image-receiving layer 210 comes to an end, the separation material layer 152 separately fed out from the separation material roll SR is bonded to the adhesive layer 160 and, as a result, a five-layer structure adhesive tape 150N is completed including the image-receiving layer 210, the coloring layer 180, the transparent film layer 151A, the adhesive layer 164L, and the separation material layer 152. The adhesive tape 150N completed in this manner is wound in the second tape roll TR2.

As shown in FIG. 45C, the above may be configured to have the image-receiving layer 210 disposed in contact with the upper side as shown (the other side in the thickness direction in this modification example) of the transparent film layer 151A without disposing the coloring layer 180 between the image-receiving layer 210 and the transparent film layer 151A. As shown in FIG. 45D, the above may be configured to have the coloring layer 180 disposed in contact with the upper side as shown (the other side in the thickness direction in this modification example) of the transparent film layer 151A without disposing the image-receiving layer 210.

In this modification embodiment, the same advantage as that of the third embodiment is also achieved. When the adhesive layer 164L is disposed on the one side in the thickness direction of the transparent film layer 151A and the adhesive layer 164L is bisected by the bisector k2, the volume ratio of the adhesive is greater in the other-side region 164i than in the one-side region 164o. The volume ratio of the particles in the one-side region 164o to be the side to be exposed on the surface side is smaller (than that of the other-side region 164i). This is because the adhesiveness of the one-side region 164o needs to be higher than that of the other-side region 164i.

As described with reference to FIG. 46, the other-side region 164i disposed on the transparent film layer 151A (having the coloring layer 180 already formed thereon) is bonded to the transparent film layer 151A in the state where the layers are controlled by the production equipment of the plant shown in, for example, FIG. 46 during the production. In contrast, as to the one-side region 164o, because the adherend therefor is not determined and the user conducts the bonding, the adhesiveness of the one-side region 164o needs to be higher than that of the other-side region 164i.

The volume ratio of the particles in the one-side region 164o is set to be smaller than that of the other-side region 164i as above and, as a result, any degradation of the adhesiveness caused by the addition of the particles to the adhesive layer 164L can be suppressed without, for example, increasing the thickness of the adhesive layer 164L. The desired effect (that is the desired color impression in the example of the pigment) by the addition of the particles can be achieved (without reducing the amount of the particles as the overall adhesive layer) by adding more particles to the other-side region 164i on the inner layer side by the amount corresponding to the reduced volume ratio of the particles in the one-side region 164o.

The adhesive layer 164L on the one side in the thickness direction (the adhesive layer covered by the separation material layer 152) functions as an affixing adhesive layer for affixing to the adherend M and, because the one-side region 164o having the low particle concentration is present in the outermost layer as above, an advantage of being able to suppress any transfer printing of the particles to the adherend M is also achieved.

In this modification example, similarly to the above, the average particle diameter of the particles in the other-side region 164i is larger than the average particle diameter of the particles in the one-side region 164o. As a result, the occupancy of the particles in the one-side region 164o to be the side to be exposed on the surface side can reliably be set to be low and any degradation of the adhesiveness caused by the addition of the particles can be suppressed. The pigment is added as the particles to the adhesive layer 164L while the desired color development can be achieved by securing the volume ratio of the pigment in the overall adhesive layer 164L using the above approach.

The adhesive force of the adhesive layer 164L is equal to or higher than 3 [N]/10 [mm] and, as a result, the adhesiveness by the adhesive layer 164L can be secured.

(3-3) Replacement of Transparent Film Layer and Coloring Layer with Each Other

As shown in FIG. 47A, the image-receiving layer 210, the transparent film layer 151A, the coloring layer 180, the adhesive layer 164L, and the separation material layer 152 may be stacked on each other in this order from the upper side as shown (the other side in the thickness direction) toward the lower side as shown (the one side in the thickness direction) by replacing the transparent film layer 151A and the coloring layer 180 with each other in the layer configuration of the adhesive tape 150N shown in FIG. 45A. As shown in FIG. 47B, the coloring layer 180 may not be disposed in the layer configuration of the adhesive tape 150N shown in FIG. 47A (in this case, as a result, the configuration same as the configuration shown in FIG. 45C is established) or, as shown in FIG. 47C, the image-receiving layer 210 may not be disposed in the layer configuration of the adhesive tape 150N shown in FIG. 47A. In each of these cases, the same advantage as above is achieved.

When the value of each of the various parameters in relation to the tape (the volume ratio, the average particle diameter, the adhesive force, and all other parameters) is measured in all the embodiments and the modification examples described above, a piece equal to or larger than 10 mm×10 mm is cut off from the tape and the measurement is conducted using the piece.

In addition to the above, the approaches based on the embodiments and the modification examples may properly be used in combination.

What is claimed is:

1. An adhesive tape cartridge comprising
an adhesive tape roll that winds an adhesive tape around a predetermined axis in a housing,
said adhesive tape comprising:
a base layer; and
a particle-comprising adhesive layer that is disposed on one side of said base layer in a thickness direction and comprises an adhesive comprising large diameter particles whose average particle diameter is 30 μm to 200 μm and small diameter particles whose average particle diameter is 0.2 μm to 20 μm,
wherein said large diameter particles and said small diameter particles added to said particle-comprising adhesive layer are particles of a pigment, and
wherein said small diameter particles are particles of a solid pigment.

2. An adhesive tape cartridge comprising
an adhesive tape roll that winds an adhesive tape around a predetermined axis in a housing,
said adhesive tape comprising:
a base layer; and
a particle-comprising adhesive layer that is disposed on one side of said base layer in a thickness direction and comprises an adhesive comprising large diameter particles whose average particle diameter is 30 μm to 200 μm and small diameter particles whose average particle diameter is 0.2 μm to 20 μm, wherein:
said large diameter particles are particles of a glittering pigment, and wherein
said small diameter particles are beads made from a resin or glass.

3. An adhesive tape cartridge comprising
an adhesive tape roll that winds an adhesive tape around a predetermined axis in a housing,
said adhesive tape comprising:
a base layer; and
a particle-comprising adhesive layer that is disposed on one side of said base layer in a thickness direction and comprises an adhesive comprising large diameter particles whose average particle diameter is 30

μm to 200 μm and small diameter particles whose average particle diameter is 0.2 μm to 20 μm,
wherein said large diameter particles are added to said particle-comprising adhesive layer at a volume ratio of 5% to 50%.

4. The adhesive tape cartridge according to claim 3, wherein
said small diameter particles are added to said particle-comprising adhesive layer at a volume ratio equal to or higher than 5% relative to said large diameter particles.

5. An adhesive tape cartridge comprising
an adhesive tape roll that winds an adhesive tape around a predetermined axis in a housing,
said adhesive tape comprising:
a base layer; and
a particle-comprising adhesive layer that is disposed on one side of said base layer in a thickness direction and comprises an adhesive comprising large diameter particles whose average particle diameter is 30 μm to 200 μm and small diameter particles whose average particle diameter is 0.2 μm to 20 μm, wherein
an adhesive force of said particle-comprising adhesive layer is equal to or higher than 3 [N]/10 [mm].

6. An adhesive tape cartridge comprising
an adhesive tape roll that winds an adhesive tape around a predetermined axis in a housing,
said adhesive tape comprising:
a base layer; and
a particle-comprising adhesive layer that is disposed on one side of said base layer in a thickness direction and comprises an adhesive comprising large diameter particles whose average particle diameter is 30 μm to 200 μm and small diameter particles whose average particle diameter is 0.2 μm to 20 μm, wherein
said adhesive tape further comprises a coloring layer that is disposed on the one side of said base layer in said thickness direction and on another side of said particle-comprising adhesive layer in said thickness direction.

7. An adhesive tape cartridge comprising
an adhesive tape roll that winds an adhesive tape around a predetermined axis in a housing,
said adhesive tape comprising:
a base layer; and
a particle-comprising adhesive layer that is disposed on one side of said base layer in a thickness direction and comprises an adhesive comprising large diameter particles whose average particle diameter is 30 μm to 200 μm and small diameter particles whose average particle diameter is 0.2 μm to 20 μm, wherein
said adhesive tape further comprises a coloring layer that is disposed on another side of said base layer in said thickness direction and has transmittance equal to or higher than 20%.

8. An adhesive tape cartridge comprising
an adhesive tape roll that winds an adhesive tape around a predetermined axis in a housing,
said adhesive tape comprising:
a base layer; and
a particle-comprising adhesive layer that is disposed on one side of said base layer in a thickness direction and comprises an adhesive comprising large diameter particles whose average particle diameter is 30 μm to 200 μm and small diameter particles whose average particle diameter is 0.2 μm to 20 μm, wherein
said adhesive tape further comprises:
an affixing adhesive layer that is disposed on another side of said base layer in said thickness direction; and
a separation material layer that is disposed on said another side of said affixing adhesive layer in said thickness direction.

9. The adhesive tape cartridge according to claim 8, further comprising, in said housing:
a cover film roll that winds a cover film around a predetermined axis, the cover film being configured to be bonded to the one side of said particle-comprising adhesive layer of said adhesive tape in said thickness direction; and
an ink ribbon roll that winds an ink ribbon around a predetermined axis, the ink ribbon being configured to thermally transfer an ink onto said another side of said cover film in said thickness direction, the cover film being fed out from said cover film roll.

10. An adhesive tape cartridge comprising
an adhesive tape roll that winds an adhesive tape around a predetermined axis in a housing,
said adhesive tape comprising:
a base layer; and
a particle-comprising adhesive layer that is disposed on one side of said base layer in a thickness direction and comprises an adhesive comprising large diameter particles whose average particle diameter is 30 μm to 200 μm and small diameter particles whose average particle diameter is 0.2 μm to 20 μm, wherein
said adhesive tape further comprises a separation material layer that is disposed on the one side of said particle-comprising adhesive layer in said thickness direction.

11. The adhesive tape cartridge according to claim 10, wherein
said adhesive tape further comprises an ink image-receiving layer that is disposed on another side of said base layer in said thickness direction, is configured to be thermally transferred with an ink thereon, and has transmittance equal to or higher than 20%.

12. The adhesive tape cartridge according to claim 10, further comprising, in said housing, an ink ribbon roll that winds an ink ribbon around a predetermined axis, the ink ribbon being configured to thermally transfer &aid-ink onto said adhesive tape.

13. An adhesive tape cartridge comprising
an adhesive tape roll that winds an adhesive tape around a predetermined axis in a housing,
said adhesive tape comprising:
a base layer; and
a particle-comprising adhesive layer that is disposed on one side of said base layer in a thickness direction and comprises an adhesive comprising large diameter particles whose average particle diameter is 30 μm to 200 μm and small diameter particles whose average particle diameter is 0.2 μm to 20 μm, wherein
an average particle diameter of said small diameter particles is equal to or smaller than 1/5 of an average particle diameter of said large diameter particles.

14. A cartridge-comprising printer comprising:
an adhesive tape cartridge; and
a printer that said adhesive tape cartridge is attached at a predetermined position;

said adhesive tape cartridge comprising, an adhesive tape roll that winds an adhesive tape around a predetermined axis in a housing, said adhesive tape comprising:

a base layer; and a particle-comprising adhesive layer that is disposed on one side of said base layer in a thickness direction and comprises an adhesive comprising large diameter particles whose average particle diameter is 30 μm to 200 μm and small diameter particles whose average particle diameter is 0.2 μm to 20 μm, said printer comprising:

a feeder configured to feed said adhesive tape fed out from said adhesive tape roll of said adhesive tape cartridge attached at said predetermined position; and a printing head configured to print onto said adhesive tape fed by said feeder or onto a cover film configured to be bonded to said adhesive tape.

15. The cartridge-comprising printer according to claim 14, wherein said adhesive tape of said adhesive tape cartridge further comprises:

an affixing adhesive layer that is disposed on another side of said base layer in said thickness direction; and a separation material layer that is disposed on said another side of said affixing adhesive layer in said thickness direction.

16. The cartridge-comprising printer according to claim 15, wherein said adhesive tape cartridge further comprises, in said housing:

a cover film roll that winds a cover film around a predetermined axis, the cover film being configured to be bonded to the one side of said particle-comprising adhesive layer of said adhesive tape in said thickness direction; and an ink ribbon roll that winds an ink ribbon around a predetermined axis, the ink ribbon being configured to thermally transfer an ink onto said another side of said cover film in said thickness direction, the cover film being fed out from said cover film roll.

* * * * *